US011568627B2

United States Patent
Price et al.

(10) Patent No.: US 11,568,627 B2
(45) Date of Patent: Jan. 31, 2023

(54) UTILIZING INTERACTIVE DEEP LEARNING TO SELECT OBJECTS IN DIGITAL VISUAL MEDIA

(71) Applicant: Adobe Inc., San Jose, CA (US)

(72) Inventors: Brian Price, San Jose, CA (US); Scott Cohen, Sunnyvale, CA (US); Mai Long, Portland, OR (US); Jun Hao Liew, Singapore (SG)

(73) Assignee: Adobe Inc., San Jose, CA (US)

( * ) Notice: Subject to any disclaimer, the term of this patent is extended or adjusted under 35 U.S.C. 154(b) by 576 days.

(21) Appl. No.: 16/376,704

(22) Filed: Apr. 5, 2019

(65) Prior Publication Data

US 2019/0236394 A1 Aug. 1, 2019

Related U.S. Application Data

(63) Continuation-in-part of application No. 16/216,739, filed on Dec. 11, 2018, which is a continuation of
(Continued)

(51) Int. Cl.
*G06V 10/20* (2022.01)
*G06N 3/08* (2006.01)
(Continued)

(52) U.S. Cl.
CPC ......... *G06V 10/255* (2022.01); *G06K 9/6253* (2013.01); *G06N 3/0454* (2013.01);
(Continued)

(58) Field of Classification Search
None
See application file for complete search history.

(56) References Cited

U.S. PATENT DOCUMENTS 7,295,700 B2 11/2007 Schiller et al.
7,606,417 B2 10/2009 Steinberg et al.
(Continued)

FOREIGN PATENT DOCUMENTS

| CN | 107103315 A | 8/2017 | |
|---|---|---|---|
| WO | WO 2015177268 A1 | 11/2015 | |
| WO | WO-2018229490 A1 * | 12/2018 | ............ G06T 7/0012 |

OTHER PUBLICATIONS

Guo, Z.—"Deep Learning-Based Image Segmentation on Multimodal Medical Imaging"—IEEE—Mar. 1, 2019—pp. 162-169 (Year: 2019).*

(Continued)

*Primary Examiner* — Bernard Krasnic
(74) *Attorney, Agent, or Firm* — Keller Preece PLLC

(57) ABSTRACT

Systems and methods are disclosed for selecting target objects within digital images utilizing a multi-modal object selection neural network trained to accommodate multiple input modalities. In particular, in one or more embodiments, the disclosed systems and methods generate a trained neural network based on training digital images and training indicators corresponding to various input modalities. Moreover, one or more embodiments of the disclosed systems and methods utilize a trained neural network and iterative user inputs corresponding to different input modalities to select target objects in digital images. Specifically, the disclosed systems and methods can transform user inputs into distance maps that can be utilized in conjunction with color channels and a trained neural network to identify pixels that reflect the target object.

22 Claims, 17 Drawing Sheets

Related U.S. Application Data application No. 14/945,245, filed on Nov. 18, 2015, now Pat. No. 10,192,129.

(51) Int. Cl.
 *G06K 9/62* (2022.01)
 *G06N 3/04* (2006.01)
 *G06T 7/11* (2017.01)
 *G06N 5/00* (2006.01)
 *G06V 10/26* (2022.01)
 *G06V 10/44* (2022.01)
 *G06V 10/24* (2022.01)

(52) U.S. Cl.
 CPC ............ *G06N 3/084* (2013.01); *G06N 5/003* (2013.01); *G06T 7/11* (2017.01); *G06V 10/26* (2022.01); *G06V 10/454* (2022.01); *G06N 3/0445* (2013.01); *G06V 10/248* (2022.01)

(56) References Cited

U.S. PATENT DOCUMENTS

| | | |
|---|---|---|
| 7,916,917 B2 | 3/2011 | Dewaele et al. |
| 8,600,143 B1 | 12/2013 | Kulkarni et al. |
| 8,675,934 B2 | 3/2014 | Wehnes et al. |
| 9,251,429 B2 | 2/2016 | Pham et al. |
| 9,418,319 B2 | 8/2016 | Shen et al. |
| 9,495,756 B2 | 11/2016 | Rivet-Sabourin |
| 9,684,967 B2 | 6/2017 | Abedini et al. |
| 10,192,129 B2 | 1/2019 | Price et al. |
| 10,210,613 B2 | 2/2019 | Xu et al. |
| 10,460,214 B2 | 10/2019 | Lu et al. |
| 10,470,510 B1 | 11/2019 | Koh et al. |
| 10,643,331 B2 | 5/2020 | Ghesu et al. |
| 10,679,046 B1 | 6/2020 | Black et al. |
| 10,846,566 B2 | 11/2020 | Zhu et al. |
| 2001/0051852 A1 | 12/2001 | Sundaravel et al. |
| 2003/0081833 A1 | 5/2003 | Tilton |
| 2004/0042662 A1 | 3/2004 | Wilensky et al. |
| 2004/0190092 A1 | 9/2004 | Silverbrook et al. |
| 2004/0202368 A1 | 10/2004 | Lee et al. |
| 2006/0045336 A1 | 3/2006 | Lim |
| 2006/0285743 A1 | 12/2006 | Oh et al. |
| 2007/0165949 A1 | 7/2007 | Sinop et al. |
| 2009/0252429 A1 | 10/2009 | Prochazka et al. |
| 2010/0183225 A1 | 7/2010 | Vantaram et al. |
| 2010/0226566 A1 | 9/2010 | Luo et al. |
| 2010/0322488 A1 | 12/2010 | Virtue et al. |
| 2011/0188720 A1 | 8/2011 | Narayanan et al. |
| 2011/0216975 A1 | 9/2011 | Rother et al. |
| 2011/0285874 A1 | 11/2011 | Showering et al. |
| 2012/0201423 A1 | 8/2012 | Onai et al. |
| 2014/0010449 A1 | 1/2014 | Haaramo et al. |
| 2014/0056472 A1 | 2/2014 | Gu |
| 2014/0334667 A1 | 11/2014 | Eswara et al. |
| 2015/0117783 A1 | 4/2015 | Lin et al. |
| 2016/0232425 A1 | 8/2016 | Huang et al. |
| 2017/0032551 A1 | 2/2017 | Fried et al. |
| 2017/0116497 A1 | 4/2017 | Georgescu et al. |
| 2017/0140236 A1 | 5/2017 | Price et al. |
| 2017/0169313 A1 | 6/2017 | Choi et al. |
| 2017/0169567 A1 | 6/2017 | Chefd'hotel et al. |
| 2017/0213349 A1 | 7/2017 | Kuo et al. |
| 2017/0231550 A1 | 8/2017 | Do et al. |
| 2017/0244908 A1 | 8/2017 | Flack et al. |
| 2017/0249739 A1 | 8/2017 | Kallenberg et al. |
| 2017/0287137 A1 | 10/2017 | Lin et al. |
| 2018/0061046 A1 | 3/2018 | Bozorgtabar et al. |
| 2018/0108137 A1 | 4/2018 | Price et al. |
| 2018/0137335 A1 | 5/2018 | Kim et al. |
| 2018/0182101 A1 | 6/2018 | Petersen et al. |
| 2018/0240243 A1 | 8/2018 | Kim et al. |
| 2019/0057507 A1 | 2/2019 | El-Khamy et al. |
| 2019/0108414 A1 | 4/2019 | Price et al. |
| 2019/0130229 A1 | 5/2019 | Lu et al. |
| 2019/0340462 A1 | 11/2019 | Pao et al. |
| 2019/0357615 A1 | 11/2019 | Koh et al. |
| 2020/0143194 A1 | 5/2020 | Hou et al. |
| 2020/0167930 A1* | 5/2020 | Wang .................. G06T 7/0012 |
| 2020/0388071 A1 | 12/2020 | Grabner et al. |
| 2021/0027098 A1 | 1/2021 | Ge et al. |
| 2021/0082118 A1 | 3/2021 | Zhang et al. |
| 2021/0248748 A1 | 8/2021 | Turgutlu et al. |
| 2021/0290096 A1 | 9/2021 | Yang |
| 2021/0295507 A1 | 9/2021 | Nie |
| 2022/0044407 A1 | 2/2022 | Liu et al. |
| 2022/0237799 A1 | 7/2022 | Price et al. |
| 2022/0292684 A1 | 9/2022 | Wang et al. |
| 2022/0375079 A1 | 11/2022 | Finley et al. |

OTHER PUBLICATIONS

Wang, G.—"Interactive Medical Image Segmentation using Deep Learning with Image-specific Fine-tuning"—arXiv—Oct. 11, 2017—pp. 1-11 (Year: 2017).*

Guo, Z.—"Medical Image Segmentation Based on Multi-Modal Convolutional Neural Network: Study on Image Fusion Schemes"—arXiv—Nov. 2, 2017—pp. 1-10 (Year: 2017).*

Li et al., Interactive Image Segmentation with Latent Diversity, 2018, IEEE 2575-7075/18, DOI 10.11/09/CVPR.2018.00067, pp. 577-585. (Year: 2018).

Xu et al., Deep Interactive Object Selection, Mar. 13, 2016 arXiv:1603.04042v1 [cs.CV], pp. 1-9. (Year: 2016).

U.S. Appl. No. 15/967,928, May 13, 2021, Office Action.

U.S. Appl. No. 16/231,746, Jun. 11, 2021, 1st Action Office Action.

U.S. Appl. No. 15/967,928, Sep. 29, 2021, Notice of Allowance.

U.S. Appl. No. 16/988,408, Oct. 5, 2021, Preinterview 1st Office Action.

X. Bai and G. Sapiro. Geodesic matting: A framework for fast interactive image and video segmentation and matting. International Journal of Computer Vision, 82(2):113-132, 2008.

Y. Y. Boykov and M.-P. Jolly. Interactive graph cuts for optimal, boundary & region segmentation of objects in n-d images. In Computer Vision, 2001. ICCV 2001. Proceedings. Eighth IEEE International Conference on, vol. 1, pp. 105-112. IEEE, 2001.

L.-C. Chen, G. Papandreou, I. Kokkinos, K. Murphy, and A. L. Yuille. Semantic image segmentation with deep convolutional nets and fully connected crfs. arXiv preprint arXiv:1412.7062, 2014.

R. Girshick, J. Donahue, T. Darrell, and J. Malik. Rich feature hierarchies for accurate object detection and semantic segmentation. In Computer Vision and Pattern Recognition (CVPR), 2014 IEEE Conference on, pp. 580-587. IEEE, 2014.

L. Grady. Random walks for image segmentation. Pattern Analysis and Machine Intelligence, IEEE Transactions on, 28(11):1768-1783, 2006.

V. Gulshan, C. Rother, A. Criminisi, A. Blake, and A. Zisserman. Geodesic star convexity for interactive image segmentation. In Computer Vision and Pattern Recognition (CVPR), 2010 IEEE Conference on, pp. 3129-3136. IEEE, 2010.

G. Lin, C. Shen, I. Reid, et al. Efficient piecewise training of deep structured models for semantic segmentation. arXiv preprint arXiv:1504.01013, 2015.

Z. Liu, X. Li, P. Luo, C. C. Loy, and X. Tang. Semantic image segmentation via deep parsing network. arXiv preprint arXiv:1509.02634, 2015.

J. Long, E. Shelhamer, and T. Darrell. Fully convolutional networks for semantic segmentation. arXiv preprint arXiv:1411.4038, 2014.

B. L. Price, B. Morse, and S. Cohen. Geodesic graph cut for interactive image segmentation. In Computer Vision and Pattern Recognition (CVPR), 2010 IEEE Conference on, pp. 3161-3168. IEEE, 2010.

C. Rother, V. Kolmogorov, and A. Blake. Grabcut: Interactive foreground extraction using iterated graph cuts. ACM Transactions on Graphics (TOG), 23(3):309-314, 2004.

S. Zheng, S. Jayasumana, B. Romera-Paredes, V. Vineet, Z. Su, D. Du, C. Huang, and P. Torr. Conditional random fields as recurrent neural networks. arXiv preprint arXiv:1502.03240, 2015.

(56) References Cited

OTHER PUBLICATIONS

Roth, H.—"DeepOrgan: Multi-level Deep Convolutional Networks for Automated Pancreas Segmentation"—Jun. 22, 2015—arXiv:1506.06448v1, pp. 1-12.
Wang, N.—"Transferring Rich Feature Hierarchies for Robust Visual Tracking"—Apr. 23, 2015—arXiv:1501.04587v2, pp. 1-9.
Farag, A.—"A Bottom-up Approach for Pancreas Segmentation using Cascaded Superpixels and (Deep) Image Patch Labeling"—May 22, 2015—Elsevier Journal of Medical Image Analysis, pp. 1-21.
D. Acuna, H. Ling, A. Kar, and S. Fidler. Efficient interactive annotation of segmentation datasets with Polygon-RNN++. In CVPR, 2018.
D. Batra, P. Yadollahpour, A. Guzman-Rivera, and G. Shakhnarovich. Diverse m-best solutions in markov random fields. In ECCV, 2012.
L. Castrejon, K. Kundu, R. Urtasun, and S. Fidler. Annotating object instances with a polygon-rnn. In IEEE CVPR, Jul. 2017.
L.-C. Chen, Y. Zhu, G. Papandreou, F. Schroff, and H. Adam. Encoder-decoder with atrous separable convolution for semantic image segmentation. arXiv preprint arXiv:1802.02611, 2018.
A. Criminisi, T. Sharp, and A. Blake. GeoS: Geodesic image segmentation. In ECCV, pp. 99-112, 2008.
M. Everingham, L. Van Gool, C. K. Williams, J. Winn, and A. Zisserman. The pascal visual object classes (VOC) challenge. IJCV, 88(2):303-338, 2010.
M. Firman, N. D. F. Campbell, L. Agapito, and G. J. Brostow. Diversenet: When one right answer is not enough. In IEEE CVPR, Jun. 2018.
D. Freedman and T. Zhang. Interactive graph cut based segmentation with shape priors. In IEEE CVPR, vol. 1, pp. 755-762. IEEE, 2005.
A. Guzman-rivera, D. Batra, and P. Kohli. Multiple choice learning: Learning to produce multiple structured outputs. In F. Pereira, C. J. C. Burges, L. Bottou, and K. Q. Weinberger, editors, NIPS, pp. 1799-1807. 2012.
B. Hariharan, P. Arbelaez, L. Bourdev, S. Maji, and J. Malik. Semantic contours from inverse detectors. 2011.
K. He, X. Zhang, S. Ren, and J. Sun. Deep residual learning for image recognition. In IEEE CVPR, Jun. 2016.
Y. Hu, A. Soltoggio, R. Lock, and S. Carter. A fully convolutional two-stream fusion network for interactive image segmentation. Neural Networks, 109:31-42, 2019.
M. Kass, A. Witkin, and D. Terzopoulos. Snakes: Active contour models. IJCV, 1(4):321-331, 1988.
H. Le, L. Mai, B. Price, S. Cohen, H. Jin, and F. Liu. Interactive boundary prediction for object selection. In ECCV, Sep. 2018.
S. Lee, S. Purushwalkam Shiva Prakash, M. Cogswell, D. Crandall, and D. Batra. Why M heads are better than one: Training a diverse ensemble of deep networks. CoRR, abs/1511.06314, 2015.
S. Lee, S. Purushwalkam Shiva Prakash, M. Cogswell, V. Ranjan, D. Crandall, and D. Batra. Stochastic multiple choice learning for training diverse deep ensembles. In D. D. Lee, M. Sugiyama, U. V. Luxburg, I. Guyon, and R. Garnett, editors, NIPS, pp. 2119-2127. 2016.
Y. Li, J. Sun, C.-K. Tang, and H.-Y. Shum. Lazy snapping. In ACM Transactions on Graphics, vol. 23, pp. 303-308, 2004.
Z. Li, Q. Chen, and V. Koltun. Interactive image segmentation with latent diversity. In IEEE CVPR, pp. 577-585, 2018.
J. H. Liew, Y. Wei, W. Xiong, S.-H. Ong, and J. Feng. Regional interactive image segmentation networks. In IEEE ICCV, Oct. 2017.
S. Mahadevan, P. Voigtlaender, and B. Leibe. Iteratively trained interactive segmentation. arXiv preprint arXiv:1805.04398, 2018.
K. Maninis, S. Caelles, J. Pont-Tuset, and L. Van Gool. Deep extreme cut: From extreme points to object segmentation. In IEEE CVPR, 2018.
K. McGuinness and N. E. OConnor. Toward automated evaluation of interactive segmentation. Computer Vision and Image Understanding, 115(6):868-884, 2011.
E. N. Mortensen and W. A. Barrett. Intelligent scissors for image composition. In Proceedings of the 22nd annual conference on Computer graphics and interactive techniques, pp. 191-198, 1995.
J. Redmon, S. Divvala, R. Girshick, and A. Farhadi. You only look once: Unified, real-time object detection. In Proceedings of the IEEE conference on computer vision and pattern recognition, pp. 779-788, 2016.
S. Ren, K. He, R. Girshick, and J. Sun. Faster r-cnn: Towards real-time object detection with region proposal networks. In Advances in neural information processing systems, pp. 91-99, 2015.
O. Russakovsky, J. Deng, H. Su, J. Krause, S. Satheesh, S. Ma, Z. Huang, A. Karpathy, A. Khosla, M. Bernstein, et al. Imagenet large scale visual recognition challenge. IJCV, 115(3):211-252, 2015.
S. Vicente, V. Kolmogorov, and C. Rother. Graph cut based image segmentation with connectivity priors. In IEEE CVPR, pp. 1-8. IEEE, 2008.
N. Xu, B. Price, S. Cohen, J. Yang, and T. S. Huang. Deep interactive object selection. In IEEE CVPR, pp. 373-381, 2016.
K. Yamaguchi, M. H. Kiapour, L. E. Ortiz, and T. L. Berg. Parsing clothing in fashion photographs. In Computer Vision and Pattern Recognition (CVPR), 2012 IEEE Conference on, pp. 3570-3577. IEEE, 2012.
B. Zhou, H. Zhao, X. Puig, S. Fidler, A. Barriuso, and A. Torralba. Scene parsing through ade20k dataset. In Proceedings of the IEEE Conference on Computer Vision and Pattern Recognition, 2017.
U.S. Appl. No. 14/945,245, Sep. 21, 2017, Preinterview 1st Office Action.
U.S. Appl. No. 14/945,245, Nov. 1, 2017, 1st Action Office Action.
U.S. Appl. No. 14/945,245, Apr. 17, 2018, Office Action.
U.S. Appl. No. 14/945,245, Sep. 12, 2018, Notice of Allowance.
Intention to Grant as received in UK application GB1915436.8 dated Aug. 25, 2021.
U.S. Appl. No. 16/216,739, Sep. 13, 2021, Office Action.
IEEE Conference on Computer Vision and Pattern Recognition (CVPR), 2016, Liang Chieh Chen et al, "Attention to Scale: Scale-Aware Semantic Image Segmentation", pp. 3640-3649 abstract 1. 7-9 and p. 2 left column, 1st paragraph starting at "In particular . . . ", 1. 4-7, Sec. 3.1, Fig. 5 column (c).
IEEE/CVF International Conference on Computer Vision (ICCV), 2019, Liew Jun Hao et al, "MultiSeg: Semantically Meaningful, Scale-Diverse Segmentations From Minimal User Input", pp. 662-670 the whole document.
Combined Search and Examination Report as received in UK application GB1915436.8 dated Aug. 12, 2020.
Ali Borji, Ming-Ming Cheng, Qibin Hou, Huaizu Jiang, and Jia Li. Salient object detection: A survey. Computational visual media, pp. 1-34, 2019.
Ali Borji and Laurent Itti. State-of-the-art in visual attention modeling. IEEE transactions on pattern analysis and machine intelligence, 35(1):185-207, 2012.
Liang-Chieh Chen, George Papandreou, Iasonas Kokkinos, Kevin Murphy, and Alan L Yuille. Semantic image segmentation with deep convolutional nets and fully connected crfs. arXiv preprint arXiv:1412.7062, 2014.
Liang-Chieh Chen, Yukun Zhu, George Papandreou, Florian Schroff, and Hartwig Adam. Encoder-decoder with atrous separable convolution for semantic image segmentation. In Proceedings of the European conference on computer vision (ECCV), pp. 801-818, 2018.
Ho Kei Cheng, Jihoon Chung, Yu-Wing Tai, and Chi-Keung Tang. Cascadepsp: Toward class-agnostic and very high-resolution segmentation via global and local refinement. In Proceedings of the IEEE/CVF Conference on Computer Vision and Pattern Recognition, pp. 8890-8899, 2020.
Ming-Ming Cheng, Niloy J Mitra, Xiaolei Huang, Philip H S Torr, and Shi-Min Hu. Global contrast based salient region detection. IEEE transactions on pattern analysis and machine intelligence, 37(3):569-582, 2014.
Kaiming He, Xiangyu Zhang, Shaoqing Ren, and Jian Sun. Deep residual learning for image recognition. In Proceedings of the IEEE conference on computer vision and pattern recognition, pp. 770-778, 2016.

(56) References Cited

OTHER PUBLICATIONS

Andrew Howard, Mark Sandler, Grace Chu, Liang-Chieh Chen, Bo Chen, Mingxing Tan, Weijun Wang, Yukun Zhu, Ruoming Pang, Vijay Vasudevan, et al. Searching for mobilenetv3. In Proceedings of the IEEE International Conference on Computer Vision, pp. 1314-1324, 2019.
Gao Huang, Zhuang Liu, Laurens Van Der Maaten, and Kilian Q Weinberger. Densely connected convolutional networks. In Proceedings of the IEEE conference on computer vision and pattern recognition, pp. 4700-4708, 2017.
Laurent Itti, Christof Koch, and Ernst Niebur. A model of saliency-based visual attention for rapid scene analysis. IEEE Transactions on pattern analysis and machine intelligence, 20(11):1254-1259, 1998.
Alexander Kirillov, Yuxin Wu, Kaiming He, and Ross Girshick. Pointrend: Image segmentation as rendering. In Proceedings of the IEEE/CVF Conference on Computer Vision and Pattern Recognition, pp. 9799-9808, 2020.
Dominik A Klein and Simone Frintrop. Center-surround divergence of feature statistics for salient object detection. In 2011 International Conference on Computer Vision, pp. 2214-2219. IEEE, 2011.
Philipp Krahenbuhl and Vladlen Koltun. Efficient inference in fully connected crfs with gaussian edge potentials. In Advances in neural information processing systems, pp. 109-117, 2011.
Alex Krizhevsky, Ilya Sutskever, and Geoffrey E Hinton. Imagenet classification with deep convolutional neural networks. In Advances in neural information processing systems, pp. 1097-1105, 2012.
Guanbin Li and Yizhou Yu. Visual saliency based on multi-scale deep features. In Proceedings of the IEEE conference on computer vision and pattern recognition, pp. 5455-5463, 2015.
Xiang Li, Tianhan Wei, Yau Pun Chen, Yu-Wing Tai, and Chi-Keung Tang. Fss-1000: A 1000-class dataset for few-shot segmentation. In Proceedings of the IEEE/CVF Conference on Computer Vision and Pattern Recognition, pp. 2869-2878, 2020.
Guosheng Lin, Anton Milan, Chunhua Shen, and Ian Reid. Refinenet: Multi-path refinement networks for high-resolution semantic segmentation. In Proceedings of the IEEE conference on computer vision and pattern recognition, pp. 1925-1934, 2017.
Guosheng Lin, Chunhua Shen, Anton Van Den Hengel, and Ian Reid. Efficient piecewise training of deep structured models for semantic segmentation. In Proceedings of the IEEE conference on computer vision and pattern recognition, pp. 3194-3203, 2016.
Tsung-Yi Lin, Michael Maire, Serge Belongie, James Hays, Pietro Perona, Deva Ramanan, Piotr Dollar, and C Lawrence Zitnick. Microsoft coco: Common objects in context. In European conference on computer vision, pp. 740-755. Springer, 2014.
Nian Liu and Junwei Han. Dhsnet: Deep hierarchical saliency network for salient object detection. In Proceedings of the IEEE Conference on Computer Vision and Pattern Recognition, pp. 678-686, 2016.
Nian Liu, Junwei Han, and Ming-Hsuan Yang. Picanet: Learning pixel-wise contextual attention for saliency detection. In Proceedings of the IEEE Conference on Computer Vision and Pattern Recognition, pp. 3089-3098, 2018.
Jonathan Long, Evan Shelhamer, and Trevor Darrell. Fully convolutional networks for semantic segmentation. In Proceedings of the IEEE conference on computer vision and pattern recognition, pp. 3431-3440, 2015.
Zhiming Luo, Akshaya Mishra, Andrew Achkar, Justin Eichel, Shaozi Li, and Pierre-Marc Jodoin. Non-local deep features for salient object detection. In Proceedings of the IEEE Conference on computer vision and pattern recognition, pp. 6609-6617, 2017.
Robert Osserman et al. The isoperimetric inequality. Bulletin of the American Mathematical Society, 84(6):1182-1238, 1978.
Youwei Pang, Xiaoqi Zhao, Lihe Zhang, and Huchuan Lu. Multi-scale interactive network for salient object detection. In Proceedings of the IEEE/CVF Conference on Computer Vision and Pattern Recognition, pp. 9413-9422, 2020.
Chao Peng, Xiangyu Zhang, Gang Yu, Guiming Luo, and Jian Sun. Large kernel matters—improve semantic segmentation by global convolutional network. In Proceedings of the IEEE conference on computer vision and pattern recognition, pp. 4353-4361, 2017.
Olaf Ronneberger, Philipp Fischer, and Thomas Brox. U-net: Convolutional networks for biomedical image segmentation. In International Conference on Medical image computing and computer-assisted intervention, pp. 234-241. Springer, 2015.
Xiaoyong Shen, Aaron Hertzmann, Jiaya Jia, Sylvain Paris, Brian Price, Eli Shechtman, and Ian Sachs. Automatic portrait segmentation for image stylization. In Computer Graphics Forum, vol. 35, pp. 93-102. Wiley Online Library, 2016.
Jianping Shi, Qiong Yan, Li Xu, and Jiaya Jia. Hierarchical image saliency detection on extended cssd. IEEE transactions on pattern analysis and machine intelligence, 38(4):717-729, 2015.
Karen Simonyan and Andrew Zisserman. Very deep convolutional networks for large-scale image recognition. arXiv preprint arXiv:1409. 1556, 2014.
Christian Szegedy, Wei Liu, Yangqing Jia, Pierre Sermanet, Scott Reed, Dragomir Anguelov, Dumitru Erhan, Vincent Vanhoucke, and Andrew Rabinovich. Going deeper with convolutions. In Proceedings of the IEEE conference on computer vision and pattern recognition, pp. 1-9, 2015.
Jingdong Wang, Ke Sun, Tianheng Cheng, Borui Jiang, Chaorui Deng, Yang Zhao, Dong Liu, Yadong Mu, Mingkui Tan, Xinggang Wang, et al. Deep high-resolution representation learning for visual recognition. IEEE transactions on pattern analysis and machine intelligence, 2020.
Lijun Wang, Huchuan Lu, Xiang Ruan, and Ming-Hsuan Yang. Deep networks for saliency detection via local estimation and global search. In Proceedings of the IEEE Conference on Computer Vision and Pattern Recognition, pp. 3183-3192, 2015.
Lijun Wang, Huchuan Lu, Yifan Wang, Mengyang Feng, Dong Wang, Baocai Yin, and Xiang Ruan. Learning to detect salient objects with image-level supervision. In Proceedings of the IEEE Conference on Computer Vision and Pattern Recognition, pp. 136-145, 2017.
Linzhao Wang, Lijun Wang, Huchuan Lu, Pingping Zhang, and Xiang Ruan. Saliency detection with recurrent fully convolutional networks. In European conference on computer vision, pp. 825-841. Springer, 2016.
Yichen Wei, Fang Wen, Wangjiang Zhu, and Jian Sun. Geodesic saliency using background priors. In European conference on computer vision, pp. 29-42. Springer, 2012.
Ning Xu, Brian Price, Scott Cohen, and Thomas Huang. Deep image matting. In Proceedings of the IEEE Conference on Computer Vision and Pattern Recognition, pp. 2970-2979, 2017.
Chuan Yang, Lihe Zhang, Huchuan Lu, Xiang Ruan, and Ming-Hsuan Yang. Saliency detection via graph-based manifold ranking. In Proceedings of the IEEE conference on computer vision and pattern recognition, pp. 3166-3173, 2013.
Yi Zeng, Pingping Zhang, Jianming Zhang, Zhe Lin, and Huchuan Lu. Towards high-resolution salient object detection. In Proceedings of the IEEE International Conference on Computer Vision, pp. 7234-7243, 2019.
Chi Zhang, Guosheng Lin, Fayao Liu, Rui Yao, and Chunhua Shen. Canet: Class-agnostic segmentation networks with iterative refinement and attentive few-shot learning. In Proceedings of the IEEE Conference on Computer Vision and Pattern Recognition, pp. 5217-5226, 2019.
Jianming Zhang and Stan Sclaroff. Saliency detection: A boolean map approach. In Proceedings of the IEEE international conference on computer vision, pp. 153-160, 2013.
Lihe Zhang, Jianwu Ai, Bowen Jiang, Huchuan Lu, and Xiukui Li. Saliency detection via absorbing markov chain with learnt transition probability. IEEE Transactions on Image Processing, 27(2):987-998, 2017.
Lu Zhang, Ju Dai, Huchuan Lu, You He, and Gang Wang. A bi-directional message passing model for salient object detection. In Proceedings of the IEEE Conference on Computer Vision and Pattern Recognition, pp. 1741-1750, 2018.
Lihe Zhang, Chuan Yang, Huchuan Lu, Xiang Ruan, and Ming-Hsuan Yang. Ranking saliency. IEEE transactions on pattern analysis and machine intelligence, 39(9):1892-1904, 2016.

(56) References Cited

OTHER PUBLICATIONS

Pingping Zhang, Dong Wang, Huchuan Lu, Hongyu Wang, and Xiang Ruan. Amulet: Aggregating multi-level convolutional features for salient object detection. In Proceedings of the IEEE International Conference on Computer Vision, pp. 202-211, 2017.
Xiaoning Zhang, Tiantian Wang, Jinqing Qi, Huchuan Lu, and Gang Wang. Progressive attention guided recurrent network for salient object detection. In Proceedings of the IEEE Conference on Computer Vision and Pattern Recognition, pp. 714-722, 2018.
Hengshuang Zhao, Jianping Shi, Xiaojuan Qi, Xiaogang Wang, and Jiaya Jia. Pyramid scene parsing network. In Proceedings of the IEEE conference on computer vision and pattern recognition, pp. 2881-2890, 2017.
Jia-Xing Zhao, Jiang-Jiang Liu, Deng-Ping Fan, Yang Cao, Jufeng Yang, and Ming-Ming Cheng. Egnet: Edge guidance network for salient object detection. In Proceedings of the IEEE International Conference on Computer Vision, pp. 8779-8788, 2019.
Rui Zhao, Wanli Ouyang, Hongsheng Li, and Xiaogang Wang. Saliency detection by multi-context deep learning. In Proceedings of the IEEE conference on computer vision and pattern recognition, pp. 1265-1274, 2015.
Shuai Zheng, Sadeep Jayasumana, Bernardino Romera-Paredes, Vibhav Vineet, Zhizhong Su, Dalong Du, Chang Huang, and Philip HS Torr. Conditional random fields as recurrent neural networks. In Proceedings of the IEEE international conference on computer vision, pp. 1529-1537, 2015.
Wangjiang Zhu, Shuang Liang, Yichen Wei, and Jian Sun. Saliency optimization from robust background detection. In Proceedings of the IEEE conference on computer vision and pattern recognition, pp. 2814-2821, 2014.
L. Grady. Random walks for image segmentation. Pattern Analysis and Machine Intelligence, IEEE Transactions on, 28(11):1768-1783, 2006. Part 1.
L. Grady. Random walks for image segmentation. Pattern Analysis and Machine Intelligence, IEEE Transactions on, 28(11):1768-1783, 2006. Part 2.
Zhang et al. in U.S. Appl. No. 16/988,055, filed Aug. 7, 2020, entitled Generating an Image Mask for a Digital Image by Utilizing a Multi-Branch Masking Pipeline With Neural Networks.
U.S. Appl. No. 16/216,739, Feb. 25, 2021, Preinterview 1st Office Action.
U.S. Appl. No. 16/216,739, Apr. 5, 2021, 1st Action Office Action.
U.S. Appl. No. 15/967,928, Apr. 2, 2021, 1st Action Office Action.
U.S. Appl. No. 16/231,746, Feb. 18, 2021, Preinterview 1st Office Action.
Examination Report as received in Australian application 2019250107 dated Nov. 5, 2021.
Notice of Grant as received in UK application GB1813276.1 dated Oct. 12, 2021.
U.S. Appl. No. 16/231,746, Nov. 10, 2021, Notice of Allowance.
U.S. Appl. No. 16/988,408, Nov. 24, 2021, 1st Action Office Action.
Everingham, M. and VanGool, L. and Williams, C. K. I. and Winn, J. and Zisserman, A.; "The PASCAL Visual Object Classes Challenge 2007," (VOC2007) Results, Nov. 8, 2007, available at http://host.robots.ox.ac.uk/pascal/VOC/voc2007/.
Tsung-Yi Lin, Michael Maire, Serge Belongie, Lubomir Bourdev, Ross Girshick, James Hays, Pietro Perona, Deva Ramanan, C. Lawrence Zitnick, Piotr Dollár; "Microsoft COCO: Common Objects in Context," Submitted on May 1, 2014 (v1), last revised Feb. 21, 2015 (this version, v3), Cornell University Library, arXiv:1405.0312v3 [cs.CV], 15 pages.
Gao Huang, Zhuang Liu, Kilian Q. Weinberger, and Laurens V.D. Maaten; "Densely connected convolutional networks," In arXiv:1608.06993v3, 2016.
C. Szegedy, W. Liu, Y.Q. Jia, P. Sermanet, S. Reed, D. Anguelov, D. Erhan, V. Vanhoucke, and A. Rabinovich; "Going deeper with convolutions," In CVPR, 2015.
Chen et al, 'DISC: Deep Image Saliency Computing via Progressive Representation Learning', 2016, IEEE Transactions on Neural Networks and Learning Systems, vol. 27, No. 6, pp. 1135-1149 (Year: 2016).
Control Theory and Informatics, vol. 2, No. 1, 2012 Digital Image Processing for Camera Application in Mobile Devices using Artificial Neural Networks, Kamat, S. P., pp. 11-17.
Chen, Liang-Chieh et al. "Rethinking Atrous Convolution for Semantic Image Segmentation." ArXiv abs/1706.05587 (2017): n. pag.
M. Rajchl et al., "DeepCut: Object Segmentation From Bounding Box Annotations Using Convolutional Neural Networks," in IEEE Transactions on Medical Imaging, vol. 36, No. 2, pp. 674-683, Feb. 2017, archived at arxiv.org/pdf/1605.07866.
Combined Search & Examination Report as received in UK application GB1813276.1 dated Feb. 14, 2019.
U.S. Appl. No. 15/799,395, Mar. 14, 2019, Office Action.
U.S. Appl. No. 15/799,395, Jul. 12, 2019, Notice of Allowance.
U.S. Appl. No. 15/967,928, Dec. 10, 2020, Preinterview 1st Office Action.
Examination Report as received in Australian application 2019250107 dated Oct. 14, 2021.
U.S. Appl. No. 16/216,739, Dec. 23, 2021, Notice of Allowance.
U.S. Appl. No. 16/988,408, Jan. 5, 2022, Notice of Allowance.
Notice of Grant as received in Australian application 2019250107 dated Mar. 17, 2022.
U.S. Appl. No. 17/126,986, Aug. 30, 2022, Office Action.
U.S. Appl. No. 17/660,361, dated Dec. 8, 2022, Office Action.

\* cited by examiner

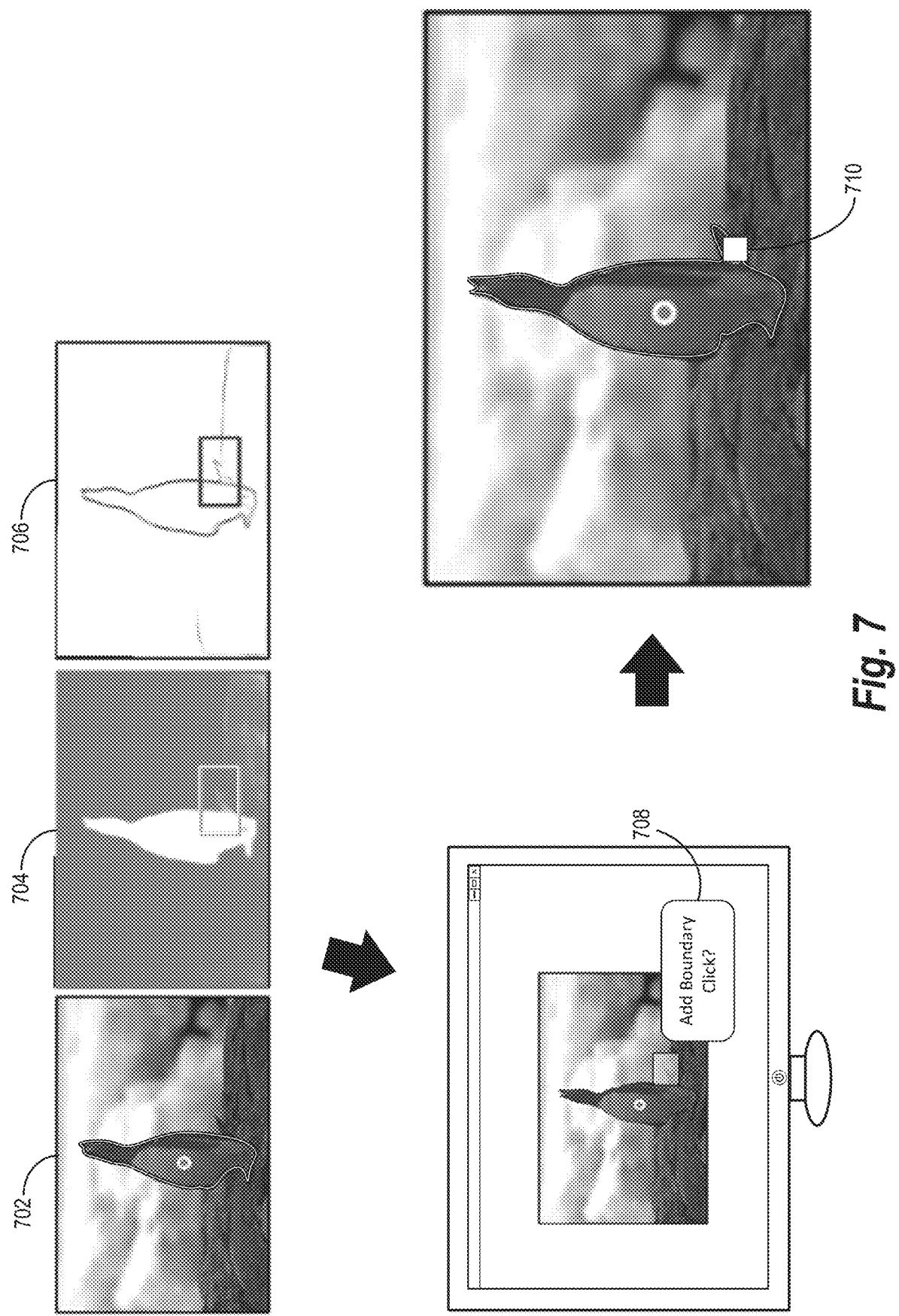

UTILIZING INTERACTIVE DEEP LEARNING TO SELECT OBJECTS IN DIGITAL VISUAL MEDIA

CROSS-REFERENCE TO RELATED APPLICATIONS

The present application is a continuation-in-part of U.S. patent application Ser. No. 16/216,739, filed Dec. 11, 2018, which is a continuation of U.S. patent application Ser. No. 14/945,245, filed Nov. 18, 2015, now issued as U.S. Pat. No. 10,192,129. The aforementioned patent(s) and application(s) are hereby incorporated by reference in their entirety.

BACKGROUND

Recent years have seen a rapid proliferation in the use of digital visual media. Indeed, with advancements in digital cameras, smartphones, and other technology, the ability to capture, access, and utilize digital images and video has steadily increased. Accordingly, engineers have made significant developments in digital object selection systems that capture, manage, and edit digital images. For example, some conventional object selection systems can identify and select objects portrayed within digital images.

Although some conventional systems can identify and select digital objects, these systems have a variety of problems and shortcomings. For example, some common digital object selection systems detect user tracing of an area within a digital image and select pixels within the traced area. Although such systems allow a user to select pixels in a digital image, they are often rough, over-inclusive, under-inclusive, and/or time consuming. Indeed, conventional systems that rely upon manual tracing commonly fail to provide sufficient precision to accurately select objects. Moreover, in order to achieve increased accuracy, such systems often require an exorbitant amount of time and user interactions to trace an object in a digital image.

Similarly, some common digital object selection systems are trained to identify pixels corresponding to common object classes. For example, some common digital systems are trained to identify and select pixels corresponding to dogs, cats, or other object classes. Although such systems are capable of identifying and selecting common objects, they are limited by the particular classifications with which they are trained. Because the number and type of object classes in the world is so vast, such common digital object selection systems can severely limit the ability to identify, select, and modify objects in digital visual media. Moreover, because such common systems identify pixels corresponding to a particular object type, they often have difficulty distinguishing between multiple objects belonging to the same class.

In addition, some conventional digital object selection systems are tied to fixed types of user input. For example, some conventional digital object systems can identify digital objects based on rigid input of area tracing inputs. By specializing on a specific type of user input, these conventional systems reduce flexibility and accuracy, inasmuch as a particular type of user input may only be effective at identifying target objects in specific circumstances (e.g., tracing may only be efficient for easily identifiable and tracable shapes).

These and other problems exist with regard to identifying objects in digital visual media.

BRIEF SUMMARY

One or more embodiments described herein provide benefits and solve one or more of the foregoing or other problems in the art with systems, methods, and non-transitory computer readable media that identify target objects utilizing a unified multi-modal interactive deep learning model. In particular, in one or more embodiments, the disclosed systems utilize a unified deep learning model that accepts and aggregates a plurality of interactive user inputs corresponding to different input modalities (e.g., regional clicks, boundary clicks, natural language expression, bounding boxes, attention masks, and/or soft clicks) to select objects portrayed within digital visual media. For instance, the disclosed systems can train a multi-modal object segmentation neural network based on generic training digital images and training indicators corresponding to different input modalities. Based on this training, the disclosed systems can utilize a multi-modal object segmentation neural network to identify one or more objects based on user input corresponding to a variety of different input modalities. This approach allows for improved efficiency by reducing the user interaction and time required to identify objects portrayed in digital images. Additionally, this approach provides improved flexibility and accuracy by utilizing deep learning techniques and by introducing multiple different user input modalities that can be uniquely applied to the unique circumstances and features of individual digital images.

To illustrate, in one or more embodiments, the disclosed systems receive multiple different types of user input (e.g., a regional input modality, a boundary input modality, and/or a language input modality). In one or more embodiments, the disclosed systems then utilize a multi-modal object selection neural network to generate an object segmentation output based on the multiple different types of user input. Moreover, the disclosed systems can then generate an enhanced digital image by modifying the digital image based on the object segmentation output.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 7 illustrates generating and utilizing a suggested user input corresponding to an input modality in accordance with one or more embodiments;

DETAILED DESCRIPTION

Figure 1:
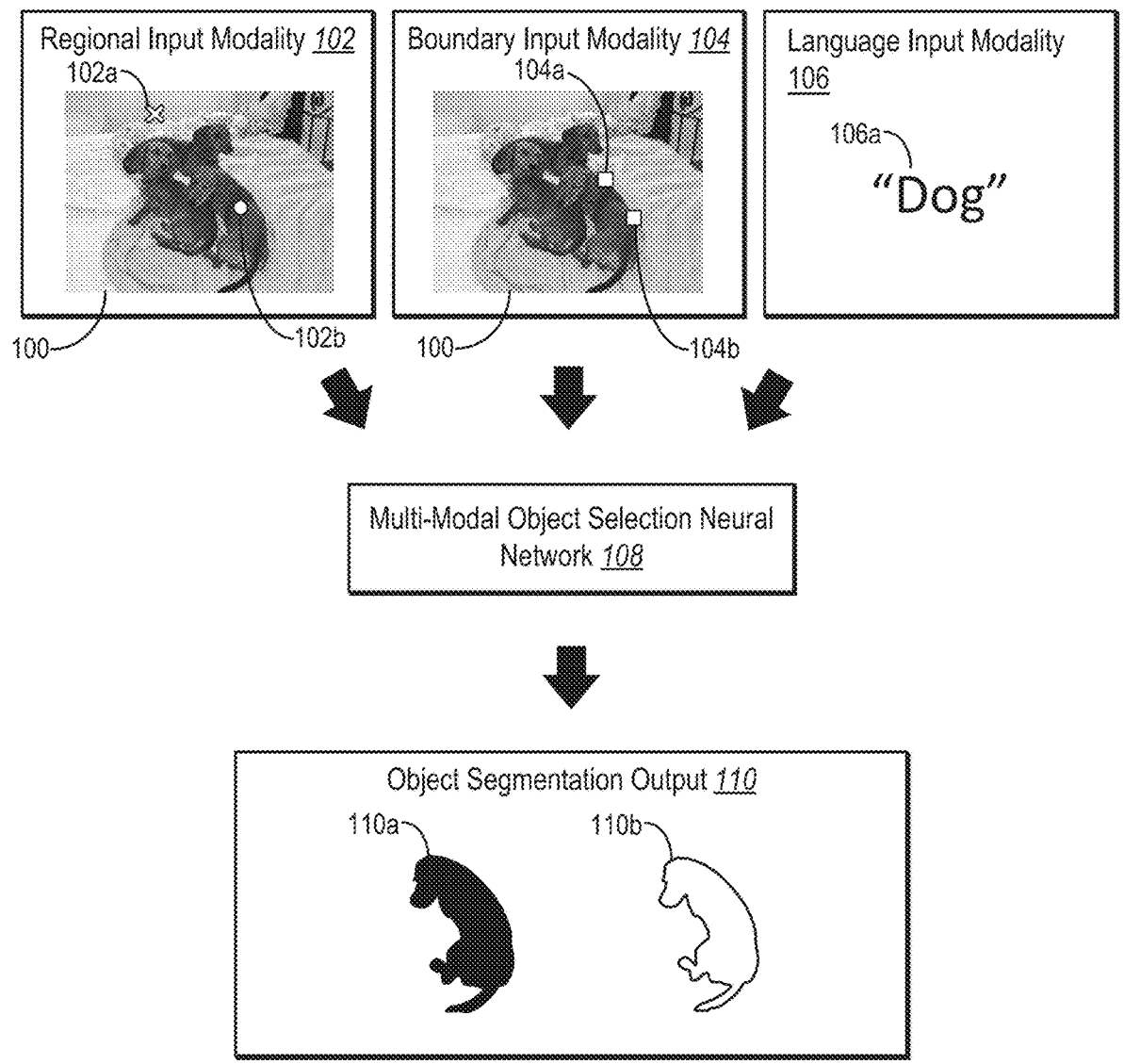
FIG. 1 illustrates an overview of a process of generating an object segmentation output utilizing a multi-modal object selection neural network based on user inputs corresponding to multiple input modalities in accordance with one or more embodiments.

One or more embodiments of the present disclosure include a multi-modal selection system that utilizes an object selection neural network that analyzes multiple input modalities to generate object segmentation outputs corresponding to target objects portrayed in digital visual media. More particularly, the multi-modal selection system can utilize a unified deep learning approach that accommodates multiple input modalities to enable a more efficient, accurate, and flexible selection pipeline. For example, in one or more embodiments, the multi-modal selection system trains a neural network utilizing training digital images and training indicators corresponding to various input modalities. Moreover, in one or more embodiments, the multi-modal selection system utilizes the trained neural network to select an object within an image based on user input of various combinations of different input modalities (e.g., regional clicks, boundary clicks, language input, bounding boxes, attention masks, and/or soft clicks). In addition, the multi-modal selection system can also analyze digital images and user inputs to suggest particular input modalities to a user for more active learning and accurate object segmentation.

As an example illustration, the disclosed systems identify a first user input corresponding to a regional input modality (e.g., a foreground click or a background click relative to a target object portrayed in a digital image). The disclosed systems can also identify a second user input corresponding to a boundary input modality (e.g., an edge click relative to the target object). In one or more embodiments, the disclosed systems then utilize a multi-modal object selection neural network to generate an object segmentation output based on the first user input corresponding to the regional input modality and the second user input corresponding to the boundary input modality. Moreover, the disclosed systems can then generate an enhanced digital image by modifying the digital image based on the object segmentation output (e.g., changing the appearance of the target object or moving the target object to a different background).

As used herein, the terms first, second, etc. are, in some instances, used herein to describe various elements, these elements should not be limited by these terms. These terms are used only to distinguish one element from another. For example, a first user input in time could be termed a second user input, and, similarly, a second user input in time could be termed a first user input, without departing from the scope of the various described implementations. The first user input and the second user input are both user inputs, but they are not the same user input.

As just mentioned, in one or more embodiments the multi-modal selection system identifies user input that corresponds to one or more input modalities. For example, the multi-modal selection system can identify user input of a foreground click (e.g., a user selection on a target object), a background click (e.g., a user selection off of a target object), and/or an edge click (e.g., a user selection on a boundary of a target object). In addition, the multi-modal selection system can identify user input of a natural language expression (e.g., verbal input such as a spoken phrase or typed word indicating a name or class of the target object). Further, the multi-modal selection system can identify user input of other input modalities, such as a bounding shape (e.g., a bounding box around the target object), an attention mask (e.g., a dense foreground selection such as dense scribbling), or a soft click (e.g., digital input that roughly identifies an area corresponding to a small target object). Thus, the user inputs can include one or more pixels of the digital image and a particular input modality indicating how the one or more pixels correspond to an object portrayed in the digital image.

Furthermore, as discussed above, the multi-modal selection system utilizes a trained neural network (e.g., a multi-modal object selection neural network) to analyze the user input and identify a set of pixels representing the object in the digital image (e.g., an object segmentation output). Indeed, by utilizing a trained neural network in conjunction with user input corresponding to different input modalities, the multi-modal selection system can select any variety, number, or type of objects represented in a digital image. In particular, in one or more embodiments, the multi-modal selection system trains a neural network with generic target objects and a plurality of training indicators corresponding to different input modalities. Accordingly, when presented with a digital image, the trained neural network can identify and select any type of object (regardless of object type or class) utilizing user inputs corresponding to any of a variety of input modalities.

In one or more embodiments, the multi-modal selection system identifies target objects in digital images by transforming user inputs into distance maps. As discussed in greater detail below, a distance map reflects distances between pixels in digital images and a position corresponding to a user input (e.g., pixels indicated by a user input). Thus, in one or more embodiments, the multi-modal selection system transforms user inputs corresponding to various input modalities (e.g., edge clicks, foreground clicks, or background clicks corresponding to a target object in a digital image) into distance maps.

For example, the multi-modal selection system can utilize distance maps to identify an object in a digital image. In particular, in one or more embodiments, the multi-modal selection system provides distance maps and a corresponding digital image to a trained neural network. More specifically, the multi-modal selection system combines distance maps with color channels (i.e., data sets reflecting the color of pixels in digital images) to form image/user interaction pairs (i.e., a data set pair combining image data reflected by color channels for a particular digital image together with user interaction data reflected by distance maps for the particular digital image).

The multi-modal selection system utilizes the trained neural network to select a target object based on the image/user interaction pairs. Specifically, the multi-modal selection system utilizes a trained neural network and image/user interaction pairs to generate a probability map. In particular, the multi-modal selection system generates a probability map that reflects the likelihood that pixels within a digital image are part of a target object in the digital image. Utilizing the probability map, the multi-modal selection system can generate an object segmentation output such as segmentation mask and/or a segmentation boundary corresponding to a target object portrayed in a digital image.

Aside from utilizing a trained neural network to select target objects, in one or more embodiments, the multi-modal selection system also trains a neural network. In particular, in one or more embodiments, the multi-modal selection system generates training image/user interaction pairs and trains a neural network utilizing the training image/user interaction pairs. More specifically, in one or more embodiments, the multi-modal selection system accesses a repository of training digital images wherein the training digital images portray identified training objects defined by training object data (e.g., ground truth data). The multi-modal selection system utilizes random sampling strategies to generate training indicators that model user input patterns corresponding to various input modalities. Moreover, based on the training indicators, the multi-modal selection system generates training distance maps and training image/user interaction pairs.

Upon creating a plurality of training image/user interaction pairs, the multi-modal selection system utilizes the training image/user interaction pairs to train a neural network. In particular, the multi-modal selection system can provide the training image/user interaction pairs to a neural network together with training object ground truth (e.g., known ground truth masks corresponding to training objects). Based on the training image/user interaction pairs and training object ground truths, the neural network learns to identify generic objects based on one or more training indicators. In particular, the neural network learns the appearance and shapes of targeted objects as well as how user input corresponding to various combinations of different input modalities corresponds to the target object.

The multi-modal selection system also utilizes a trained neural network to identify and select objects through iterative user interactions corresponding to various input modalities. For instance, in one or more embodiments, the multi-modal selection system receives user input corresponding to a first input modality, provides an object segmentation output for display, and allows for additional user input corresponding to additional input modalities until generating an acceptable result. In this manner, one or more embodiments of the multi-modal selection system generate and modify object boundaries based on iterative user input corresponding to various input modalities.

As mentioned above, in one or more embodiments, the multi-modal selection system can also utilize a multi-modal object segmentation neural network to generate user input suggestions. For example, the multi-modal selection system can identify regions of uncertainty within a digital image (e.g., based on the probability map discussed above) and suggest an additional user input of a particular input modality to resolve the uncertainty within the digital image. In this manner, the multi-modal selection system can suggest an additional user input that will more quickly lead to an accurate object segmentation output.

The multi-modal selection system provides many advantages and benefits relative to conventional systems. For example, by utilizing a multi-modal object selection neural network, which is able to accommodate and analyze various input modalities, the multi-modal selection system can more accurately identify target objects portrayed in a digital image. Indeed, utilizing an interactive deep learning approach, the multi-modal selection system can select any variety of target objects regardless of classification. The multi-modal selection system can also accurately select target objects that portray combinations of different objects or subparts of larger objects (e.g., select two out of three dogs or isolate a shirt on a person).

In addition, the multi-modal selection system can improve efficiency relative to conventional systems. For example, the multi-modal selection system can significantly reduce the time and number of user interactions required to identify target objects in digital images. Indeed, by utilizing a multi-modal object selection neural network, the multi-modal selection system can accurately identify target objects in a digital image with only a handful of user interactions (e.g., as few as two clicks).

Furthermore, the multi-modal selection system can also improve flexibility of implementing computing devices. For instance, the multi-modal selection system can analyze user input corresponding to a variety of different input modalities, including regional input modalities, boundary input modalities or language input modalities. Because some input modalities are more effective in particular circumstances than others, the multi-modal selection system can more flexibly identify target object using multiple different input modalities as required for the unique characteristics of particular digital images. Furthermore, the multi-modal selection system can flexibly identify target objects that have not been previously classified (e.g., a unique part of an engine that would not be identifiable using a rigid classification approach) or target objects that portray unique combinations of items (e.g., a group of animals).

As illustrated by the foregoing discussion, the present disclosure utilizes a variety of terms to describe features and benefits of the multi-treatment embedding selection system. Additional detail is hereafter provided regarding the meaning of these terms as used in this disclosure. For example, as used herein, the term "digital visual media" refers to any digital item capable of producing a visual representation. For instance, digital visual media includes digital images and digital video. As used herein, the term "digital image" refers to any digital symbol, picture, icon, or illustration. For example, the term "digital image" includes digital files with the following file extensions: JPG, TIFF, BMP, PNG, RAW, or PDF. Similarly, as used herein, the term "digital video" refers to a digital sequence of images. For example, the term "digital video" includes digital files with the following file extensions: FLV, GIF, MOV, QT, AVI, WMV, MP4, MPG, MPEG, or M4V.

Although much of the disclosure herein focuses on digital images, the multi-modal selection system can identify and select target objects with regard to any type of digital visual media. For instance, in addition to identifying objects in digital images, the multi-modal selection system can also identify objects portrayed in multiple images/frames in a digital video. Indeed, in one or more embodiments, the multi-modal selection system utilizes a trained neural network and user input to identify an object boundary or mask in a first image/frame of a digital video. Moreover, the multi-modal selection system then utilizes the object boundary or mask, in conjunction with the trained neural network, to identify a target object in one or more subsequent digital images/frames in the digital video.

As used herein, the term "target object" refers to an object reflected in digital visual media (that is sought) to be identified. For instance, a target object can include an object reflected in a digital image that a user or neural network seeks to identify or select. Accordingly, an "untargeted object" refers to an object reflected in digital visual media that is not sought to be identified or selected. Thus, for example, an untargeted object can include a background object that a neural network or a user does not seek to identify.

As used herein, the term "user input," refers to data generated in response to a user interaction. User input includes a user selection of a position and how the position relates to a target object. To illustrate, user input can include selection of one or more pixels within a digital image together with an indication as to how the one or more pixels correspond to a target object portrayed in the digital image. User input can take a variety of forms. For instance, user input can include data generated via a touch screen (e.g., a press, drag, and/or release event via a finger or stylus), a mouse (e.g., a click, drag, and/or release event), a keyboard (e.g., text input or input of a point or bounding shape), and/or microphone (e.g., verbal input comprising natural language expression).

As mentioned above user input can correspond to one or more input modalities. As used herein, the term "input modality" refers to a type or category of user input indicating how one or more pixels relates to a target object. For example, an input modality can include a regional input modality, a boundary input modality, or a language input modality. To illustrate a regional input modality refers to an indication that user input corresponds to a region within or outside a target object. Thus, a regional input modality can include a positive regional input modality (e.g., foreground points within a target object selected as a point or attention mask), a negative regional input modality (e.g., background points outside a target object selected as a point or soft click/scribble). Similarly, a boundary input modality refers to an indication that user input corresponds to a boundary or edge of a target object. Thus, a boundary input modality includes an edge point (e.g., a selection on or near an edge of a target object), a bounding shape (e.g., a selection encompassing or near to the boundary of a target object), or a loose boundary. Moreover, a language input modality refers to an indication that term(s) spoken or written correspond to a target object.

As used herein, the term "distance map" refers to a digital item that reflects a distance between a pixel and user input corresponding to a digital image. For instance, a distance map can include a database or digital file that includes distances between pixels in a digital image and pixels indicated by user input. For example, a positive distance map includes a digital item that reflects a distance between a pixel in a digital image and user input of a pixel that is part of a target object (e.g., a positive regional input modality). Similarly, a negative distance map includes a digital item that reflects a distance between a pixel and user input of a pixel that is not part of a target object (e.g., via a negative regional input modality). Moreover, a boundary distance map includes a digital item that reflects a distance between a pixel and user input of a pixel that corresponds to a boundary of a target object (e.g., via a boundary input modality).

As used herein, the term "neural network" refers to a machine learning model that can be tuned (e.g., trained) based on inputs to approximate unknown functions. In particular, the term "neural network" can include a model of interconnected neurons that communicate and learn to approximate complex functions and generate outputs based on a plurality of inputs provided to the model. For instance, the term "neural network" includes one or more machine learning algorithms. In particular, the term "neural network" includes deep convolutional neural networks (i.e., "CNNs"), fully convolutional neural networks (i.e., "FCNs"), or recurrent neural networks ("RNNs") such as long short term memory neural networks ("LSTMs"). In other words, a neural network is an algorithm that implements deep learning techniques, i.e., machine learning that utilizes a set of algorithms to attempt to model high-level abstractions in data. Moreover, as used herein, the term "multi-modal object selection neural network refers" to a neural network for generating object segmentation outputs based on user inputs corresponding to various input modalities.

As used herein, the term "training" is used as a modifier to describe information used to tune or teach a neural network. Thus, for example, the term "training digital image" refers to a digital image used to train a neural network. In addition, the term "training indicator" (or "training input") refers to an input corresponding to one or more input modalities utilized to train a neural network (e.g., input for training that approximates user input corresponding to input modalities). In particular, a training indicator can include a first position (e.g., pixel or collection of pixels in a digital image) relative to a training object portrayed in a training digital image. Moreover, a "training object" refers to an object portrayed in a digital training image. The term "training object" can also refer to a ground truth representation of an object portrayed in a training digital image used to train neural network.

In some circumstances herein, the term "training object ground truth" is used to refer to digital data identifying one or more characteristics of a training object (e.g., a training object portrayed in a training digital image). In particular, the term "training object ground truth" includes digital data identifying pixels representing a training object. For example, the term "training object ground truth" can refer to a ground truth mask (segmentation mask) or ground truth edge/boundary (segmentation boundary) reflecting the pixels representing a digital target object (or a digital untargeted object) in a training digital image. Moreover, a training object (i.e., a target training object or untargeted training object) with "training object ground truth" is sometimes referred to herein as an "identified" or "known" training object.

As used herein, the term "object segmentation output" (or "segmentation" or "object segmentation") refers to an indication of a plurality of pixels portraying one or more objects. For example, an object segmentation output can include a segmentation boundary (e.g., a boundary line or curve indicating an edge of one or more objects) or a segmentation mask (e.g., a binary mask identifying pixels corresponding to an object). Generating an object segmentation output is sometimes referred to as "selecting" a target object (i.e., identifying pixels that represent the target object).

As just mentioned, the multi-modal selection system can utilize a trained neural network to select a target object within a digital image based on user input corresponding to various input modalities. Moreover, the multi-modal selection system can train a neural network utilizing training indicators corresponding to the various input modalities and training digital images. Additional detail will now be provided through illustrative figures regarding the process of using and generating a trained neural network to select a target object (i.e., a multi-modal object selection neural network).

For example, FIG. 1 illustrates an overview of a process of generating an object segmentation output 110 utilizing a multi-modal object selection neural network 108. As illustrated, the multi-modal object selection neural network 108 can consider a variety of different user inputs corresponding to different input modalities. Specifically, the multi-modal object selection neural network 108 can analyze a digital image 100 and user input corresponding to a regional input modality 102, a boundary input modality 104, and/or a language input modality 106.

For example, as shown in FIG. 1, the multi-modal selection system identifies a positive user input 102a corresponding to a positive regional input modality (e.g., a positive or foreground click). The positive user input 102a identifies one or more pixels within a target object (e.g., a dog) portrayed within the digital image 100. Moreover, the multi-modal selection system identifies a negative user input 102b corresponding to a negative regional input modality (e.g., a negative or background click). The negative user input 102b identifies one or more pixels that are not within the target object (e.g., the dog) portrayed within the digital image 100.

In addition, as illustrated in FIG. 1, the multi-modal selection system identifies a first boundary user input 104a corresponding to the boundary input modality 104 and a second boundary user input 104b corresponding to the boundary input modality 104 (e.g., a first edge click and a second edge click). The boundary user inputs 104a-104b identify pixels corresponding to (i.e., at or near) the boundary/edge of the target object portrayed within the digital image 100.

As shown in FIG. 1, the multi-modal selection system also identifies a language user input 106a. The language user input 106a comprises a word (i.e., "dog") indicating the target object in the digital image. Although FIG. 1 illustrates a single word, the language user input 106a can comprise a variety of different words or phrases (e.g., "the dog on the left"). Similarly, although FIG. 1 illustrates a particular number of regional inputs or boundary inputs, the multi-modal selection system can consider any combination of any number of user inputs.

As mentioned, the multi-modal selection system can analyze user inputs corresponding to the regional input modality 102, the boundary input modality 104, and/or the language input modality 106 to generate the object segmentation output 110. Specifically, as shown in FIG. 1, the multi-modal selection system analyzes the digital image 100, the regional user inputs 102a-102b corresponding to the regional input modality 102, the boundary user inputs 104a-104b corresponding to the boundary input modality 104, and the language user input 106a corresponding to the verbal input modality 106 utilizing the multi-modal object selection neural network 108. The multi-modal object selection neural network 108 can then generate an object segmentation output 110. As illustrated the object segmentation output 110 can include a segmentation mask 110a and/or a segmentation boundary 110b.

The multi-modal selection system, via the multi-modal object selection neural network 108, can thus consider any variety (or combination) of input modalities and generate one or more object segmentation masks. For instance, the multi-modal selection system can analyze a first digital image based on a first user input corresponding to a positive regional input modality and a second user input corresponding to a boundary input modality to generate a first object segmentation output. The multi-modal selection system can then analyze a second digital image based on a third user input corresponding to a language input modality and a fourth user input corresponding to a negative regional input modality to generate a second object segmentation output. The multi-modal selection system can analyze a variety of different combinations of different user inputs and user input modalities to accurately identify a target object in a digital image. Indeed, the multi-modal selection system can analyze input of a single modality or a combination of modalities. For example, while FIG. 1 illustrates the multi-modal selection system using inputs from three different types of input modalities, in alternative implementations the multi-modal selection system can utilize input(s) of a single modality, inputs from two modalities, or inputs from more than three modalities.

Figure 2A:
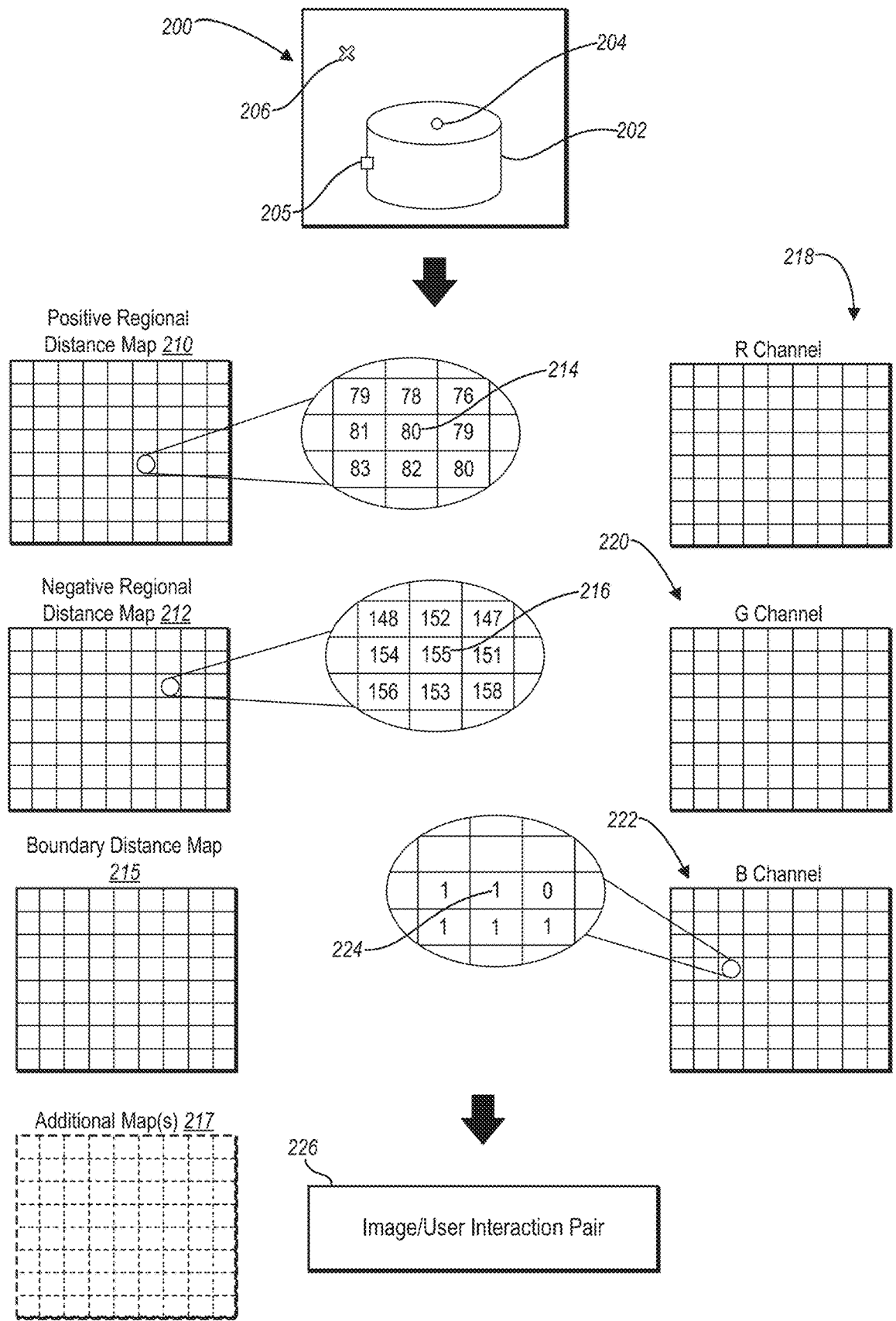
FIG. 2A illustrates a representation of generating multi-modal input data for a neural network from a digital image in accordance with one or more embodiments.
Figure 2B:
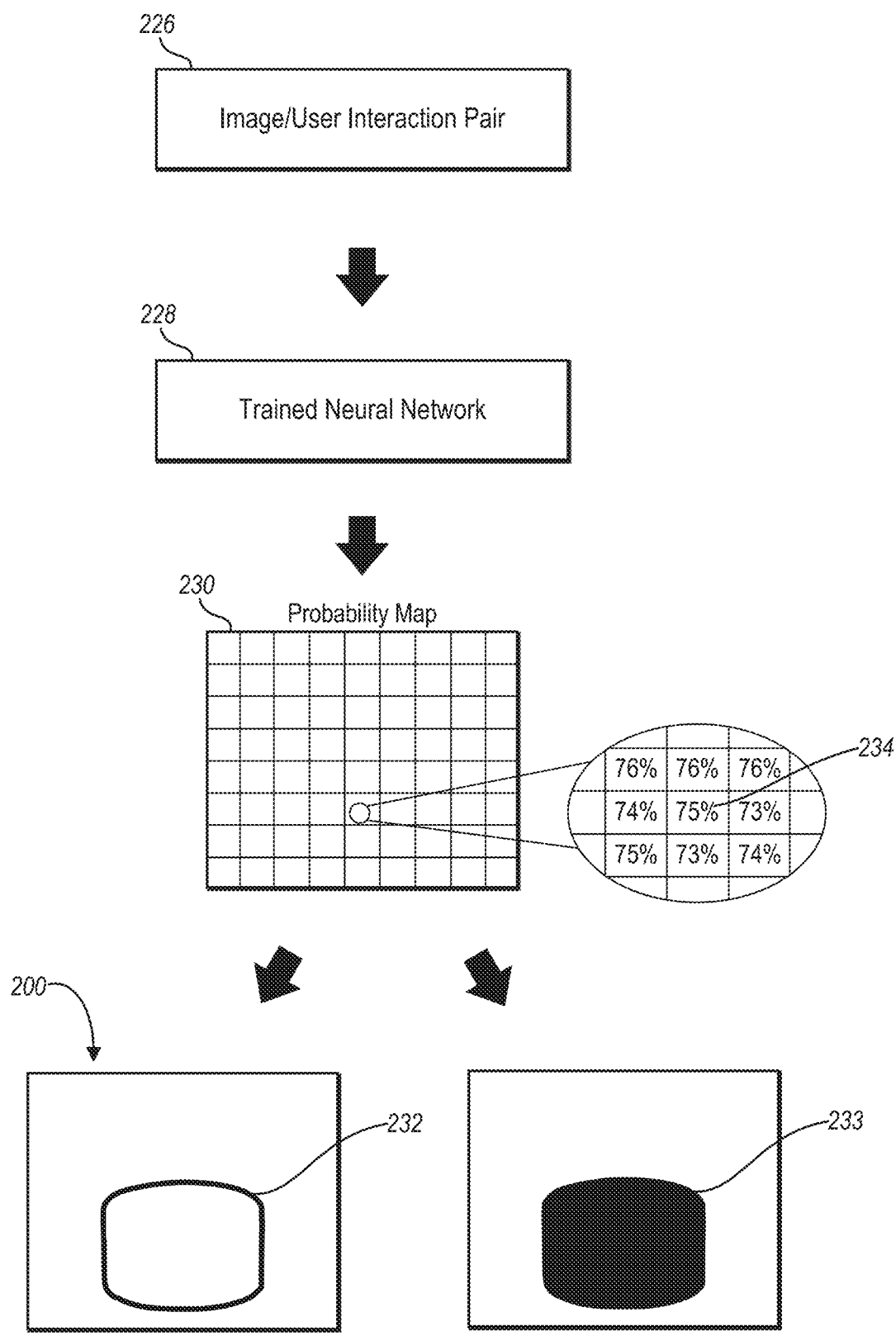
FIG. 2B illustrates a representation of selecting a target object in a digital image based on multi-modal input data for a neural network in accordance with one or more embodiments.

As mentioned above, the multi-modal selection system can utilize one or more distance maps to generate object segmentation outputs for a digital image. FIGS. 2A-2B, illustrate selecting objects (i.e., generating object segmentation outputs) in digital images utilizing a trained neural network in accordance with one or more embodiments. In particular, FIG. 2A illustrates an instance of digital visual media (i.e., a digital image 200) portraying a target object 202. FIG. 2A also illustrates a user input 204 corresponding to a positive regional input modality (e.g., a foreground click of a first pixel), a user input 206 corresponding to a negative regional input modality (i.e., a background click of a second pixel), and a user input 205 corresponding to a boundary input modality (i.e., an edge click of a third pixel).

As mentioned previously, the multi-modal selection system can utilize a digital image together with user inputs to generate distance maps. For example, as illustrated in FIG. 2A, the multi-modal selection system generates distance maps 210, 212, 215 (and/or additional map(s) 217) based on the digital image 200 and user input (i.e., the user inputs 204, 205, and 206). In particular, the multi-modal selection system generates the positive distance map 210 based on the user input corresponding to the positive regional input modality. Moreover, the multi-modal selection system generates the negative distance map 212 based on the user input 206 corresponding to the negative regional input modality. The multi-modal selection system generates the boundary distance map 215 based on the user input 205 corresponding to the boundary input modality.

For example, with regard to the embodiment of FIG. 2A, the positive distance map 210 comprises a two-dimensional matrix with entries for each pixel in the digital image 200. Specifically, the positive distance map 210 comprises a matrix with entries for pixels in the digital image 200, where each entry reflects the distance between the pixel corresponding to the entry and the user input 204 (i.e., the positive user indicator). Thus, as illustrated, an entry 214 in the positive distance map 210 reflects the distance (i.e., 80 pixels) between the pixel corresponding to the entry 214 and the pixel corresponding to the user input 204.

Similarly, the negative distance map 212 comprises a two-dimensional matrix with entries for pixels in the digital image 200. Specifically, each entry in the negative distance map 212 reflects the distance between the pixel corresponding to the entry and the user input 206 (i.e., the negative user indicator). Thus, as illustrated, an entry 216 reflects the distance (i.e., 155 pixels) between the pixel corresponding to the entry 216 and the pixel corresponding to the user input 206. In similar fashion, the boundary distance map 215 comprises a two-dimensional matrix where each entry in the boundary distance map 215 reflects the distance between the pixel corresponding to the entry and the user input 205 (i.e., the boundary user indicator).

With regard to generating distance maps, the multi-modal selection system can utilize a variety of distance metrics. For instance, the multi-modal selection system calculates Euclidean distances, geodesic distances, or vector fields. For example, in one or more embodiments, the distance map utilizes a Euclidean distance to determine a straight-line distance between two pixels.

In addition, however, in one or more embodiments, the multi-modal selection system utilizes a geodesic distance that follows curved paths. In particular, in one or more embodiments, the multi-modal selection system calculates a geodesic distance that utilizes curved paths to stay inside (e.g., traverse along) a particular color (or range of colors) within a digital image. For example, the multi-modal selection system can utilize a geodesic distance that identifies a distance between two pixels by staying within a particular color (or range of colors) and avoiding (i.e., going around) colors that are outside the particular color (or range of colors). Moreover, the multi-modal selection system can utilize any type or variety of distance units.

In some embodiments, the multi-modal selection system can generate distance maps by utilizing Gaussian functions that do not linearly change with distance, such as exp(−k (Euclidean distance)^2). See, e.g., Hoang Le, Long Mai, Brian Price, Scott Cohen, Hailin Jin, and Feng Lui, Interactive Boundary Prediction for Object Selection, ECCV 2018. For instance, in one or more embodiments, the multi-modal selection system creates one mask for each click point that reflects a Gaussian surrounding the click point. Moreover, the multi-modal selection system combines the masks by using a max operator at each pixel. The resulting map forms an inverted distance transform from the click points. In such embodiments, the closer a pixel location within the distance map to a user click point, the higher its value. In addition, although the change in value is not linear with the Euclidean distance the distance map still reflects distance from various click points.

Although FIG. 2A illustrates a three user inputs corresponding to three different input modalities, it will be appreciated that the multi-modal selection system can also generate distance maps based on additional (or fewer) user inputs. For example, in circumstances where the multi-modal selection system receives a plurality of positive user inputs corresponding to positive regional input modalities, the multi-modal selection system generates a positive distance map that reflects the distance between a pixel and the nearest positive user input. Similarly, in circumstances where the multi-modal selection system receives a plurality of boundary user inputs corresponding to one or more boundary input modalities, the multi-modal selection system generates a boundary distance map that reflects the distance between a pixel and the nearest boundary user input. In yet other embodiments, the multi-modal selection system generates a separate distance map for each user input. Although the distance maps 210, 212, 215 comprise matrices, it will be appreciated that a distance map can be generated or stored in any form. For example, the distance maps 210, 212, 215 can be implemented as databases, spreadsheets, text files, array, or any other type of digital item.

Moreover, although FIG. 2A illustrates a particular number of distance maps it will be appreciated that one or more embodiments utilize fewer or additional distance maps. For example, in one or more embodiments, multi-modal selection system creates a single distance map reflecting distances between user inputs. In other embodiments, the multi-modal selection system generates additional distance maps (e.g., a distance map for every positive user input, every negative user input, or every boundary user input).

In addition to distance maps, the multi-modal selection system also utilizes one or more color channels. For example, with regard to the embodiment of FIG. 2A, the multi-modal selection system utilizes three color channels, an R channel 218 (corresponding to red colors), a G channel 220 (corresponding to green colors), and a B channel 222 (corresponding to blue colors). In particular, in one or more embodiments, each color channel 218-222 comprises a two-dimensional matrix with entries for each pixel in the digital image 200. Specifically, as shown, the B channel 222 comprises a matrix with entries for each pixel in the digital image 200, where each entry (e.g., an entry 224) reflects the amount of blue corresponding to each pixel. Thus, the entry 224, corresponding to a pixel with very little blue color, reflects a low value (i.e., one) in the B channel 222.

Although illustrated as three separate channels, the multi-modal selection system can utilize fewer or more channels. For example, the multi-modal selection system can utilize four color channels in conjunction with CMYK images. Similarly, the multi-modal selection system can utilize a single color channel with regard to gray scale images.

Moreover, although illustrated as R, G, and B channels with regard to FIG. 2A, it will be appreciated that the multi-modal selection system can utilize a variety of other colors or color spaces for color channels. For instance, in one or more embodiments, the multi-modal selection system utilizes an LAB color space and LAB color channels rather than an RGB color space and RGB color channels. Moreover, as just mentioned, the multi-modal selection system can utilize CMYK images, gray scale images, or other images.

Additionally, the multi-modal selection system can convert from one type of color image to another. In particular, the multi-modal selection system can convert a CMYK image to an RGB image (or vice versa). In one or more embodiments, the multi-modal selection system can convert a gray scale input image to color by repeating the gray scale channel three time to make equal R, G, and B values at each pixel.

In one or more embodiments the multi-modal selection system generates an image/user interaction pair. As used herein, the term "image/user interaction pairs" refers to a combination of data reflecting the contents of a digital image and data reflecting user interaction or user inputs with regard to a digital image. Thus, for instance the term "image/user interaction pairs" includes a combination of distance maps and color channels. More specifically, the term "image/user interaction pairs" can include a combination of two or more distance maps (e.g., corresponding to positive user input, negative user input, and/or boundary user input) and three color channels (e.g., corresponding to R, G, and B colors of the digital image, respectively). In particular, the multi-modal selection system generates an image/user interaction pair based on distance maps and color channels. For example, FIG. 2A illustrates generating an image/user interaction pair 226. In particular, the image/user interaction pair 226 is a combination of user interaction data reflected in the distance maps 210, 212, and 215 and image data reflected in color channels 218-222.

In one or more embodiments, the multi-modal selection system utilizes a series of equations and algorithms to generate the image/user interaction pair 226. For example, in one or more embodiments, the multi-modal selection system defines a sequence of user inputs, $\mathcal{S}$, that include a set of positive user inputs, $\mathcal{S}^1$ (e.g., the user input 204), and a set of boundary user inputs (or negative user inputs or other types of input), $\mathcal{S}^0$ (e.g., the user input 205 or the user input 206). In one or more embodiments, the multi-modal selection system utilizes Euclidean distance transformation (or some other distance measure, such as a truncated distance map or non-linear gaussian distribution) to transform $\mathcal{S}^1$ and $\mathcal{S}^0$ to separate channels $U^1$ (e.g., the positive distance map 210) and $U^0$ (e.g., the boundary distance map 215 or the negative distance map 212), respectively. Each channel, $U^1$ and $U^0$, reflects a two-dimensional matrix with the same height and width as a digital image (e.g., the digital image 200). More particularly, the number of rows in the matrix equates to the number of pixel rows in the digital image, and the number of columns in the matrix equates to the number of pixels columns in the digital image.

To calculate the distance value $u_{ij}^t$ (e.g., the entry 214 in the positive distance map 210 or another entry in another distance map) at the location (i,j), $t \in \{0,1\}$, in one or more embodiments the multi-modal selection system defines an operator, f, that calculates the minimum Euclidean distance between a point (e.g., a pixel in the digital image 200) and a set (e.g., a set of positive user inputs including the positive user input 204). In other words, the multi-modal selection system defines operator f such that given a set of points $p_{ij} \in \mathcal{A}$ where (i,j) is the point location, then for any point $p_{m,n}|$ $\mathcal{A} = \min_{\forall p_{ij} \in \mathcal{A}} \sqrt{(m-i)^2 + (n-j)^2}$. Moreover, the multi-modal selection system can define $u_{ij}^t$ (e.g., individual entries in the distance maps) by the following:

$$u_{ij}^t = f(p_{ij}|\mathcal{S}^t), t \in \{0,1\}$$

In one or more embodiments, for the efficiency of data storage, the multi-modal selection system takes the unsigned integer part of $u_{ij}^t$ and truncates it at 255.

Accordingly, with regard to the embodiment of FIG. 2A, the multi-modal selection system generates the positive distance map 210 and the boundary distance map 215 utilizing the channels $U^1$ and $U^0$. For instance, the channel $U^1$ provides the matrix illustrated with regard to positive distance map 210. Moreover, the multi-modal selection system combines color channels 218-222 with the distance maps reflecting $U^1$ and $U^0$ to generate the image/user interaction pair 226. Although the foregoing example describes two distance maps, $U^1$ and $U^0$, as illustrated in FIG. 2A, the multi-modal selection system can utilize a number of different distance maps (e.g., three distance maps, four distance maps, or more).

Indeed, although the foregoing discussion focuses generally on the particular input modalities illustrated in FIG. 2A (e.g., positive click, negative click, and edge click), the multi-modal selection system can generate maps and image/user interaction pairs based on user input corresponding to any input modality discussed herein. Indeed, as shown, the multi-modal selection system can also generate additional map(s) 217. For example, the multi-modal selection system can generate the additional map(s) 217 based on language input (e.g., natural language expression). Similarly, the multi-modal selection system can generate the additional map(s) 217 as an additional boundary distance map (e.g., based on a bounding shape or loose boundary) or as an additional regional distance map (e.g., based on an attention mask and/or soft clicks/scribbles).

With regard to language input, the multi-modal selection system can generate the additional map(s) 217 by generating an embedding of a word or phrase. For example, the multi-modal selection system can utilize a recurrent neural network (RNN) to generate an embedding (e.g., vector representation) from the language input. The multi-modal selection system can concatenate the encoded vectors (and optionally, spatial coordinates) with the image features (e.g., the other maps 210, 212, 215, 218, 220, 222) to generate the image/user interaction pair 226. For example, in one or more embodiments, the multi-modal selection system generates an embedding based on language input by utilizing the approach described in C. Liu, Z. Lin, X. Shen, J. Yang, X. Lu and A. Yuile, Recurrent multimodal interaction for referring image segmentation, ICCV (2017) and R. Hu, M. Rohrbach, T. Darrel, Segmentation from natural language expressions, ECCV (2016), which are incorporated herein by reference in their entirety.

As mentioned, the multi-modal selection system can also generate the additional map(s) 217 as a boundary distance map based on a bounding shape. The multi-modal selection system can incorporate bounding shapes (e.g., bounding boxes) utilizing a variety of approaches. For example, in one or more embodiments, the multi-modal selection system transforms a bounding shape (e.g., a bounding box) to a signed Euclidean distance transform map as an additional channel (e.g., the additional map(s) 217).

In such embodiments, the bounding box serves as a soft constraint. In particular, the multi-modal selection system feeds the distance map corresponding to the bounding box to the neural network for consideration with the other user inputs corresponding to the other input modalities. The neural network can then analyze all of the distance maps and determine the most likely object segmentation output. The multi-modal selection system can incorporate a variety of bounding shapes (including shapes with curve-based input). In one or more embodiments, the multi-modal selection system utilizes generates a distance map from bounding shapes by using the approach described by N. Xu, B. Price, S. Cohen, J. Yang, and T. S. Huang, Deep GrabCut for object selection, BMVC (2017), which is incorporated herein by reference in its entirety.

In addition to generating a distance map utilizing a bounding box, in one or more embodiments, the multi-modal selection system applies a constraint based on a bounding shape. In particular, the multi-modal selection system can limit the object segmentation output to within the bounding shape. To illustrate, the multi-modal selection system can crop the input image based on the bounding shape before passing to the neural network. The neural network then only analyzes the digital image within the bounding shape for an object segmentation output. This approach zooms into a tight region surrounding the target object, allowing sharper object segmentation output and eliminating false positives that fall outside the bounding box. In such embodiments, the bounding box works as a hard constraint where all the regions outside the bounding box are classified as background.

As mentioned above, the multi-modal selection system can also accommodate attention masks (e.g., an attention map) as an input modality. An attention mask (or map) can include a dense form of foreground scribbles that serves as a spatial prior to guide object selection. For instance, in one or more embodiments, the multi-modal selection system can accommodate an attention map as described by Y. Wang, Z. Lin, X. Shen, J. Zhang and S. Cohen, Concept mask: large-scale segmentation from semantic concepts, *ECCV* (2018), which is incorporated by reference in its entirety. The multi-modal selection system can generate a distance map based on the attention mask (e.g., a positive distance map reflecting distances between pixels of the digital image and any identified positions of the attention mask).

The multi-modal selection system can also accommodate soft clicks/scribbles as an input modality. Soft clicks/scribbles refer to user inputs that roughly localize a target object in a digital image. For example, with regard to a thin structured object (such as a tree or fence), the multi-modal selection system can receive soft scribbles that roughly identify the location of the object. Some of the clicks/scribbles may be within the tree or fence, but some may not be within the tree or fence (but are in close proximity). The multi-modal selection system can generate a distance map (e.g., a regional distance map) that reflects distances between the user input and the pixels of the digital image. The multi-modal selection system can train and apply a neural network to accurately analyze soft clicks/scribbles (e.g., as an input modality) in generating an object segmentation output. As mentioned, however, the multi-modal selection system can accommodate any variety or combination of input modalities.

As mentioned previously, the multi-modal selection system can provide information regarding a digital image and user inputs corresponding to various input modalities to a trained neural network to identify and select a target object. More particularly, the multi-modal selection system can provide an image/user interaction pair to a trained neural network to identify and select a target object.

FIG. 2B illustrates the multi-modal selection system providing the image/user interaction pair 226 to a trained neural network 228. Moreover, FIG. 2B shows the trained neural network 228 generating a probability map 230 and utilizing the probability map 230 to generate object segmentation outputs (i.e., a segmentation boundary 232 and/or a segmentation mask 233). In this manner, the multi-modal selection system identifies pixels representing the target object 202.

The multi-modal selection system utilizes one or more deep learning algorithms to generate the trained neural network 228. In particular, the multi-modal selection system utilizes a fully convolutional neural network. For example, the multi-modal selection system utilizes a fully convolutional neutral network as described in J. Long, E. Shelhamer, and T. Darrell, *Fully Convolutional Networks for Semantic Segmentation, arXiv preprint arXiv:* 1411.4028, 2014, with some modifications. The entire contents of the foregoing paper are hereby incorporated by reference. For instance, with regard to the embodiment of FIG. 2B, the multi-modal selection system utilizes a fully convolutional neural network modified such that input data has five or more channels (e.g., at least two channels corresponding to distance maps and three channels corresponding to color channels, as illustrated in FIG. 2A). For example, in relation to FIGS. 2A-2B, the multi-modal selection system utilizes a fully convolutional neural network with seven input channels. The multi-modal selection system can utilize a convolutional network with additional input channels (e.g., eight channels, nine channels, ten channels, or additional input modalities to accommodate each input modality referenced herein).

As mentioned, the multi-modal selection system utilizes the trained neural network 228 to generate the probability map 230. As used herein, the term "probability map" refers to a digital item that reflects the likelihood that a pixel is part of a target object. For instance, a probability map can include a two-dimensional matrix with entries corresponding to pixels in a digital image, wherein each entry reflects the likelihood that the corresponding pixel is part of a target object. For example, as illustrated, the trained neural network 228 utilizes the image/user interaction pair 226 (comprising two or more distance channels and three color channels) to generate the probability map 230. In particular, the probability map 230 is a matrix that reflects, for each pixel in the digital image 200, the likelihood that the pixel is part of the target object 202. Specifically, as illustrated, the probability map 230 includes an entry 234 reflecting the likelihood (i.e., 75%) that the pixel corresponding to the entry 234 is part of the target object 202.

Although illustrated as a percentage with regard to FIG. 2B, a probability map can utilize a variety of different values to reflect a likelihood. For instance, in one or more embodiments, the multi-modal selection system generates a probability map comprised of selection scores. Moreover, in such embodiments, the selection scores can be expressed in a unit or value other than a percentage.

As discussed previously, the multi-modal selection system can utilize a probability map to select a target object in a digital image. For example, in one or more embodiments, the multi-modal selection system selects a target object by applying a threshold to a probability map. For instance, in one or more embodiments, the multi-modal selection system identifies a threshold (e.g., 50%) and if a value of the probability map exceeds the threshold (e.g., exceeds 50%), the multi-modal selection system determines that the pixel corresponding to the value of the probability map is part of the target object. In this manner, the multi-modal selection system can identify pixels belonging to a target object and select pixels belonging to the target object. Moreover, the multi-modal selection system can identify an object boundary for the target object (e.g., by identifying pixels along the edge of the target object).

In addition, one or more embodiments of the multi-modal selection system utilize a graph cuts optimization algorithm to select a target object. In particular, one or more embodiments of the multi-modal selection system utilize graph cuts optimization to refine an object boundary corresponding to a target object. By combining fully convolutional neural networks (i.e., a probability map resulting from a fully convolutional neural network) with graph cuts optimization, in one or more embodiments, the multi-modal selection system achieves near perfect interactive segmentation results with minimal user interactions.

For instance, consider a probability map, Q (e.g., the probability map 230), of which the entry $q_{ij}$ indicates the likelihood that pixel $p_{ij}$ is part of the target object. In one or more embodiments, the multi-modal selection system integrates Q into the graph cuts optimization $$\min \lambda \cdot R(L) + B(L)$$

where $\lambda$ is a coefficient that specifies a relative importance between R(L) and B(L).

The first term is defined as:

$$R(L) = \sum_{p_{ij} \in P} R_{p_{ij}}(L_{p_{ij}})$$

where $R_{p_{ij}}(L_{p_{ij}})$ estimates the penalty of assigning pixel $p_{ij}$ to label $L_{p_{ij}}$. In one or more embodiments, the multi-modal selection system defines:

$$R_{p_{ij}}(L_{p_{ij}}) = \begin{cases} -\log(q_{ij}), & \text{if } L_{p_{ij}} = \text{"object"} \\ -\log(1-q_{ij}), & \text{otherwise} \end{cases}$$

In addition, the second term is defined as:

$$B(L) = \sum_{\{p_{ij}, p_{mn}\} \in N} B_{\{p_{ij}, p_{mn}\}} \cdot \delta(L_{p_{ij}}, L_{p_{mn}})$$

where $B_{\{p_{ij}, p_{mn}\}}$ comprises the properties of object boundaries. In one or more embodiments, the multi-modal selection system defines $$B_{\{p_{ij}, p_{mn}\}} \propto \exp\left(-\frac{(I_{p_{ij}} - I_{p_{mn}})^2}{2\sigma^2}\right) \cdot \frac{1}{dist\{p_{ij}, p_{mn}\}}$$

Moreover, in one or more embodiments, the multi-modal selection system solves min $\lambda \cdot R(L) + B(L)$ utilizing max-flow/min-cut energy minimization. In this manner, the multi-modal selection system can integrate graph cuts optimization with a neural network to refine an object boundary with regard to a target object. More particularly, with regard to the embodiment of FIG. 2B, the multi-modal selection system utilizes graph cuts optimization in conjunction with the probability map 230 to generate the segmentation boundary 232 corresponding to the target object 202.

In one or more embodiments, the multi-modal selection system applies one or more thresholds in conjunction with graph cut optimization. For example, the multi-modal selection system can apply a threshold to the probability map (e.g., a threshold that filters values in the probability map that are less than 50%). In other words, the multi-modal selection system can filter out pixels having a probability of less than 50% that they are part of the target object. Furthermore, the multi-modal selection system can apply graph cut optimization to the filtered result.

In one or more embodiments, the multi-modal selection system generates a boundary segmentation (e.g., an edge prediction) utilizing an edge prediction branch of the trained neural network 228. For example, the multi-modal selection system can utilize an edge prediction branch comprising an additional decoder for edge prediction. To illustrate, the multi-modal selection system can analyze latent features within the neural network and utilize the edge prediction branch to generate a separate probability map. The multi-modal selection system can then utilize the separate probability map to generate the segmentation boundary 232.

Although FIGS. 2A-2B illustrate object segmentation outputs generated from an initial set of user inputs (e.g., the user inputs 204, 205, and 206), it will be appreciated that the multi-modal selection system can receive additional user inputs and interactively update an object boundary based on the additional user inputs. For example, with regard to FIGS. 2A-2B, if the segmentation boundary 232 fails to accurately capture all of the pixels of the target object 202, a user can provide one or more additional regional user inputs and/or one or more additional boundary user inputs. In response, in one or more embodiments, the multi-modal selection system generates modified distance maps (to reflect the additional one or more user inputs), a new image/user interaction pair, a new probability map (utilizing the trained neural network 228), and a modified object boundary. In this manner, the multi-modal selection system can iteratively incorporate user interaction with deep learning techniques to accurately select a target object in a digital image.

Figure 2C:
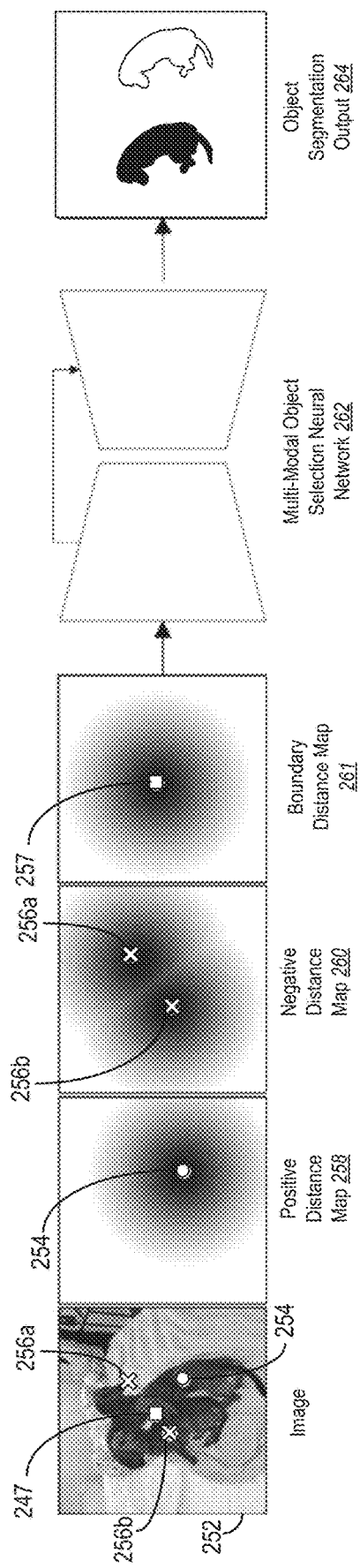
FIG. 2C illustrates a representation of selecting a target object utilizing user input corresponding to multiple input modalities in accordance with one or more embodiments.

For example, FIG. 2C illustrates utilizing multiple user inputs corresponding to multiple input modalities to select a target object in accordance with one or more embodiments. In particular, FIG. 2C illustrates a digital image 250 with a target object 252 (i.e., a single dog in a group of dogs). The multi-modal selection system identifies a positive user input 254 corresponding to a positive region input modality, negative user inputs 256a-256b corresponding to negative regional input modality, and a boundary user input 257 corresponding to a boundary regional input modality. As illustrated, the multi-modal selection system transforms the positive user input 254 to a positive distance map 258, transforms the negative user inputs 256a-256b to a negative distance map 260, and transforms the boundary user input 257 to a boundary distance map 261. The distance maps 258, 260, 261 reflect distances between pixels in the digital image 250 and the user inputs 254, 256a-b, and 257, respectively. In particular, the multi-modal selection system generates the distance maps 258, 260, 261 by converting distances between pixels and the user inputs into gray scale (e.g., the lower the distance to a user input, the darker the pixel in the distance map).

As illustrated, the multi-modal selection system provides the distance maps 258, 260, 261 (together with one or more color channels) to the trained neural network 262. In particular, the multi-modal selection system concatenates the distance maps (and color channels) into an image/user interaction pair and provides the image/user interaction pair to the trained neural network 262. In one or more embodiments, the image/user interaction pair also includes an indication of the input modalities reflected by the user inputs (e.g., to guide the user inputs to a particular input channel). Moreover, utilizing the trained neural network 262, the multi-modal selection system generates object segmentation outputs 264 reflecting the pixels included in the target object 252. In this manner, the multi-modal selection system can select a target object utilizing multiple user inputs corresponding to various input modalities.

Upon selecting a target object, the multi-modal selection system can also modify the target object. For example, the multi-modal selection system modifies the appearance, color, location, size, hue, or orientation of a target object. Similarly, the multi-modal selection system can copy or paste the target object (e.g., copy the target object and past the target object into another image). Moreover, the multi-modal selection system can delete the target object (e.g., remove the target object from the digital image).

Figure 3A:
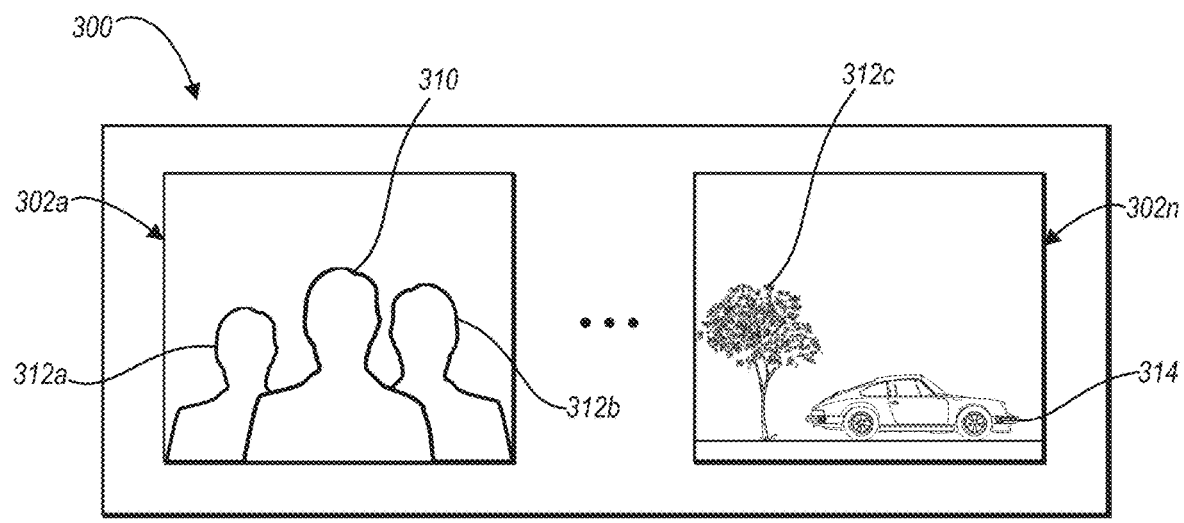
FIG. 3A illustrates a representation of a repository of training digital images in accordance with one or more embodiments.
Figure 3B:
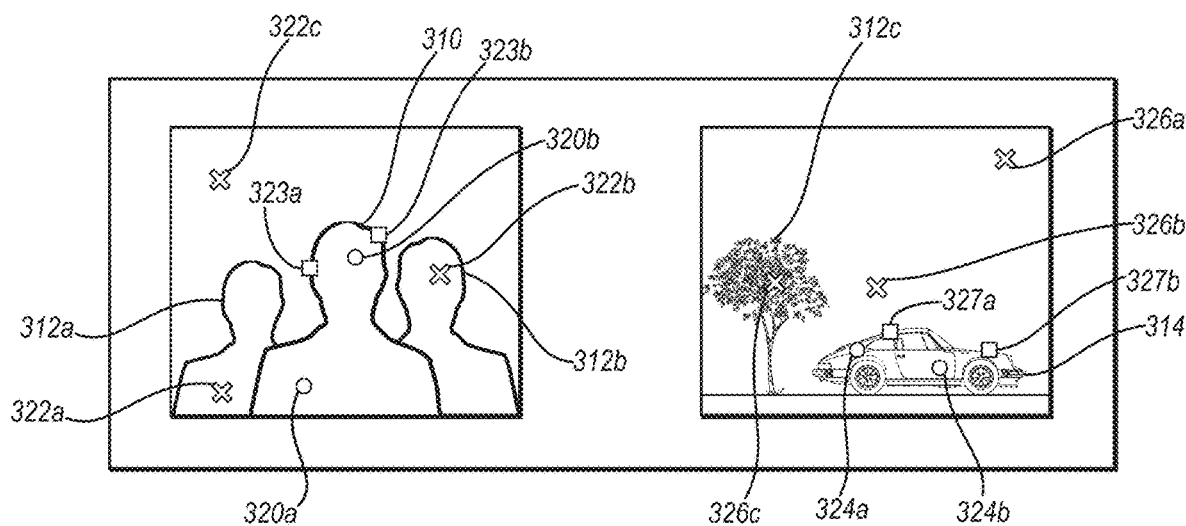
FIG. 3B illustrates a representation of training indicators corresponding to multiple input modalities in accordance with one or more embodiments.

As mentioned above, in one or more embodiments, the multi-modal selection system also generates training data (e.g., training indicators corresponding to different input modalities from training digital images) for training a neural network. For example, FIGS. 3A-3B illustrate utilizing a repository 300 of training digital images to generate training indicators corresponding to different input modalities for a neural network in accordance with one or more embodiments. Specifically, FIG. 3A illustrates a representation of a repository 300 comprising training digital images 302a-302n that portray training objects 310-314. Moreover, the repository 300 includes training object ground truths (e.g., object boundaries or ground truth masks) corresponding to the training objects 310-314. Thus, the training objects 310-314 are "identified" objects.

The repository 300 can comprise any group or collection of digital media items. For instance, in one or more embodiments, the repository 300 comprises a repository of digital images stored on a remote server. For example, in one or more embodiments, the repository 300 comprises the Pascal segmentation dataset, the MS coco dataset, or another dataset. Furthermore, as mentioned above the repository 300 can include digital images where target objects have been previously identified (e.g., segmentation boundaries and/or segmentation masks have been generated).

Moreover, as mentioned previously, the multi-modal selection system can utilize sampling strategies to generate training indicators with regard to training digital images. In particular, the multi-modal selection system can utilize sampling strategies that model user input patterns. For instance, the multi-modal selection system generates positive training indicators corresponding to positive regional input modalities (i.e., training indicators that are part of target training objects in training digital images), negative training indicators corresponding to negative regional input modalities (i.e., training indicators that are not part of target training objects in training digital images), boundary training indicators corresponding to boundary input modalities (i.e., training indicators corresponding to boundaries of target training objects in digital training images).

For example, as illustrated in FIG. 3B the multi-modal selection system generates positive training indicators 320a, 320b corresponding to the target training object 310 (i.e., positive training indicators within the target training object 310). Moreover, the multi-modal selection system generates negative training indicators 322a-322c outside the target training object 310 (i.e., in the background of the training digital image 302a). In addition, the multi-modal selection system generates boundary training indicators 323a-323a-323b along a boundary of the target training object 310. Similarly, the multi-modal selection system generates positive training indicators 324a, 324b within the target training object 314, negative training indicators 326a-326c outside the target training object 314, and boundary training indicators 327a-327b along the boundary of the target training object 314.

It should be noted that the multi-modal selection system can generate negative training indicators corresponding to untargeted objects. Thus, as illustrated in FIG. 3B, the multi-modal selection system generates the negative training indicator 322a within the untargeted object 312a, and the negative training indicator 322b within the untargeted object 312b. Similarly, as illustrated, the multi-modal selection system generates the negative training indicator 326c within the untargeted object 312c.

The multi-modal selection system can utilize a variety of sampling approaches to generate training indicators. For instance, in one or more embodiments, the multi-modal selection system utilizes random sampling techniques to model user input patterns. In other embodiments, the multi-modal selection system utilizes sampling techniques selected to cover a target object or an area around a target object. Moreover, on other embodiments, the multi-modal selection system utilizes random sampling techniques within untargeted objects.

Figure 4A:
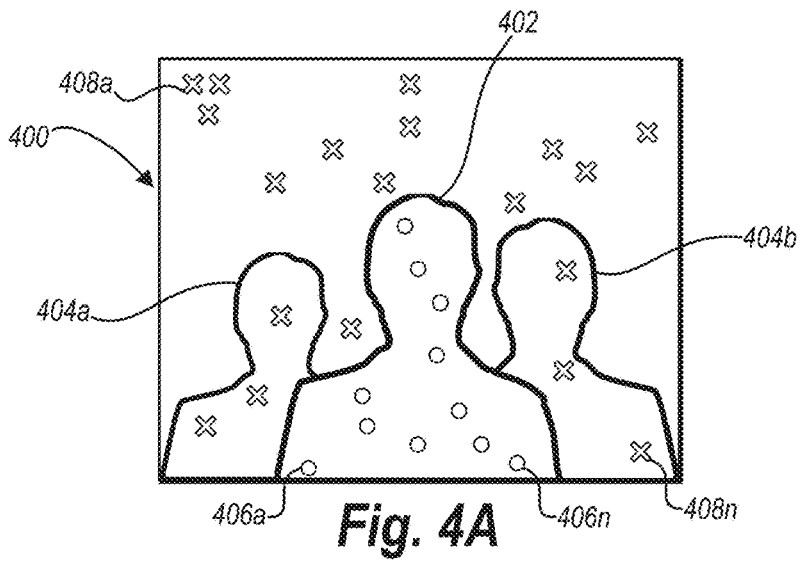
FIGS. 4A-4C illustrate an overview of generating training indicators for regional input modalities in accordance with one or more embodiments.
Figure 4B:
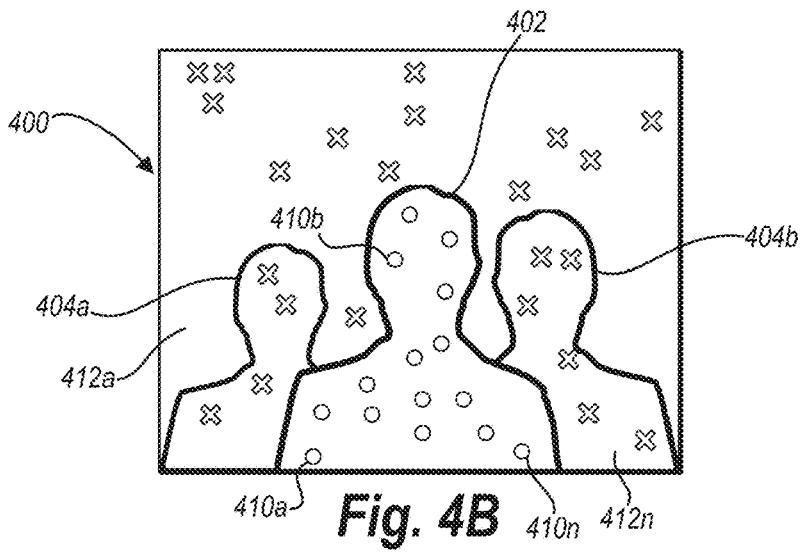
Figure 4C:
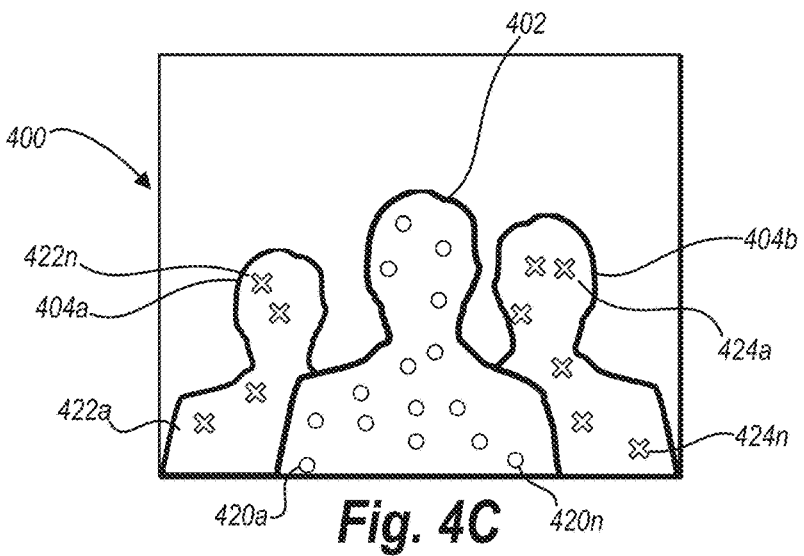
Figure 4D:
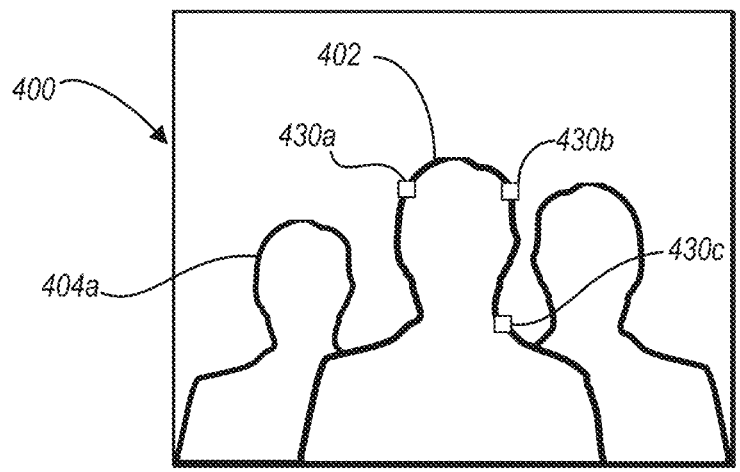
FIGS. 4D-4E illustrate an overview of generating training indicators for a boundary input modality in accordance with one or more embodiments.
Figure 4E:
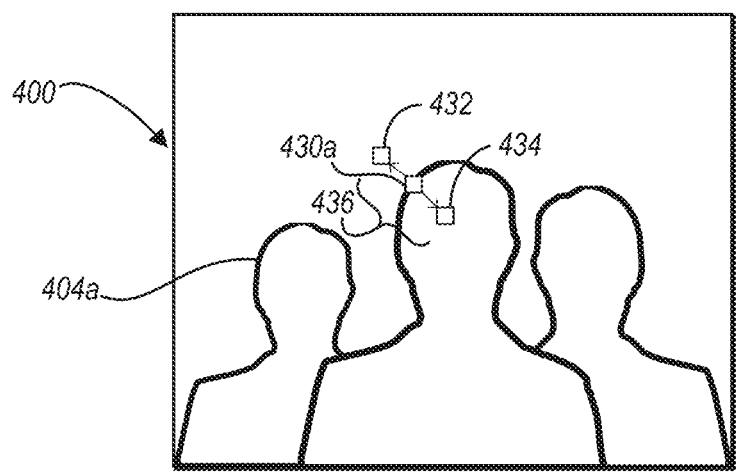

For example, FIGS. 4A-4E illustrate sampling training indicators in accordance with one or more embodiments. In particular, FIGS. 4A-4C illustrate sampling positive training indicators and negative training indicators. FIGS. 4D-4E illustrate sampling boundary training indicators.

Specifically, FIG. 4A illustrates a training digital image 400 (i.e., the training digital image 302a). The training digital image 400 portrays a target training object 402 and untargeted training objects 404a-404b. Moreover, the multi-modal selection system samples positive training indicators 406a-406n and negative training indicators 408a-408n.

As just mentioned, the multi-modal selection system can randomly generate positive training indicators from an area within a target training object. Moreover, in one or more embodiments, the multi-modal selection system randomly generates negative samples from an area outside the target training object. In accordance with these embodiments, FIG. 4A illustrates the multi-modal selection system generating the positive training indicators 406a-406n by randomly sampling the area within the target training object 402. FIG. 4A illustrates the multi-modal selection system generating the negative training indicators 408a-408n by randomly sampling the area outside the target training object 402.

In some circumstances, however, random sampling fails to provide sufficient information regarding boundaries, shapes, or features of target training objects in training a neural network. Accordingly, in one or more embodiments, the multi-modal selection system samples training indicators based on the location of (or distance to) other training indicators. More specifically, in one or more embodiments, the multi-modal selection system samples positive training indicators to cover the target training object with positive training indicators. Similarly, in one or more embodiments, the multi-modal selection system samples negative training indicators to surround the target training object with negative training indicators.

For example, FIG. 4B illustrates the training digital image 400 with positive training indicators 410a-410n and negative training indicators 412a-412n corresponding to the target training object 402. The multi-modal selection system generates the positive training indicators 410a-410n such that the positive training indicators are spread across a target training object. In particular, the multi-modal selection system randomly samples a pixel within the target training object as the positive training indicator 410a. Then, the multi-modal selection system computes the minimum distances of pixels in the target training object 402 to pixels outside the target training object 402 and to the sampled pixel. In one or more embodiments, the pixel location having the largest distance (based on the computed minimum distances) will be sampled as a new positive training indicator. In particular, utilizing this approach, the multi-modal selection system identifies the positive training indicator 410b. Moreover, the multi-modal selection system continues sampling until generating the positive training indicators 410a-410n.

Similarly, the multi-modal selection system generates the negative training indicators 412a-412n such that the negative training indicators are spread around the target training object 402. In particular, the multi-modal selection system randomly samples a pixel that does not belong to the target training object 402 as the negative training indicator 412a. Moreover, the multi-modal selection system computes the minimum distances of pixels not within the target training object 402 to pixels belonging to the target training object 402 and to the pixel corresponding to the negative training indicator 412a. In one or more embodiments, the pixel location having the largest distance (based on the computed minimum distances) will be sampled as a new negative training indicator. In particular, utilizing this approach, the multi-modal selection system identifies the negative training indicator 412b. Moreover, the multi-modal selection system continues sampling until generating negative training indicators 412a-412n.

In other embodiments, the multi-modal selection system samples positive training indicators and/or negative training indicators from regions in close proximity to a target training object. For example, the multi-modal selection system can sample positive training indicators within the target training object 402 and within a particular distance to the target training object 402. Similarly, the multi-modal selection system can sample negative training indicators from an area outside the target training object 402 but within a particular distance to the target training object 402.

In some circumstances, however, sampling based on a location of (or distance to) a target object or training indicator can lead to a strong pattern in the training indicators. Moreover, strong patterns in the training data can result in biased training of a neural network. For example, a neural network can improperly learn to select a target object based on a distance or spread present in the training indicators, a distance or spread that does not correspond to real-world user input. Accordingly, in one or more embodiments, the multi-modal selection system samples positive training indicators randomly from within a target object and samples negative training indicators from untargeted objects.

For example, FIG. 4C illustrates the training digital image 400 with positive training indicators 420a-420n and negative training indicators 422a-422n and 424a-424n. In particular, FIG. 4C illustrates the negative training indicators 422a-422n within the untargeted object 404a and the negative training indicators 424a-424n within the untargeted training object 404b. The multi-modal selection system generates the positive training indicators 420a-420n by randomly sampling pixels within the target training object 402. Accordingly, the positive training indicators 420a-42n reflect a random distribution of pixels within the target training object 402.

Similarly, the multi-modal selection system generates the negative training indicators 422a-422n and 424a-424n by randomly sampling from pixels within the untargeted training objects 404a, 404b. Specifically, the multi-modal selection system generates the negative training indicators 422a-422n by randomly sampling pixels within the untargeted training object 404a. The multi-modal selection system generates the negative training indicators 424a-424n by randomly sampling pixels within the untargeted training object 404b. In this manner, the multi-modal selection system can generate training indicators that model negative user inputs by users with regard to untargeted objects.

In one or more embodiments, the multi-modal selection system samples positive training indicators and negative training indicators using a combination of sampling methods. Thus, in one or more embodiments, the multi-modal selection system randomly samples some positive training indicators from within a target training object of first target image, randomly samples some negative training indicators from outside a target training object of a second target image, randomly samples some positive training indicators based on a location of (or distance to) other positive training indicators within a third target image, samples some negative training inputs based on a location of (or distance to) other negative training indicators within a fourth target image, and samples some negative training indicators from within untargeted objects of a fifth target image. Indeed, one or more embodiments randomly select a sampling method for each training digital image (or each target object).

In addition, rather than randomly selecting a sampling method for each training digital image (or each target object), in one or more embodiments, the multi-modal selection system randomly selects a sampling method for each training indicator. Thus, the multi-modal selection system can select multiple training indicators for the same digital training image utilizing different sampling methods (e.g., random, from untargeted objects, or based on a distance from another training indicator).

Moreover, in one or more embodiments, the multi-modal selection system applies one or more filters in generating training indicators. For example, rather than sampling from all pixels in a digital image, the multi-modal selection system can filter out certain pixels. For instance, the multi-modal selection system filters pixels in a digital image such that any two pixels are at least a minimum distance away from other pixels. Similarly, the multi-modal selection system can filter pixels so that any pixel is a minimum distance (or a maximum distance) from a target object.

In addition, the multi-modal selection system can identify a number of training indicators (e.g., a number of positive training indicators and a number of negative training indicators) to generate with regard to any particular training digital image. For example, in one or more embodiments, the multi-modal selection system randomly selects a number of training indicators within a particular range (e.g., randomly selects a number between 1 and 20). In other embodiments, the multi-modal selection system identifies the number of training indicators based on one or more features or characteristics of the digital image (e.g., the number of objects in the digital image, the size of the digital image, or the complexity of the digital image).

Furthermore, in one or more embodiments, the multi-modal selection system utilizes a series of equations and/or algorithms to generate training indicators. For instance, in one or more embodiments, the multi-modal selection system defines a set of pixels within a target training object, $\mathcal{O}$, (e.g., ground truth pixels of the target training object 402). The multi-modal selection system defines a set $\mathcal{G}$ as follows:

$$\mathcal{G} = \{p_{i,j} | p_{i,j} \in \mathcal{O} \text{ or } f(p_{i,j} | \mathcal{O}) \geq d\}$$

where d is a distance to the target object (e.g., the distance to the target training object 402). Similarly, the multi-modal selection system defines $\mathcal{G}^c$ as the complementary set of $\mathcal{G}$. As defined, the pixels in $\mathcal{G}^c$ have two properties: 1) they are background pixels (i.e., pixels that do not belong to the target training object 402) and 2) they are within a certain distance range, d, to the target training object. To sample positive training indicators, in one or more embodiments, the multi-modal selection system randomly samples n pixels in $\mathcal{O}$ where $n \in N_{pos}$.

As mentioned above, in one or more embodiments, the pixels in $\mathcal{O}$ are filtered such that 1) any two pixels are at least $d_{step}$ pixels away and 2) any pixel is at least $d_{margin}$ pixels away from the target training object. Moreover, to sample negative clicks, one or more embodiments utilize the following three sampling strategies to model user input patterns.

Strategy 1: (e.g., the embodiment of FIG. 4A), the multi-modal selection system randomly samples the set $\mathcal{G}^c$, where $n \in N_{neg1}$, and $\mathcal{G}^c$ is filtered in the same manner as $\mathcal{O}$.

Strategy 2: (e.g., the embodiment of FIG. 4B), the multi-modal selection system samples $N_{neg2}$ negative training indicators to cover the outside object boundaries as much as possible. Specifically, the first negative training indicator is randomly sampled in $\mathcal{G}^c$ and subsequent negative samples are obtained by the following:

$$p_{next} = \underset{p_{i,j}}{\mathrm{argmax}} f(p_{i,j} | S^0 \cup \mathcal{G})$$

where, f, $p_{i,j}$, $S^0$ have the same definitions and attributes as described above. Moreover, as mentioned above, $S^0$, includes all previous negative training indicators.

Strategy 3: (e.g., the embodiment of FIG. 4C), the multi-modal selection system randomly samples $N_{neg3}$ negative training indicators on each untargeted object, $O_i$, in the training digital image, where $O_i$ reflects the pixels defining each untargeted training object, and where each $O_i$ is filtered in the same way as $O$.

Similarly, as described above, the multi-modal selection system can utilize Strategy 1 and Strategy 2 to generate positive training indicators. In particular, in one or more embodiments (e.g., the embodiment of FIG. 4A), the multi-modal selection system generates positive training indicators by randomly sampling the set $\mathcal{G}$, and $\mathcal{G}$ is filtered in the same manner as $O$. Similarly in one or more embodiments, the multi-modal selection system generates positive training indicators by identifying a first positive training indicator that is randomly sampled in $\mathcal{G}$ and subsequent positive training indicators are obtained by the following:

$$p_{next} = \underset{p_{i,j}}{\operatorname{argmax}} f(p_{i,j} | S^1 \cup \mathcal{G}^c)$$

where, as mentioned above, $S^1$ includes all previous positive training indicators.

As described previously, in one or more embodiments the multi-modal selection system combines sampling strategies (e.g., Strategy 1, Strategy 2, Strategy 3). For example, in some embodiments, the multi-modal selection system generates training samples for each training object (or each training indicator) by randomly selecting one of the sampling strategies with an equal probability.

As mentioned above, the multi-modal selection system can also sample boundary training indicators (e.g., edge points and/or bounding shapes) from training digital images. For example, FIGS. 4D-4E illustrate generating boundary training indicators from the training digital image 400 in accordance with one or more embodiments.

In particular, FIG. 4D illustrates the multi-modal selection system sampling boundary training indicators according to one or more embodiments. In relation to FIG. 4D, the multi-modal selection system identifies the target training object 402 and its corresponding boundary (e.g., from the ground truth mask corresponding to the target training object 402). The multi-modal selection system then samples boundary training indicators 430a-430c from the boundary of the target training object 402 utilizing one of a variety of approaches (e.g., similar to the approaches discussed above with regard to positive and negative training indicators).

For example, in relation to FIG. 4D the multi-modal selection system samples randomly along the boundary of the target training object 402 to generate the boundary training indicators 430a-430c. In other embodiments, the multi-modal selection system samples along the target training object 402 in accordance with a sampling pattern or threshold. For example, the multi-modal selection system can sample along the boundary of the target training object 402 based on a distance from previously sampled boundary training indicators to generate the boundary training indicators 430a-430c. To illustrate, the multi-modal selection system can sample boundary training indicators sequentially to maximize distance from previously sampled boundary training indicators. In other embodiments, the multi-modal selection system can sample based on a threshold distance (e.g., each boundary training indicator must be a threshold distance from a previous boundary training indicator).

In one or more embodiments, the multi-modal selection system modifies sampled boundary training indicators to more closely approximate user input of boundary training indicators. For example, the multi-modal selection system can move sampled inputs away from a boundary to better approximate inaccurate boundary selections by a user. For instance, FIG. 4E illustrates modifying a sampled input to generate a boundary training indicator in accordance with one or more embodiments.

As illustrated, the multi-modal selection system identifies the sample 430a and moves the sample 430a within a threshold distance 436. For instance, the multi-modal selection system can move the sample 430a to a first position 432 outside of the target training object 402 (but within the threshold distance 436 from the boundary of the target training object 402). Similarly, the multi-modal selection system can move the sample 430a to a second position 434 inside the target training object 402 (but within the threshold distance 436 from the boundary of the target training object 402). In this manner, the multi-modal selection system can identify a training indicator from a sampled input.

For example, in one or more embodiments, the multi-modal selection system utilizes the following sampling strategies to model user behavior when placing boundary clicks.

Strategy 1: n boundary clicks are randomly sampled from the object boundaries.

Strategy 2: n boundary clicks are evenly sampled along the object boundaries. In detail, each click is sampled sequentially such that the click that is the furthest away from all the previously sampled clicks is sampled as the next click.

where $n \in [3, N_{bound}]$. Because it can be challenging for the user to place boundary clicks perfectly accurately on the object boundaries, the multi-modal selection system can randomly jitter the sampled boundary clicks within a distance threshold (e.g., by up to 10 pixels) during training to tolerate errors in the user input.

Although FIGS. 4A-4E illustrate sampling regional training indicators separately from boundary training indicators, in some embodiments, the multi-modal selection system samples both regional training indicators and boundary training indicators. Indeed, because the multi-modal selection system allows multiple input modalities, it should be capable to output some output segmentation objects even with a single input modality to maintain backward compatibility. To enforce this, during training, the multi-modal selection system can sample training indicators based on individual input modalities or based on combinations of different input modalities. For example, with regard to regional training indicators and boundary training indicators the multi-modal selection system can (1) sample regional clicks only, or (2) sample boundary clicks only, or (3) sample both regional and boundary clicks.

In some embodiments, when sampling multiple input modalities, the multi-modal selection system can reduce the number of training indicators sampled. For example, when sampling under case (3) in the previous example, the multi-modal selection system can reduce the total number of training indicators samples by half as compared to cases (1) and (2).

Furthermore, although FIGS. 4A-4E illustrate sampling for specific regional and boundary training indicators (e.g., foreground clicks, background clicks, or edge clicks), the multi-modal selection system can generate training indicators corresponding to any input modalities discussed herein. For example, the multi-modal selection system can generate training indicators for soft clicks (e.g., by generating training indicators both within and close to, within a threshold distance of, target objects). Similarly, the multi-modal selection system can generate training indicators for bounding boxes (e.g., by generating shapes that encompass a target object). Moreover, the mms can generate training indicators for a loose boundary (by generating a shape that is within and outside of a target object) or other input modalities.

Figure 5A:
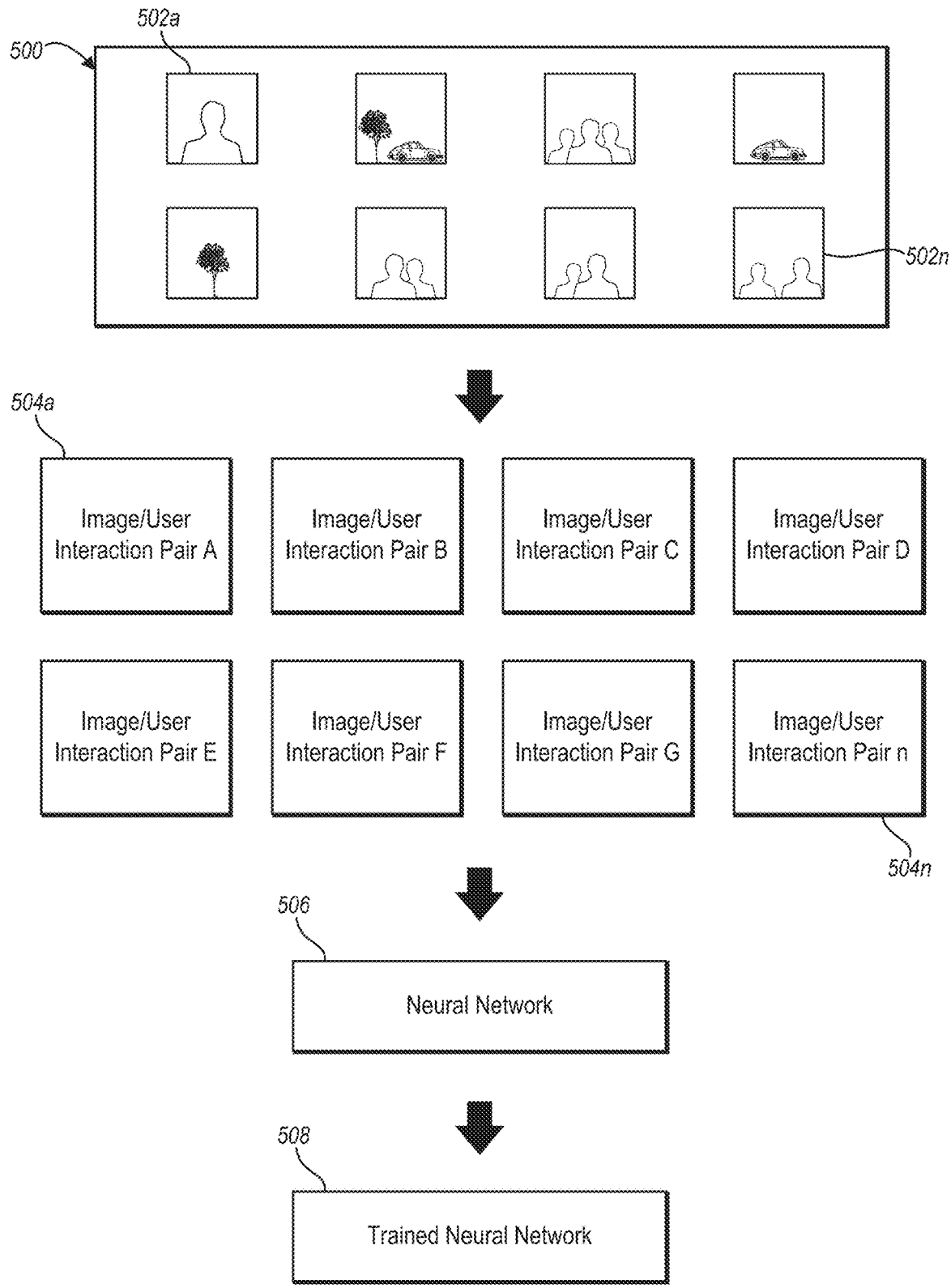
FIG. 5A illustrates a representation of training a neural network from a repository of training digital images in accordance with one or more embodiments.

As mentioned previously, the multi-modal selection system can utilize a plurality of training digital images and training indicators to train a neural network. In particular, the multi-modal selection system can generate a plurality of image/user interaction pairs and utilize the pairs to train a neural network. For example, FIG. 5A illustrates training a neural network in accordance with one or more embodiments. In particular, FIG. 5A illustrates a repository 500 with a plurality of training digital images 502a-502n (e.g., the repository 300). Each of the plurality of training digital images 502a-502n reflects a target training object. Moreover, each of the plurality of training digital images corresponds to training object ground truths (e.g., ground truth masks or boundaries corresponding to objects represented in the training digital images).

As illustrated, the multi-modal selection system transforms the plurality of training digital images into a plurality of corresponding image/user interaction pairs 504a-504n. In particular, as discussed previously, the multi-modal selection system samples training indicators with regard to each training digital image 502a-502n (e.g., utilizing strategies discussed above in relation to FIGS. 4A-4E). As described with regard to FIGS. 2A-2C, the multi-modal selection system transforms the training samples into distance maps. For instance, the multi-modal selection system generates positive training distance maps based on positive regional training samples, negative training distance maps based on negative regional training samples, and/or boundary training distance maps based on boundary training samples. The multi-modal selection system can generate training maps for any of the maps discussed above with regard to FIGS. 2A-2C. Similarly, the multi-modal selection system generates training color channels with regard to the training digital images 502a-502n. Utilizing the generated training distance maps and the training digital images, the multi-modal selection system generates the plurality of image/user interaction pairs 504a-504n. In particular, each of the image/user interaction pairs 504a-504n correspond to one of training digital images 502a-502n.

As shown in FIG. 5A, the multi-modal selection system provides the image/user interaction pairs 504a-504n as input to a neural network 506. In particular, the multi-modal selection system provides the image/user interaction pairs 504a-504n together with training object ground truths as input to the neural network 506. The multi-modal selection system can provide a variety of training object ground truths depending on the embodiment. For instance, in one or more embodiments, the multi-modal selection system provides a segmentation mask of a target training object (e.g., a mask of an object selected as a target object). In one or more embodiments, the multi-modal selection system provides ground truth masks, segmentations boundaries or other identifying information regarding the target objects and other objects reflected in training digital images. For example, in one or more embodiments, the multi-modal selection system provides binary masks with regard to target objects (e.g., matrices of binary values indicating pixels that are part of a target object and pixels that are not part of a target object) as training object ground truths.

As illustrated, the multi-modal selection system provides training indicators to the neural network 506 and generates a trained neural network 508. In particular, the neural network 506 receives the image/user interaction pairs 504a-504n (and training object ground truths). Moreover, multi-modal selection system utilizes the neural network 506 to analyze the image/user interaction pairs 504a-504n and generate a predicted object segmentation output corresponding to the target objects. The multi-modal selection system then compares the prediction with the training object (e.g., the training object ground truth).

For example, in one or more embodiments, the multi-modal selection system compares the predicted object segmentation output with the training object by utilizing a loss function. Specifically, the multi-modal selection system a loss function to determine a measure of loss (or error) between the predicted object segmentation output and the training object (e.g., a ground truth segmentation). The multi-modal selection system can then adjust internal parameters of the neural network 506 based on the comparison. For example, the multi-modal selection system can utilize back-propagation techniques to modify internal parameters (e.g., feature weights) corresponding to individual layers of the neural network 506 to reduce the measure of loss. In this manner, one or more embodiments generate a trained neural network based on training indicator.

More particularly, one or more embodiments of the multi-modal selection system trains or fine-tunes a neural network utilizing different stride values. For instance, in one or more embodiments, the multi-modal selection system utilizes fully convolutional neural networks with different stride values. In general, the smaller the stride value, the finer and better the segmentation results. In one or more embodiments, the multi-modal selection system generates a trained neural network by fine-tuning a neural network over different stride values.

For example, with regard to the embodiment of FIG. 5A, the multi-modal selection system first fine tunes a stride-32 model utilizing the neural network 506 and the image/user interaction pairs 504a-504n. For example, the multi-modal selection system fines tune a stride-32 FCN model (FCN-32s) from the stride-32 semantic segmentation model of the paper *Fully Convolutional Networks for Semantic Segmentation*, mentioned above. Specifically, the multi-modal selection system trains the stride-32 model over 30 epochs at a learning rate of $10^{-10}$. Then, the multi-modal selection system generates a stride-16 model utilizing the generated stride-32 model and the image/user interaction pairs 504a-504n. Specifically, the multi-modal selection system trains the stride-16 model from the generated stride-32 model at a fixed learning rate of $10^{-12}$. Moreover, the multi-modal selection system generates a stride-8 model from the stride-16 model. Specifically, the multi-modal selection system generates a stride-8 model at a fixed learning rate of $10^{-13}$. Thus, with regard to FIG. 5A, the trained neural network 508 reflects a fine-tuned stride-8 model.

Upon generating the trained neural network 508, as previously explained, the multi-modal selection system can utilize the trained neural network to select one or more target objects with regard to a probe digital image (e.g., a probe image not include in the repository 500). Thus, for example, the multi-modal selection system can utilize the trained neural network 508 as the trained neural network 128.

It will be appreciated that although the embodiment of FIG. 5A utilizes particular stride values, the multi-modal selection system can utilize other stride values. For instance, the multi-modal selection system can also generate a stride-4 model from a stride-8 model. Moreover, although certain exemplary learning rates and times have been disclosed with regard to exemplary embodiments, it will be appreciated that alternative embodiments of the multi-modal selection system utilize different learning rates or times. For example, in one or more embodiments, each stride value model is trained over approximately 20 epochs.

As discussed above, in one or more embodiments, the multi-modal selection system trains a neural network using different training indicators corresponding to different input modalities (e.g., different combinations of training indicators corresponding to different input modalities). For example, FIG. 5B illustrates different iterations of training a multi-modal object selection neural network (e.g., the neural network 506) utilizing training indicators corresponding to different input modalities.

Specifically, with regard to a first iteration, the multi-modal selection system analyzes a training digital image 510 (portraying a training object) and a training indicator 512 corresponding to a positive regional input modality. In particular, the multi-modal selection system utilizes the multi-modal object selection neural network 526 to analyze the training digital image 510 (e.g., training color channels generated from the training digital image 510) and the training indicator 512 (e.g., a training distance map corresponding to the training indicator 512) to generate a predicted object segmentation output 536 corresponding to the training object. In one or more embodiments, the multi-modal selection system provides the training distance map together with an indication of the input modality (e.g., to guide the distance map to the appropriate input channel within the neural network).

The multi-modal selection system trains the multi-modal object selection neural network 526 by comparing the predicted object segmentation output 536 and the training object. Specifically, the multi-modal selection system utilizes a loss function 528 to compare the predicted object segmentation output 536 and a training object ground truth 510a corresponding to the training object in the training digital image 510. As reflected by the arrow 530, The multi-modal selection system then modifies internal parameters of the multi-modal object selection neural network 526 based on the comparison (e.g., to reduce or minimize a measure of loss determined by the loss function 528).

Figure 5B:
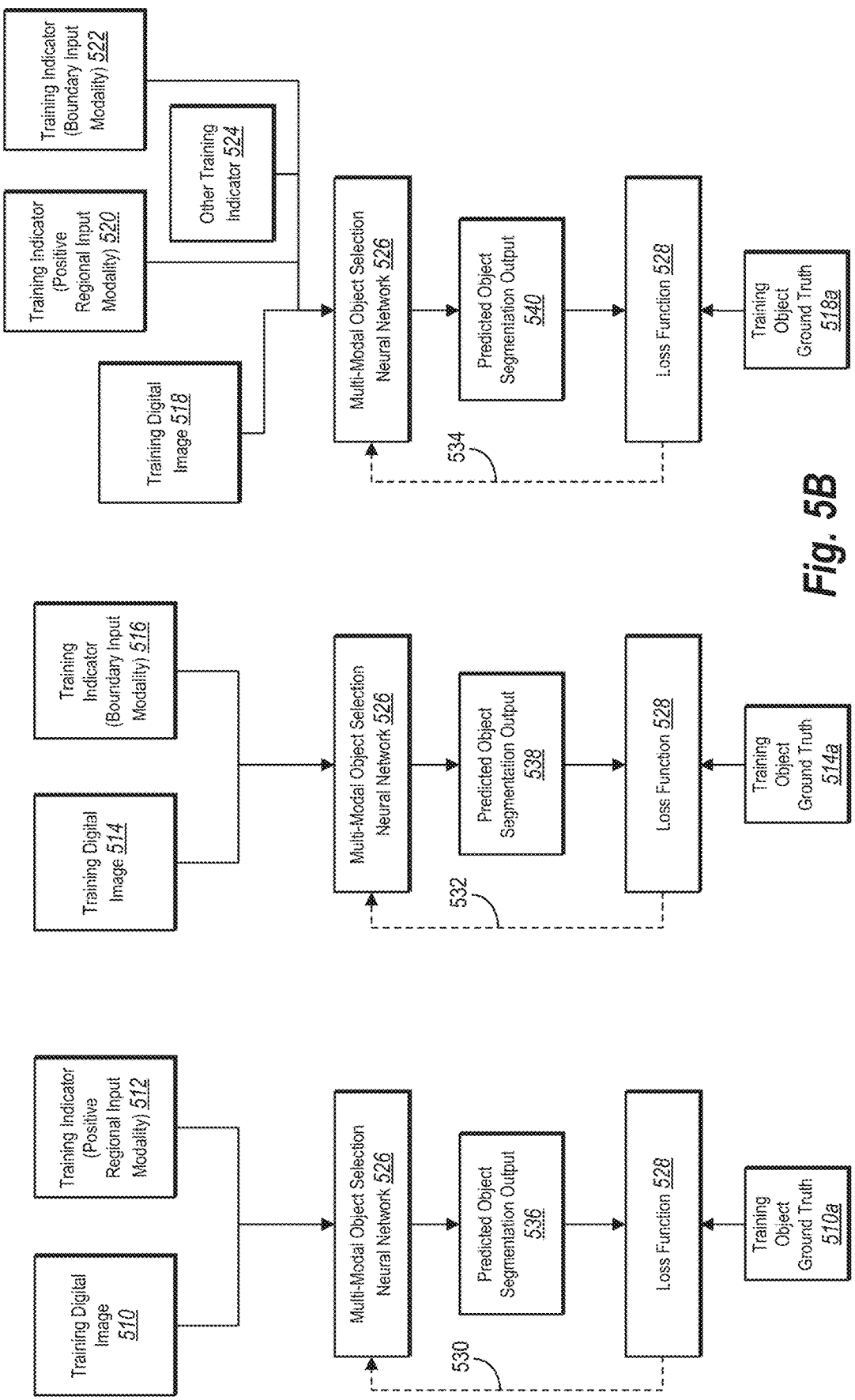
FIG. 5B illustrates a representation of training a neural network utilizing training indicators corresponding to a plurality of input modalities in accordance with one or more embodiments.

As shown in FIG. 5B, the multi-modal selection system can perform a second training iteration utilizing a training digital image 514 with a training indicator 516 corresponding to a positive boundary input modality (i.e., without other input modalities). Similar to the first training iteration, the multi-modal selection system can provide the training digital image 514 (e.g., color channels generated from the training digital image 514) and the training indicator 516 corresponding to the positive boundary input modality (e.g., boundary distance maps generated from the training indicator 516 and an indication of the input modality) to the multi-modal object selection neural network 526 to generate a predicted object segmentation output 538. The multi-modal selection system can compare the predicted object segmentation output 538 with a training object ground truth 514a corresponding to a training object in the training digital image 514 and modify parameters (as shown by the arrow 532) of the multi-modal object selection neural network 526. Thus, the multi-modal selection system can utilize different user inputs corresponding to different input modalities in iteratively training the multi-modal object selection neural network 526.

As mentioned above, the multi-modal selection system can also utilize multiple combinations of different input modalities in training a neural network. For example, FIG. 5B illustrates a third training iteration where the multi-modal selection system utilizes a training digital image 518 and a combination of a training indicator 520 corresponding to a positive regional input modality, a training indicator 522 corresponding to a positive boundary input modality, and/or other training indicator 524 corresponding to other input modalities. The multi-modal selection system can analyze the training digital image 118 (e.g., color channels generated from the training digital image 118) and the training indicators 520-524 (e.g., maps generated from the training indicators 520-524) to generate a predicted object segmentation output 540. As described above, the multi-modal selection system can train the multi-modal object selection neural network 526 by comparing the predicted object segmentation output 540 and a training object ground truth 518a corresponding to a training object portrayed in the training digital image 518 (utilizing the loss function 528).

Although FIG. 5B shows particular input modalities in particular iterations, the multi-modal selection system can utilize different input modalities and different combinations in a variety of different iterations or batches. For example, in the first two iterations shown in FIG. 5B, the multi-modal selection system could utilize a language input modality, a different regional input modality (e.g., a negative regional input modality), a bounding box input modality, a loose boundary input modality, an attention mask input modality, or a soft click/scribble input modality. Similarly, in the third iteration shown in FIG. 5B, the multi-modal selection system can utilize a combination of any subset of input modalities discussed herein.

Moreover, although FIG. 5B shows three iterations, the multi-modal selection system can train a neural network using a variety of iterations or batches that include any number of image/user interaction pairs. For example, in one or more embodiments the multi-modal selection system can train the multi-modal object selection neural network 526 with a batch size of 5 for 40 epochs. More specifically, in one or more embodiments, the multi-modal selection system trains the multi-modal object selection neural network 526 on the Pascal VOC dataset augmented with labels of semantic boundaries dataset (SBD). The multi-modal selection system sets the learning rate to $10^{-8}$ with momentum of 0.9 and weight decay of $5\times10^{-4}$ with a batch size of 5 for 40 epochs.

As discussed above, in one or more embodiments, the multi-modal object selection neural network can include an edge prediction branch (e.g., an additional decoder for predicting boundary segmentations). The multi-modal selection system can train the edge prediction branch and a mask branch in similar fashion. For example, the multi-modal selection system can generate predicted boundary segmentations, compare the predicted boundary segmentations with ground truth segmentations, and train the edge branch to more accurately identify boundary segmentations. As a result of highly imbalanced edge/non-edge pixels distribution, in some embodiments the multi-modal selection system train the edge prediction branch with both sigmoid cross-entropy loss and Dice loss.

Figure 6A:
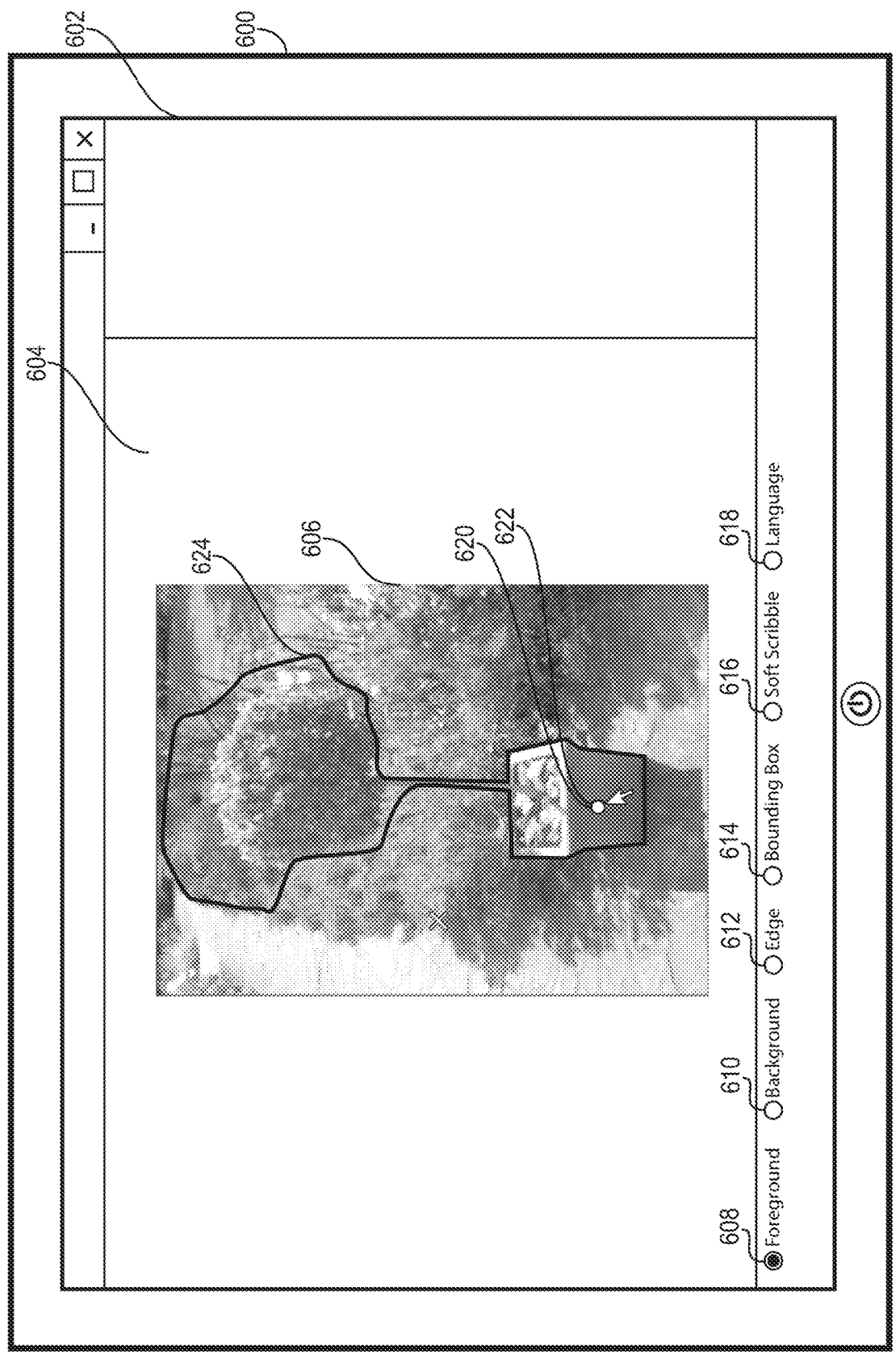
FIGS. 6A-6B illustrate a user interface for selecting target objects portrayed in digital images in accordance with one or more embodiments.

As mentioned above, the multi-modal selection system can utilize a user interface to iteratively identify user inputs corresponding to different input modalities and select target objects from digital images. For example, FIG. 6A illustrates an example user interface in accordance with one or more embodiments. Specifically, FIG. 6A shows a computing device 600 with a display 602 portraying a user interface 604 generated by the multi-modal selection system. As shown, the user interface 604 includes a digital image 606 portraying a target object (i.e., a tree in a planter box).

Moreover, as shown, the user interface 604 also includes input modality selectable elements 608-618. Specifically, the user interface 604 includes a positive regional input modality element 608 (i.e., a "foreground" point element), a negative regional input modality element 610 (i.e., a "background" point element), an edge point input modality element 612, a bounding box input modality element 614, a soft scribble input modality element 616, and a verbal input modality element 618. Based on a first user interaction with one of the input modality selectable elements 608-618, the multi-modal selection system can identify an input modality. Based on a second user interaction, the multi-modal selection system can determine user input corresponding to the selected input modality.

For instance, in relation to FIG. 6A, the multi-modal selection system detects user selection of the positive regional input modality element 608. The multi-modal selection system then detects user interaction (e.g., a click) at the position 620. Thus, the multi-modal selection system determines user input 622 corresponding to a positive regional input modality. The multi-modal selection system utilizes a multi-modal object selection neural network to analyze the digital image 606 (e.g., RBG channels of the digital image 606) and the user input 622 (e.g., a distance map reflecting the user input corresponding to the positive regional input modality) and generates an object segmentation output 624. Furthermore, the multi-modal selection system provides the object segmentation output 624 for display with the digital image 606 (and the user input 622 corresponding to the positive regional input modality).

Notably, the target object in the digital image 606 is difficult to distinguish from background pixels in the digital image 606. Indeed, the target object tree overlaps with similarly colored and textured plants portrayed in the digital image 606. Accordingly, a single regional user input does not result in an object segmentation output that tracks the contours of the target object with a high degree of accuracy. The multi-modal selection system can detect additional user inputs corresponding to user input modalities to generate an object segmentation output that more precisely matches the target object.

Figure 6B:
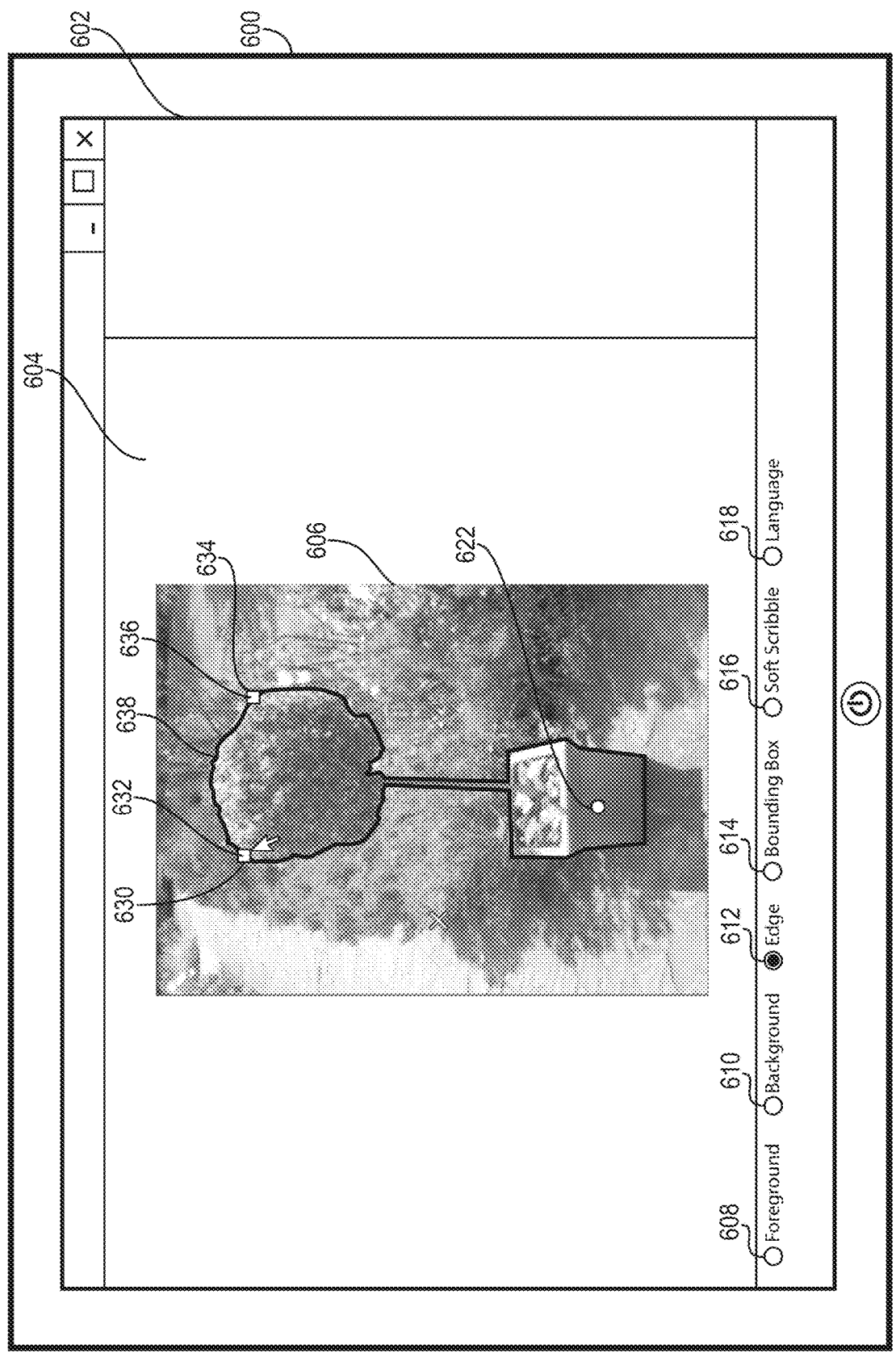

For example, FIG. 6B illustrates the user interface 604 after additional user input corresponding to a boundary input modality. Specifically, in relation to FIG. 6B the multi-modal selection system identifies a user interaction with the edge point input modality element 612. The multi-modal selection system identifies additional user interactions with positions 630, 634 of the digital image 606. In response, the multi-modal selection system determines user input 632 corresponding to the boundary input modality and user input 636 corresponding to the boundary input modality. The multi-modal selection system analyzes the user input 622 corresponding to the positive regional input modality, the user input 632 corresponding to the boundary input modality, and the user input 636 corresponding to the boundary input modality via a multi-model object selection neural network to generate an object segmentation output 638. Moreover, the multi-modal selection system provides the object segmentation output 638 for display with the digital image 606 (and the user inputs 622, 632, 636).

Notably, the object segmentation output 638 closely aligns to the target object in the digital image 606. Indeed, by analyzing edge points (the user inputs 632, 636) in conjunction with the foreground point (the user input 622) the multi-modal selection system is able to accurately and quickly select the target object, even where background pixels are similar (nearly indistinguishable) from the foreground pixels of the target object. Accordingly, utilizing a neural network that analyzes multiple input modalities improves the flexibility and resulting accuracy while reducing the amount of time and user interactions needed.

Although FIGS. 6A, 6B illustrate generating object segmentation outputs based on a particular regional input modality and a particular boundary input modality, the multi-modal selection system can generate object segmentation outputs based on a variety of input modalities and a variety of combinations of input modalities. For example, based on user interactions with the positive regional input modality element 608, the negative regional input modality element 610, the edge point input modality element 612, the bounding box input modality element 614, the soft scribble input modality element 616, and/or the language input modality element 618 the multi-modal selection system can identify user inputs corresponding to a variety of input modalities and generate object segmentation outputs.

To illustrate, the multi-modal selection system can receive user interaction with the language input modality element 618 and identify a second user interaction comprising natural language text. The multi-modal selection system can generate an object segmentation output based on the language input corresponding to the language input modality and generate an object segmentation output. Then, based on user interaction with the negative regional input modality element 610 and a position of the digital image 606, the multi-modal selection system can determine user input corresponding to a negative regional input modality. The multi-modal selection system can then generate an object segmentation output based on both the user input corresponding to the verbal input modality and the user input corresponding to the negative regional input modality. The multi-modal selection system can continue with different combinations of the different user inputs to select a target object.

Although FIGS. 6A-6b illustrate particular user interactions (e.g., mouse clicks), the multi-modal selection system can detect a variety of different user interactions in determining user inputs corresponding to different input modalities. As shown in FIGS. 6A-6B, the multi-modal selection system can identify user input of a point corresponding to a pixel (e.g., a select and release event, a mouse click, or touch event on a touchscreen). In addition to user input of a point, the multi-modal selection system can also identify a user indicator based on user input of a stroke (e.g., a line or curve via a select, drag, and release). In addition to user input of a stroke, the multi-modal selection system can also receive user interactions of shapes (e.g., click, drag and release defining two corners of a bounding box).

Moreover, even though FIGS. 6A-6B illustrate user interface elements corresponding to particular input modalities, the multi-modal selection system can determine input modalities without user interface elements. For example, the multi-modal selection system can associate particular user interactions with particular input modalities. To illustrate, a left click can correspond to a positive regional input modality, a right-click can correspond to a negative regional input modality, a double-click can correspond to an edge input modality, a click and drag can correspond to a bounding box input modality, and a triple click (or a specific voice command) can correspond to a language input modality. The foregoing examples are illustrative, and the multi-modal selection system can correlate different user interactions with different input modalities.

As mentioned above, in one or more embodiments, the multi-modal selection system can also generate suggestions for user input and/or input modalities in conjunction with a digital image. For example, the multi-modal selection system can utilize a probability map (or uncertainty map) to determine uncertain regions of an object segmentation output and recommend an additional user input and/or a particular input modality based on the uncertain regions.

For example, FIG. 7 illustrates suggesting additional user input in accordance with one or more embodiments. Specifically, FIG. 7 illustrates a digital image 702 with user inputs corresponding to an input modality. The multi-modal selection system generates a segmentation mask 704 and a segmentation boundary 706 based on the digital image 702 and corresponding user input. The segmentation mask 704 and the segmentation boundary 706 can include probability maps that illustrate the certainty of whether particular pixels correspond to the target object. As shown by the boxes, the multi-modal selection system can identify a region of low certainty (e.g., regions where the probability map falls below a threshold value). In one or more embodiments, the multi-modal selection system can apply metrics such as entropy to determine the regions of uncertainty. In response, the multi-modal selection system can generate a suggestion to provide additional user input in relation to the identified region. In other words, unconfident regions can be fed back to query the user for additional inputs to correct the previous selection.

For example, as shown in FIG. 7, the multi-modal selection system generates a user interface comprising the digital image, an object segmentation output, and a suggestion 708 for additional user input corresponding to the identified region. Specifically, the multi-modal selection system suggests adding a boundary click in the identified region.

The multi-modal selection system can suggest a particular input modality based on a variety of factors. To illustrate, the multi-modal selection system can suggest different input modalities based on continuity (e.g., continuity in a boundary segmentation or edge map). For example, in FIG. 7 discontinuity (e.g., changes in certainty values) within the edge map indicate that additional boundary user inputs may be needed.

The multi-modal selection system can also generate suggestions based on additional factors, such as distance or size. To illustrate, for uncertainty regions in close proximity to boundaries of a selection (e.g., within a threshold distance), the multi-modal selection system can suggest a boundary input modality. For example, the uncertainty region in FIG. 7 (for the tail of the penguin) is adjacent to the existing boundary. Therefore, the multi-modal selection system suggests a boundary input modality. For uncertainty regions that are further away (e.g., beyond a threshold distance) from boundaries of a selection, the multi-modal selection system can suggest a regional modality. Similarly, the multi-modal selection system can suggest an input modality based on the size of an uncertainty region or the location of an uncertainty region.

Upon suggesting a user input, the multi-modal selection system can identify an additional user input and generate a modified object segmentation output. For example, as shown in FIG. 7, the in response to the suggestion 708, multi-modal selection system identifies an additional user input 710. The multi-modal selection system generates a new object segmentation boundary based on the additional user input 710 (and the additional user input). In this manner, the multi-modal selection system can generate suggestions that result in more accurate selection of target objects.

As mentioned previously, the multi-modal selection system can operate in conjunction with any type of digital visual media. In particular, the multi-modal selection system can select a target object with regard to a digital video. In one or more embodiments, the multi-modal selection system selects a target object in a first image/frame in a digital video to identify a corresponding modified target object in a second image/frame in the digital video. Specifically, the multi-modal selection system utilizes an object boundary or mask generated with regard to a target object in a first digital image/frame as a user indicator of pixels with regard to a corresponding modified target object in a second image/frame. More specifically, the multi-modal selection system utilizes the selected pixels belonging to a target object in a first digital image/frame to generate distance maps with regard to a corresponding modified target object in a second image/frame. Moreover, the multi-modal selection system utilizes the generated distance maps to select the corresponding modified target object in the second image/frame.

Figure 8:
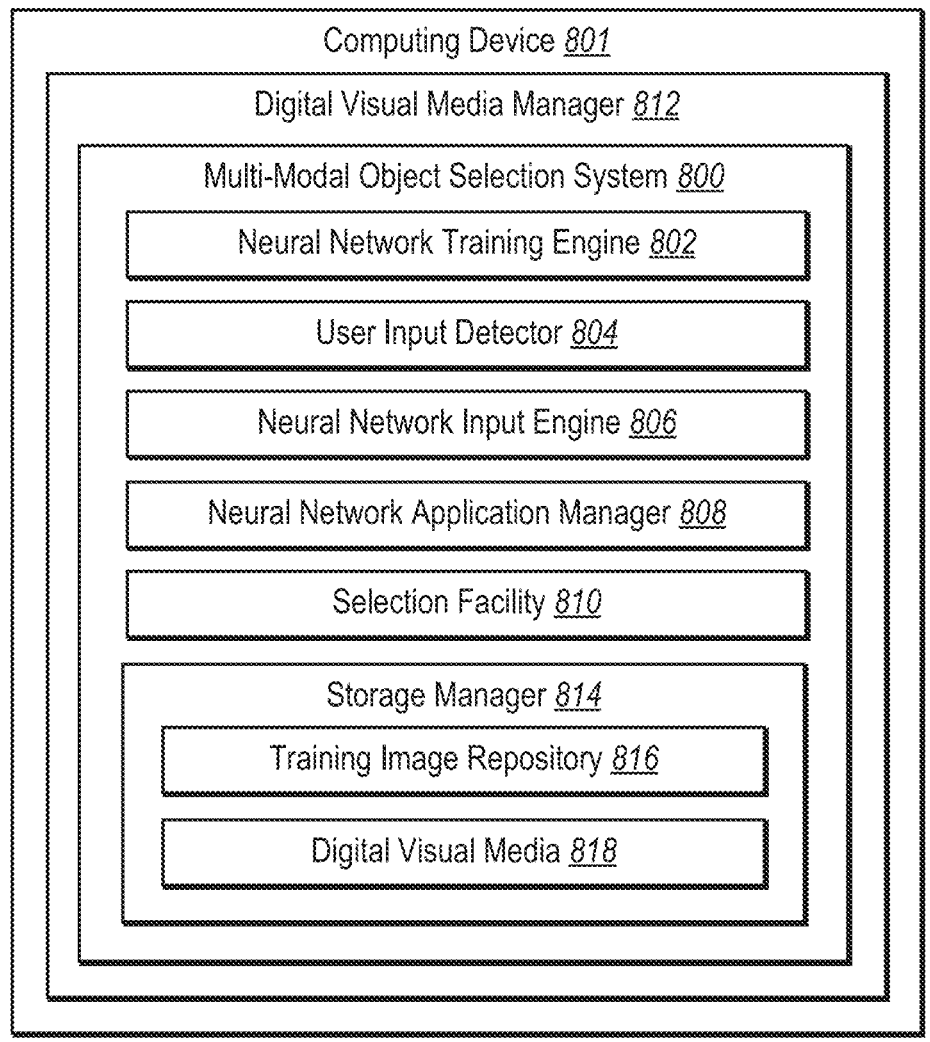
FIG. 8 illustrates a schematic diagram of a multi-modal selection system in accordance with one or more embodiments.

Turning now to FIG. 8, additional detail will be provided regarding components and capabilities of one example architecture of a multi-modal selection system according to one or more embodiments. In particular, FIG. 8 illustrates an embodiment of an exemplary multi-modal selection system 800 (e.g., the "multi-modal selection system," described above) implemented via a computing device 801 (e.g., a server or client device as discussed below in relation to FIG. 9). As shown, the multi-modal selection system 800 may include, but is not limited to, a neural network training engine 802, a user input detector 804, a neural network input engine 806, a neural network application manager 808, a selection facility 810, and a storage manager 814. Moreover, the storage manager 814 may also include training image repository 816 and digital visual media 818.

As illustrated in FIG. 8, the multi-modal selection system 800 includes the neural network training engine 802. The neural network training engine 802 can teach, guide, tune, and/or train one or more neural networks. In particular, the neural network training engine 802 can train a multi-modal object selection neural network based on a plurality of training digital images (e.g., images from the training image repository 816). Moreover, in one or more embodiments, the neural network training engine 802 can generate training indicators corresponding to various input modalities with regard to training digital images.

In one or more embodiments, the neural network training engine 802 utilizes training indicators to generate a trained neural network. In particular, in one or more embodiments the neural network training engine 802 transforms training indicators corresponding to different input modalities into distance maps (e.g., maps reflecting the distance between pixels in the training digital image and indicated pixels). Moreover, in one or more embodiments, the neural network training engine 802 combines distance maps and color channels to form image/user interaction pairs with regard to training objects in training digital images. Furthermore, in one or more embodiments, the neural network training engine 802 provides image/user interaction training pairs to a neural network with training object ground truths (e.g., object boundaries or ground truth masks of identified objects) to train the neural network to select target objects.

As illustrated in FIG. 8, the multi-modal selection system 800 also includes the user input detector 804. The user input detector 804 can obtain, identify, receive, monitor, capture, and/or detect user input (e.g., user input corresponding to one or more input modalities and reflecting a position relative to a target object). For example, in one or more embodiments, the user input detector 804 identifies one or more user interactions with respect to a user interface. As used herein, a "user interaction" refers to conduct performed by a user (or a lack of conduct performed by a user) to control the function of a computing device. For example, the user input detector 804 can detect user input of one or more pixels in a digital image and an indication of how the one or more pixels relate to a target object.

In addition to the user input detector 804, as illustrated in FIG. 8, the multi-modal selection system 800 also includes the neural network input engine 806. The neural network input engine 806 can identify, gather, transform, prepare, create, generate and/or provide input to a trained neural network. The neural network input engine 806 can generate and provide image/user interaction pairs to a trained neural network.

In one or more embodiments, the neural network input engine 806 determines an indication of how a user input corresponds to a target object. For instance, the neural network input engine 806 identifies user input, and determine whether the user input corresponds to a positive regional input modality, (e.g. an indication that a region corresponding to the user input falls within a target object), a negative regional input modality (e.g., an indication that a target object falls outside a region corresponding to the user input), a boundary regional input modality (e.g., an indication that an object boundary corresponding to a target object is in close proximity to the user indicator), or another input modality discussed herein. For example, in one or more embodiments, the neural network input engine 806 identifies a right-click and determine an indication that the right click corresponds to a negative regionality user input.

Moreover, in one or more embodiments, the neural network input engine 806 transforms user input into distance maps. In particular, in one or more embodiments, the neural network input engine 806 generates distance maps that reflect distances between pixels in a digital image and one or more user inputs. More specifically, in one or more embodiments, the neural network input engine 806 transforms user input corresponding to an input modality into matrices that reflect the distance between each pixel in a digital image and the position corresponding to the user input.

The neural network input engine 806 can also combine distance maps and color channels to provide input to a neural network. For example, in one or more embodiments, the neural network input engine 806 combines distance maps and color channels corresponding to a digital image to generate an image/user interaction pair (e.g., a data set pairing image data reflected by color channels and user interaction data reflected by distance maps).

In addition to the neural network input engine 806, as shown in FIG. 8, the multi-modal selection system 800 also includes the neural network application manager 808. The neural network application manager 808 can apply, utilize, and/or provide a trained neural network with regard to one or more inputs. For instance, in one or more embodiments, the neural network application manager 808 receives input (e.g., image/user interaction pairs from the neural network input engine 806) and generates object segmentation outputs. In one or more embodiments, the neural network application manager 808 generates a probability map. The neural network application manager 808 generates a probability map reflecting the likelihood that pixels in a digital image belong to a target object in the digital image.

Furthermore, as illustrated in FIG. 8, the multi-modal selection system 800 also includes the selection facility 810. The selection facility 810 can utilize information from other components of the multi-modal selection system 800 (e.g., information provided via the neural network application manager 808) to identify or select one or more target objects. In particular, the selection facility 810 can generate, create, calculate, determine, and/or provide a set of pixels that reflect a target object (e.g., an object boundary or mask). As mentioned previously, in one or more embodiments, the selection facility 810 applies one or more thresholds to a probability map to select a target object.

The selection facility 810 can also identify pixels belonging to target objects for modification by additional components, tools, or systems. For example, the selection facility 810 can identify a set of pixels belonging to a target object (e.g., utilizing an object boundary) and provide the set of pixels to the digital visual media manager 812.

Indeed, as illustrated in FIG. 8, the multi-modal selection system 800 can be implemented as part of a digital visual media manager 812 (on the computing device 801). The digital visual media manager 812 can access, identify, modify, revise, and/or provide digital visual media. In particular, the digital visual media manager 812 can modify digital visual media or a portion of digital visual media. For example, in one or more embodiments, the digital visual media manager 812 alters color, brightness, hue, or any other visual characteristic of digital visual media. Similarly, the digital visual media manager 812 can move, resize, rotate, or orient digital visual media or an object reflected in digital visual media. Similarly, the digital visual media manager 812 can isolate, cut, and paste digital visual media (or portions of digital visual media). Moreover, the digital visual media manager can delete or remove digital visual media (or portions of digital visual media).

Furthermore, the digital visual media manager 812 can receive selection information identifying a target object (e.g., from the selection facility 810) and modify the target object. Thus, the digital visual media manager 812 can modify a target object in a digital image. Similarly, the digital visual media manager 812 can modify a target object in a digital video. Moreover, the digital visual media manager 812 can modify a target object reflected in a plurality of frames (e.g., digital images) in a video sequence. For instance, the selection facility 810 can provide information identify pixels belonging to a target object portrayed in multiple frames of a digital video, and the digital visual media manager 812 can modify (e.g., change appearance or remove) the target object from the multiple frames.

As illustrated in FIG. 8, the multi-modal selection system 800 also includes the storage manager 814. The storage manager 814 maintains data for the multi-modal selection system 800. The storage manager 814 can maintain data of any type, size, or kind as necessary to perform the functions of the multi-modal selection system 800. The storage manager 814, as shown in FIG. 8, includes training image repository 816. The training image repository 816 can include a plurality of training digital images. In addition to digital images, the training image repository 816 can also include training object ground truths. For example, the training image repository 816 includes training object data with regard to target objects or untargeted objects. Specifically, the training image repository 816 can include object boundaries or ground truth masks corresponding to objects within training digital images. As illustrated in FIG. 8, the storage manager 814 also includes digital visual media 818. Digital visual media 818 can include any digital visual media (e.g., digital images or digital video) utilized by the multi-modal selection system 800. The storage manager 814 can also store other data, such as training indicators and corresponding input modalities.

Each of the components 802-814 of the multi-modal selection system 800 and their corresponding elements (as shown in FIG. 8) may be in communication with one another using any suitable communication technologies. It will be recognized that although components 802-814 and their corresponding elements are shown to be separate in FIG. 8, any of components 802-814 and their corresponding elements may be combined into fewer components, such as into a single facility or module, divided into more components, or configured into different components as may serve a particular embodiment.

The components 802-814 and their corresponding elements can comprise software, hardware, or both. For example, the components 802-814 and their corresponding elements can comprise one or more instructions stored on a computer-readable storage medium and executable by processors of one or more computing devices. When executed by the one or more processors, the computer-executable instructions of the multi-modal selection system 800 can cause a client device and/or a server device to perform the methods described herein. Alternatively, the components 802-814 and their corresponding elements can comprise hardware, such as a special purpose processing device to perform a certain function or group of functions. Additionally or alternatively, the components 802-814 and their corresponding elements can comprise a combination of computer-executable instructions and hardware.

Furthermore, the components 802-814 of the multi-modal selection system 800 may, for example, be implemented as one or more stand-alone applications, as one or more modules of an application, as one or more plug-ins, as one or more library functions or functions that may be called by other applications, and/or as a cloud-computing model. Thus, the components 802-814 of the multi-modal selection system 800 may be implemented as a stand-alone application, such as a desktop or mobile application. Furthermore, the components 802-814 of the multi-modal selection system 800 may be implemented as one or more web-based applications hosted on a remote server. Alternatively or additionally, the components of the multi-modal selection system 800 may be implemented in a suit of mobile device applications or "apps." To illustrate, the components of the multi-modal selection system 800 may be implemented in a digital image editing application, including but not limited to ADOBE® PHOTOSHOP® or ADOBE® REVEL®. "ADOBE®," "ADOBE® PHOTSHOP®," and "ADOBE® REVEL®" are either registered trademarks or trademarks of Adobe Inc. in the United States and/or other countries.

Figure 9:
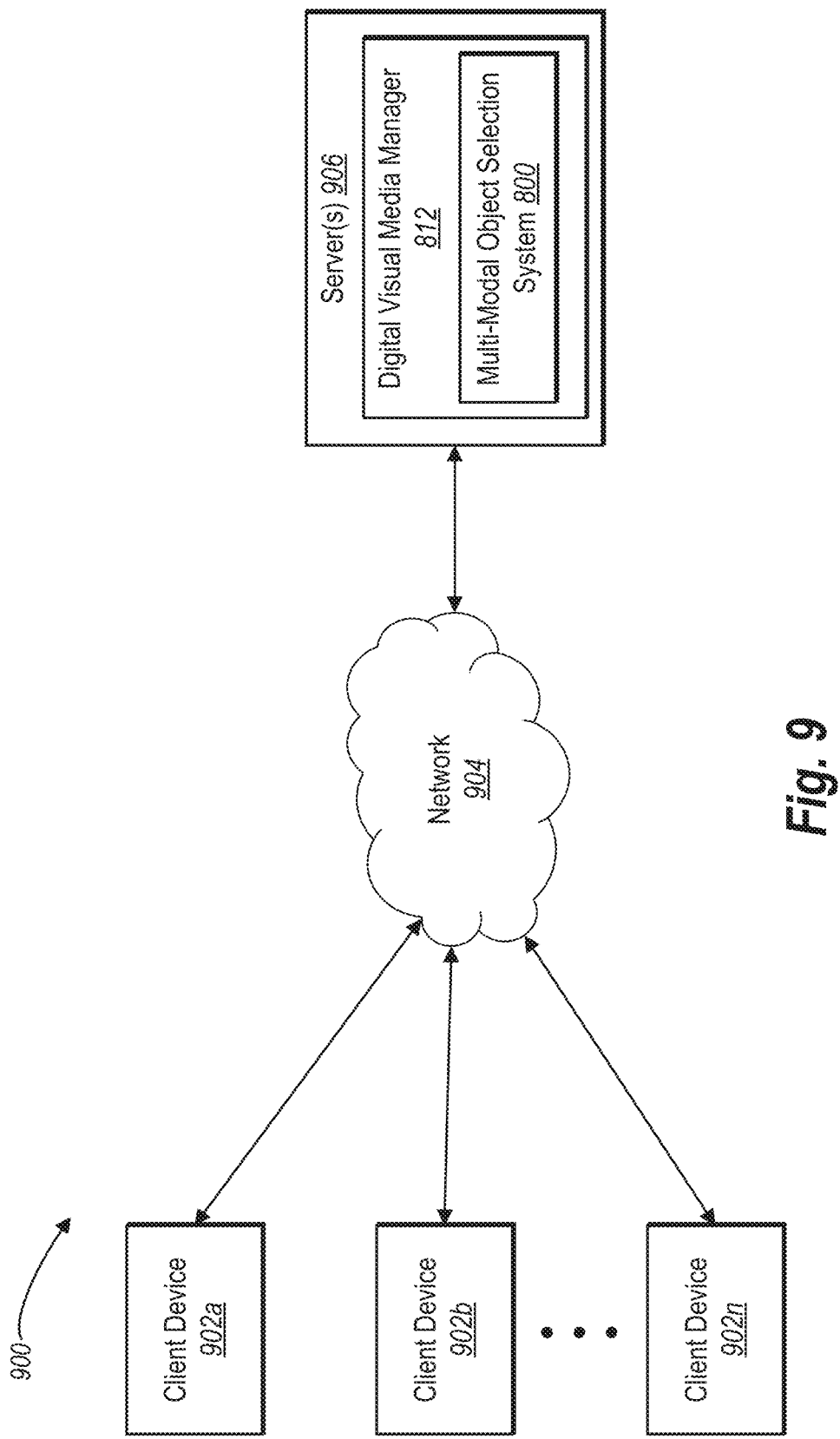
FIG. 9 illustrates a schematic diagram of an exemplary environment in which the multi-modal selection system can operate in accordance with one or more embodiments.

FIG. 9 illustrates a schematic diagram of one embodiment of an exemplary environment 900 in which the multi-modal selection system 800 can operate. In one or more embodiments, the environment 900 includes a server 906 connected to a plurality of client devices 902a-902n via a network 904. The client devices 902a-902n, the network 904, and the server 906 may communicate with each other or other components using any communication platforms and technologies suitable for transporting data and/or communication signals, including any known communication technologies, devices, media, and protocols supportive of remote data communications, examples of which will be described in more detail below with respect to FIG. 12.

Although FIG. 9 illustrates a particular arrangement of the client devices 902a-902n, the network 904, and the server 906, various additional arrangements are possible. For example, the client devices 902a-902n may directly communicate with the server 906, bypassing the network 904. Or alternatively, the client devices 902a-902n may directly communicate with each other.

Similarly, although the environment 900 of FIG. 9 is depicted as having various components, the environment 900 may have additional or alternative components. For example, the environment 900 can be implemented on a single computing device with the multi-modal selection system 800. In particular, the multi-modal selection system 800 may be implemented in whole or in part on the client device 902a.

As illustrated in FIG. 9, the environment 900 may include client devices 902a-902n. The client devices 902a-902n may comprise a variety of computing devices. For example, the client devices 902a-902n may comprise one or more personal computers, laptop computers, mobile devices, mobile phones, tablets, special purpose computers, TVs, or other computing devices, including computing devices described below with regard to FIG. 12. Although three client devices are presented with regard to FIG. 9, it will be appreciated that client devices 902a-902n may comprise a different number of client devices (greater or smaller than shown).

Moreover, as illustrated in FIG. 9, the client devices 902a-902n and the server 906 may communicate via the network 904. The network 904 may represent a network or collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The network 904 will be discussed in more detail below with regard to FIG. 12.

In addition, the environment 900 may also include the server 906. The server 906 may generate, store, receive, and transmit any type of data, including training image repository 1016, digital visual media 1018, or other information. For example, the server 906 may receive data from a client device, such as the client device 902a, and send the data to another client device, such as the client device 902b, 902c, and/or 902n. The server 906 can also transmit electronic messages between one or more users of the environment 900. In one example embodiment, the server 906 is a data server. The server 906 can also comprise a communication server or a web-hosting server. Additional details regarding the server 906 will be discussed below with respect to FIG. 12.

As shown, in one or more embodiments, the server 906 can include or implement all or a portion of the digital visual media manager 812 and the multi-modal selection system 800. In particular, the multi-modal selection system 800 can comprise an application running on the server 906 or a portion of the multi-modal selection system 800 can be downloaded from the server 906. For example, the multi-modal selection system 800 can include a web hosting application that allows the client devices 902a-902n to interact with content hosted at the server 906. To illustrate, in one or more embodiments of the environment 900, one or more client devices 902a-902n can access a webpage supported by the server 906. In particular, the client device 902a can run a web application (e.g., a web browser) to allow a user to access, view, and/or interact with a webpage or website hosted at the server 906.

Upon the client device 902*a* accessing a webpage hosted at the server 906, in one or more embodiments, the server 906 can provide access to digital visual media (e.g., the digital visual media 818) stored at the server 906. Moreover, the client device 902*a* can receive user interactions with regard to the digital visual media and provide user input corresponding to an input modality to the server 906. Moreover, the server 906 can transform (e.g., via the neural network input engine 806) the user input to input data (e.g., distance maps) for a trained neural network. In addition, the server can apply a trained neural network to the input data (e.g., via the neural network application manager 808) and identify a set of pixels reflecting a target object (e.g., via the selection facility 810). The server 906 can provide the set of pixels (e.g., an object segmentation output) to the client device 902*a* for display to the user. The user can provide additional user input via the client device 902*a* and the server 906 can generate a modified set of pixels reflecting the target object (e.g., a modified object segmentation output). Moreover, the user can provide user input via the client device 902*a* indicating modifications to the target object. The server 906 (e.g., via the digital visual media manager 812) can modify the target object (e.g., cut and paste the target object).

By way of an additional example, in one or more embodiments, the server 906 generates a trained neural network (e.g., via the neural network training engine 1002) and provides the trained neural network to the client device 902*a*. In particular, the server 906 embeds the trained neural network in a digital image editing application installed on the client device (i.e., ADOBE PHOTOSHOP). In one or more embodiments, the client device 902*a* receives one or more user indicators with regard to a digital image. Specifically, the client device 902*a* receives user input corresponding to an input modality via the digital image editing application (e.g., via the user input detector 804), and utilizes the embedded, trained neural network to select a target object in a probe digital image (e.g., via the neural network input engine 806, the neural network application manager 808, and the selection facility 810). Moreover, upon selecting the target object, the client device 902*a* can modify (e.g., move, copy, paste, or delete) the target object based on additional user input (e.g., utilizing the digital visual media manager 1012).

As just described, the multi-modal selection system 800 may be implemented in whole, or in part, by the individual elements 902*a*-906 of the environment 900. It will be appreciated that although certain components of the multi-modal selection system 800 are described in the previous example with regard to particular elements of the environment 900, various alternative implementations are possible. For instance, in one or more embodiments, the multi-modal selection system 800 is implemented on the client device 902*a*. Similarly, in one or more embodiments, the multi-modal selection system 800 may be implemented on the server 906. Moreover, different components and functions of the multi-modal selection system 800 may be implemented separately among client devices 902*a*-902*n*, the server 906, and the network 904. For instance, in one or more embodiments the neural network training engine 802 is implemented as part of the server 906; the user input detector 804 is implemented as part of the client devices 902*a*-902*n* and the server 906; the neural network input engine 806 is implemented as part of the client devices 902*a*-902*n* and the server 906; the neural network application manager 808 is implemented as part of the client devices 902*a*-902*n* and the server 906; the selection facility 810 is implemented as part of the client devices 902*a*-902*n* and the server 906; the digital visual media manager is implemented as part of the client devices 902*a*-902*n* and the server 906; and the storage manager 814 is implemented as part of the client devices 902*a*-902*n* and the server 906. The environment 900 can also be implemented in a variety of additional or alternative arrangements.

Figure 10:
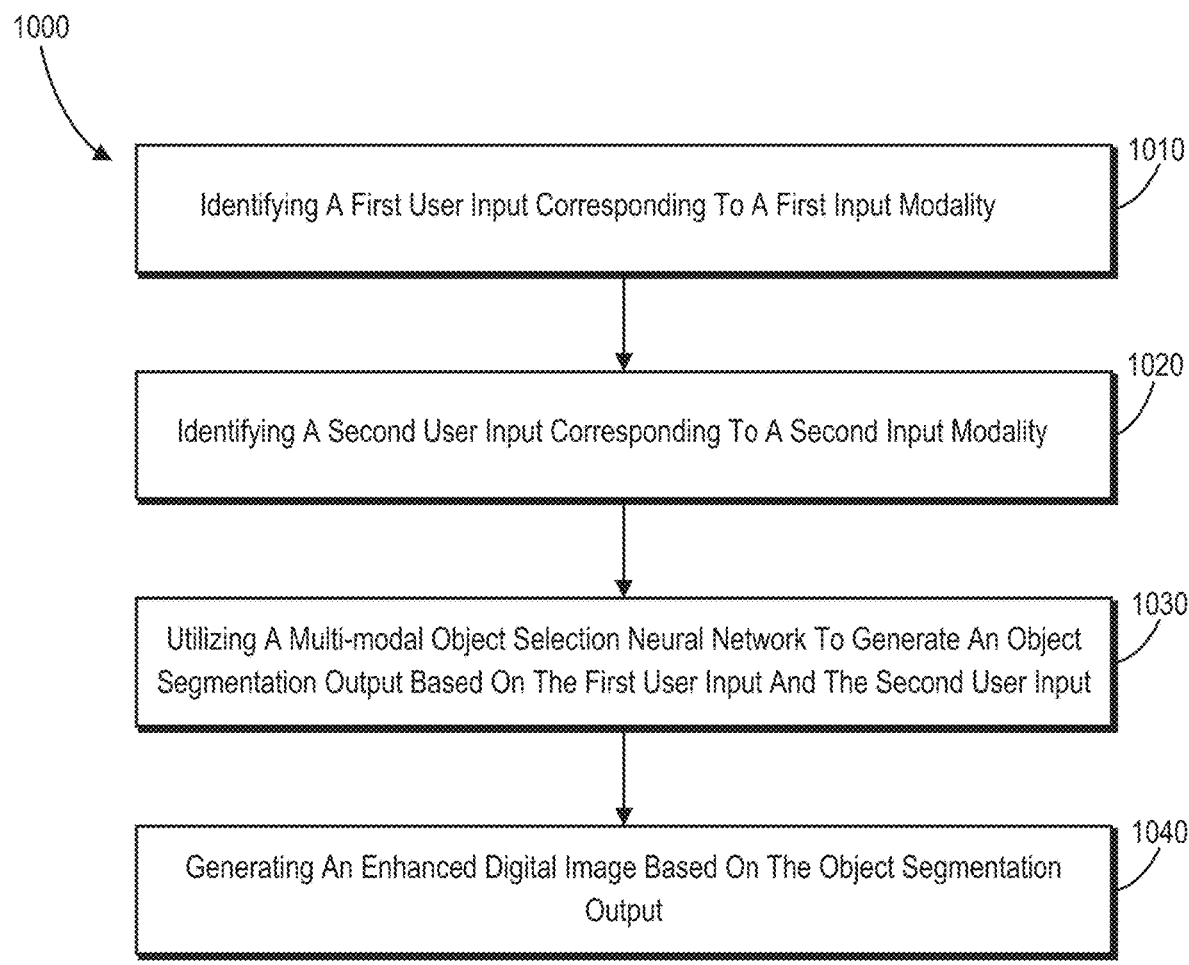
FIG. 10 illustrates a flowchart of a series of acts for selecting a target object portrayed in digital visual media in accordance with one or more embodiments.
Figure 11:
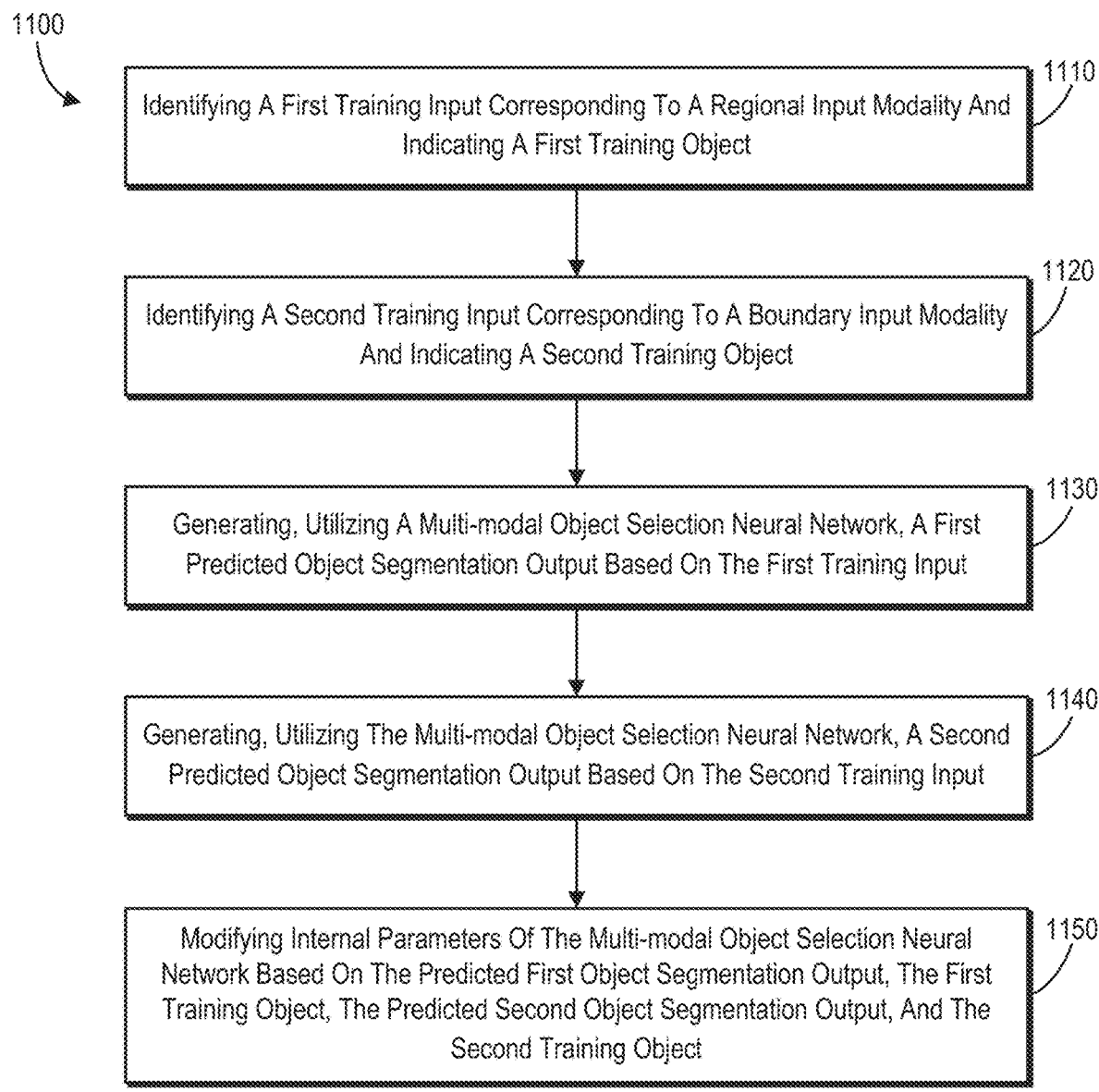
FIG. 11 illustrates a flowchart of a series of acts for training a multi-modal object selection neural network in accordance with one or more embodiments.

FIGS. 1A-9, the corresponding text, and the examples, provide a number of different systems and devices that allows a user to facilitate selection of objects within digital visual media. In addition to the foregoing, embodiments can also be described in terms of flowcharts comprising acts and/or steps in a method for accomplishing a particular result. For example, FIGS. 10-11 illustrate flowcharts of a series of acts 1000 and a series of acts 1100. While FIGS. 10 and 11 illustrate acts according to one or more embodiments, alternative embodiments may omit, add to, reorder, and/or modify any of the acts shown in FIGS. 10 and 11. The acts of FIGS. 10 and 11 can be performed as part of a method. Alternatively, a non-transitory computer readable medium can comprise instructions, that when executed by one or more processors, cause a computing device to perform the acts of FIGS. 10 and 11. In still further embodiments, a system can perform the acts of FIGS. 10 and 11.

As shown in FIG. 10, the series of acts 1000 can include an act 1010 of identifying a first user input corresponding to a first input modality. The first input modality comprises one of a regional input modality, a boundary input modality, a language input modality, a bounding box input modality, or a soft scribble input modality. For example, the act 1010 can include identifying a first user input corresponding to a regional input modality, the first user input indicating a first position relative to a target object portrayed in a digital image. For instance, in one or more embodiments, the regional input modality comprises at least one of a positive regional input modality or a negative regional input modality.

In addition, as illustrated in FIG. 10, the series of acts 1000 can also include an act 1020 of identifying a second user input corresponding to a second input modality. The second input modality comprises another of a regional input modality, a boundary input modality, a language input modality, a bounding box input modality, or a soft scribble input modality. The second input modality differs from the first input modality. For example, the act 1020 can include identifying a second user input corresponding to a boundary input modality, the second user input indicating a second position relative to the target object portrayed in the digital image. For example, in one or more embodiments, the boundary input modality comprises an edge point.

Moreover, as shown in FIG. 10, the series of acts 1000 can also include an act 1030 of utilizing a multi-modal object selection neural network to generate an object segmentation output based on the first user input and the second user input. In particular, the act 1030 can include utilizing a multi-modal object selection neural network to generate an object segmentation output based on the first user input corresponding to the regional input modality and the second user input corresponding to the boundary input modality. For example, in one or more embodiments, the act 1030 includes utilizing the multi-modal object selection neural network to generate the object segmentation output by generating one or more distance maps reflecting distances between pixels of the digital image, the first user input, and the second user input. Moreover, the act 1030 can also include utilizing the multi-modal object selection neural network to generate the object segmentation output by analyzing the one or more distance maps and the digital image utilizing the multi-modal object selection neural network to generate the object segmentation output.

In some embodiments, the act 1030 can include utilizing the multi-modal object selection neural network to generate an initial object segmentation output based on the first user input corresponding to the regional input modality; and providing the initial object segmentation output for display with the digital image. Moreover, the act 1030 can also include in response to identifying the second user input corresponding to the boundary input modality, utilize the multi-modal object selection neural network to generate the object segmentation output based on the first user input corresponding to the regional input modality and the second user input corresponding to the boundary input modality; and provide the object segmentation output for display with the digital image.

In addition, the act 1030 can also include identifying a third user input corresponding to a verbal input modality; and utilizing the multi-modal object selection neural network to generate the object segmentation output based on the first user input corresponding to the regional input modality, the second user input corresponding to the boundary input modality; and the third user input corresponding to the verbal input modality.

Further, as illustrated in FIG. 10, the series of acts 1000 can also include an act 1040 of generating an enhanced digital image based on the object segmentation output. In particular, the act 1040 can include generating an enhanced digital image by modifying the digital image based on the object segmentation output. For example, generating the enhanced digital image can include removing the target object from the digital image, modifying the target object, or adding the target object to another digital image.

Furthermore, in one or more embodiments, the series of acts 1000 includes providing for display, via a user interface, a plurality of input modality selectable elements comprising at least one regional input modality element and at least one boundary input modality element. In such embodiments, the series of acts 1000 can include identifying the first user input corresponding to the regional input modality by identifying a first user interaction with the at least one regional input modality element and a first selection of a pixel within the digital image; and identifying the second user input corresponding to the boundary input modality by identifying a second user interaction with the at least one boundary input modality element and a second selection of a pixel within the digital image.

Moreover, in one or more embodiments, the series of acts 1000 include identifying a digital image portraying a target object, a first user input corresponding to a regional input modality, and a second user input corresponding to a boundary input modality; and utilizing the multi-modal object selection neural network to generate an object segmentation output reflecting the target object based on the first user input corresponding to the regional input modality and the second user input corresponding to the boundary input modality. For example, the plurality of input modalities can comprise: the regional input modality, the boundary input modality, and a verbal input modality. Moreover, the object segmentation output can comprise an object mask reflecting the target object and an edge map of the target object. To illustrate, the first user input corresponding to the regional input modality can comprise a user selection of a foreground pixel or a user selection of a background pixel and the second user input corresponding to the boundary input modality can comprise a user selection of an edge pixel.

In addition, as shown in FIG. 11, the series of acts 1100 can include an act 1110 of identifying a first training indicator corresponding to a regional input modality and indicating a first training object. In particular, in one or more embodiments, the first training indicator reflects a first position relative to a first training object portrayed in a first training digital image.

In addition, as shown in FIG. 11, the series of acts 1100 can also include an act 1120 of identifying a second training indicator corresponding to a boundary input modality and indicating a second training object. In particular, in one or more embodiments, the second training indicator reflects a second position relative to a second training object portrayed in a second training digital image. For example, the act 1120 can include identifying the second training indicator corresponding to the boundary input modality from the second training digital image by sampling a pixel based on a boundary of the second training object portrayed in the second training digital image.

In addition, as shown in FIG. 11, the series of acts 1100 can also include an act 1130 of generating, utilizing a multi-modal object selection neural network, a first predicted object segmentation output based on the first training indicator. In particular, in one or more embodiments, the act 1130 includes generating, utilizing the multi-modal object selection neural network, a first predicted object segmentation output based on the first training digital image and the first training indicator corresponding to the regional input modality. For example, the act 1130 can include generating a first distance map comprising distances between pixels of the first training digital image and the first training indicator corresponding to the regional input modality; and analyzing the first distance map and the first training digital image utilizing the multi-modal object selection neural network to generate the first predicted object segmentation output. Moreover, in one or more embodiments, the act 1130 can also include generating a predicted segmentation mask corresponding to the first training object utilizing the multi-modal selection neural network; and generating a predicted segmentation boundary corresponding to the first training object utilizing the edge prediction branch of the multi-modal selection neural network.

In addition, the act 1130 can also include identifying a third training indicator corresponding to the boundary input modality, the third training indicator reflecting a third position relative to the first training object portrayed in a first training digital image; and generating, utilizing the multi-modal object selection neural network, the first predicted object segmentation output based on the first training digital image, the first training indicator corresponding to the regional input modality, and the third training indicator corresponding to the boundary input modality.

Moreover, as shown in FIG. 11, the series of acts 1100 can also include an act 1140 of generating, utilizing the multi-modal object selection neural network, a second predicted object segmentation output based on the second training indicator. In particular, in one or more embodiments the act 1140 includes generating, utilizing the multi-modal object selection neural network, a second predicted object segmentation output based on the second training digital image and the second training indicator corresponding to the boundary input modality.

In addition, as shown in FIG. 11, the series of acts 1100 can also include an act 1150 of modifying internal parameters of the multi-modal object selection neural network based on the predicted first object segmentation output, the first training object, the predicted second object segmentation output, and the second training object. In particular, in one or more embodiments, the act 1150 includes modifying internal parameters of the multi-modal object selection neural network by comparing the predicted first object segmentation output with the first training object and comparing the predicted second object segmentation output with the second training object. Moreover, the act 1150 can also include in a first training iteration comparing the predicted first object segmentation output with the first training object; and in a second training iteration comparing the predicted second object segmentation output with the second training object.

In one or more embodiments, the series of acts 1100 also includes identifying a third training indicator corresponding to a verbal input modality; and generating, utilizing the multi-modal object selection neural network, at least one of the first predicted object segmentation output or the second predicted object segmentation output based on the third training indicator corresponding to the verbal input modality.

In addition (or in the alternative) to the acts describe above, in some embodiments, the series of acts 1100 (or the series of acts 1000) include a step for training a multi-modal object selection neural network to generate object segmentation outputs reflecting training objects portrayed in training digital images based on a plurality of training indicators corresponding to a plurality of input modalities. For example, the algorithm and acts described above in relation to FIGS. 2A-2B and 5A-5B can comprise the corresponding acts (or structure) for a step for training a multi-modal object selection neural network to generate object segmentation outputs reflecting training objects portrayed in training digital images based on a plurality of training indicators corresponding to a plurality of input modalities.

In addition (or in the alternative) to the acts describe above, in some embodiments, the series of acts 1100 (or the series of acts 1000) include a step for utilizing a multi-modal object selection neural network to generate an object segmentation output from a plurality of user inputs (e.g., a plurality of user inputs corresponding to a plurality of input modalities). For example, the algorithm and acts described above in relation to FIGS. 2B-2C and 6A-6B can comprise the corresponding acts (or structure) for a step for utilizing a multi-modal object selection neural network to generate an object segmentation output from a plurality of user inputs.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general purpose computer to turn the general purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 12:
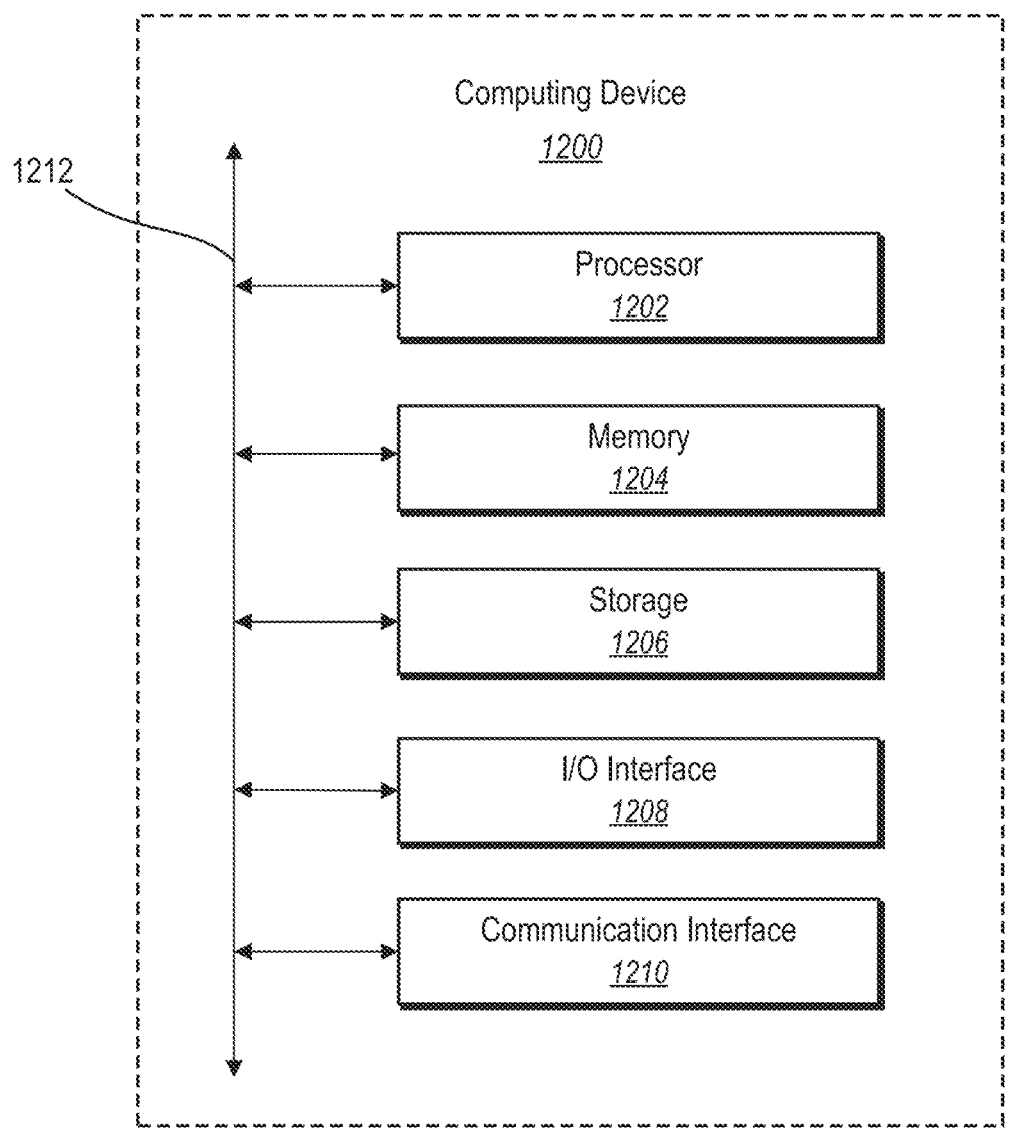
FIG. 12 illustrates a block diagram of an exemplary computing device in accordance with one or more embodiments.

FIG. 12 illustrates, in block diagram form, an exemplary computing device 1200 that may be configured to perform one or more of the processes described above. One will appreciate that the multi-modal selection system 800 can comprise implementations of the computing device 1200. As shown by FIG. 12, the computing device can comprise a processor 1202, memory 1204, a storage device 1206, an I/O interface 1208, and a communication interface 1210. While an exemplary computing device 1200 is shown in FIG. 12, the components illustrated in FIG. 12 are not intended to be limiting. Additional or alternative components may be used in other embodiments. Furthermore, in certain embodiments, a computing device 1200 can include fewer components than those shown in FIG. 12. Components of computing device 1200 shown in FIG. 12 will now be described in additional detail.

In particular embodiments, processor(s) 1202 includes hardware for executing instructions, such as those making up a computer program. As an example and not by way of limitation, to execute instructions, processor(s) 1202 may retrieve (or fetch) the instructions from an internal register, an internal cache, memory 1204, or a storage device 1206 and decode and execute them. In particular embodiments, processor(s) 1202 may include one or more internal caches for data, instructions, or addresses. As an example and not by way of limitation, processor(s) 1202 may include one or more instruction caches, one or more data caches, and one or more translation lookaside buffers (TLBs). Instructions in the instruction caches may be copies of instructions in memory 1204 or storage 1206.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example and not by way of limitation, storage device 1206 can comprise a non-transitory storage medium described above. The storage device 1206 may include a hard disk drive (HDD), a floppy disk drive, flash memory, an optical disc, a magneto-optical disc, magnetic tape, or a Universal Serial Bus (USB) drive or a combination of two or more of these. Storage device 1206 may include removable or non-removable (or fixed) media, where appropriate. Storage device 1206 may be internal or external to the computing device 1200. In particular embodiments, storage device 1206 is non-volatile, solid-state memory. In particular embodiments, storage device 1206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 1200 also includes one or more input or output ("I/O") devices/interfaces 1208, which are provided to allow a user to provide input to (such as user strokes), receive output from, and otherwise transfer data to and from the computing device 1200. These I/O devices/interfaces 1208 may include a mouse, keypad or a keyboard, a touch screen, camera, optical scanner, network interface, modem, other known I/O devices or a combination of such I/O devices/interfaces 1208. The touch screen may be activated with a stylus or a finger.

The I/O devices/interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1208 is configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 can provide one or more interfaces for communication (such as, for example, packet-based communication) between the computing device and one or more other computing devices 1200 or one or more networks. As an example and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 1210. As an example and not by way of limitation, computing device 1200 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 1200 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 1200 may include any suitable communication interface 1210 for any of these networks, where appropriate.

The computing device 1200 can further include a bus 1212. The bus 1212 can comprise hardware, software, or both that couples components of computing device 1200 to each other. As an example and not by way of limitation, bus 1212 may include an Accelerated Graphics Port (AGP) or other graphics bus, an Enhanced Industry Standard Architecture (EISA) bus, a front-side bus (FSB), a HYPER-TRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

We claim:

1. A non-transitory computer-readable medium storing instructions that, when executed by at least one processor, cause a computer system to:
    identify, for a single digital image, a first user input corresponding to a first user input modality, the first user input modality comprising one of a regional input modality, a boundary input modality, a language input modality, or a bounding box input modality;
    identify, for the single digital image, a second user input corresponding to a second user input modality, the second user input modality comprising another of a regional input modality, a boundary input modality, a language input modality, or a bounding box input modality, wherein the second user input modality differs from the first user input modality;
    generate a first neural network input from the first user input for the single digital image corresponding to the first user input modality and a second neural network input from the second user input for the single digital image corresponding to the second user input modality; and
    generate an object segmentation from the single digital image by utilizing a first input channel of a multi-modal object selection neural network to analyze the first neural network input for the single digital image corresponding to the first user input modality and a second input channel of the multi-modal object selection neural network to analyze the second neural network input for the single digital image corresponding to the second user input modality.

2. The non-transitory computer-readable medium of claim 1, further comprising instructions that, when executed by the at least one processor, cause the computer system to:
    generate the first neural network input from the first user input by generating a first distance map reflecting distances between pixels of the single digital image and the first user input corresponding to the first user input modality; and
    generate the second neural network input from the second user input by generating a second distance map reflecting distances between the pixels of the single digital image and the second user input corresponding to the second user input modality.

3. The non-transitory computer-readable medium of claim 2, further comprising instructions that, when executed by the at least one processor, cause the computer system to:
    generate a third neural network input from colors of the single digital image; and
    generate the object segmentation from the single digital image by utilizing a third input channel of the multi-modal object selection neural network to analyze third neural network input from the colors of the single digital image.

4. The non-transitory computer-readable medium of claim 2, further comprising instructions that, when executed by the at least one processor, cause the computer system to provide for display, via a user interface, a plurality of input modality selectable elements comprising at least one regional input modality element and at least one boundary input modality element.

5. The non-transitory computer-readable medium of claim 4, further comprising instructions that, when executed by the at least one processor, cause the computer system to:
    identify the first user input corresponding to the regional input modality by identifying a first user interaction with the at least one regional input modality element and a first selection of a pixel within the single digital image; and
    identifying the second user input corresponding to the boundary input modality by identifying a second user interaction with the at least one boundary input modality element and a second selection of a pixel within the single digital image.

6. The non-transitory computer-readable medium of claim 1, wherein:
    the first user input modality comprises a regional input modality;
    the first user input indicates a first position relative to a target object portrayed in the single digital image;
    the second user input modality comprises a boundary input modality; and the second user input indicates a second position relative to the target object portrayed in the single digital image.

7. The non-transitory computer-readable medium of claim 6, further comprising instructions that, when executed by the at least one processor, cause the computer system to:
utilize the multi-modal object selection neural network to generate an initial object segmentation based on the first user input corresponding to the regional input modality; and
provide the initial object segmentation for display with the single digital image.

8. The non-transitory computer-readable medium of claim 7, further comprising instructions that, when executed by the at least one processor, cause the computer system to:
in response to identifying the second user input corresponding to the boundary input modality, utilize the multi-modal object selection neural network to generate the object segmentation based on the first user input corresponding to the regional input modality and the second user input corresponding to the boundary input modality; and
provide the object segmentation for display with the single digital image.

9. The non-transitory computer-readable medium of claim 6, further comprising instructions that, when executed by the at least one processor, cause the computer system to:
identify a third user input corresponding to a language input modality; and
utilize the multi-modal object selection neural network to generate the object segmentation based on the first user input corresponding to the regional input modality, the second user input corresponding to the boundary input modality; and the third user input corresponding to the language input modality.

10. A computer-implemented method comprising:
identifying, for a single digital image, a first user input corresponding to a first user input modality, the first user input modality comprising one of a regional input modality, a boundary input modality, a language input modality, or a bounding box input modality;
identifying, for the single digital image, a second user input corresponding to a second user input modality, the second user input modality comprising another of a regional input modality, a boundary input modality, a language input modality, or a bounding box input modality, wherein the second user input modality differs from the first user input modality;
generating a first neural network input from the first user input for the single digital image corresponding to the first user input modality and a second neural network input from the second user input for the single digital image corresponding to the second user input modality; and
generating an object segmentation from the single digital image by utilizing a first input channel of a multi-modal object selection neural network to analyze the first neural network input for the single digital image corresponding to the first user input modality and a second input channel of the multi-modal object selection neural network to analyze the second neural network input for the single digital image corresponding to the second user input modality.

11. The computer-implemented method of claim 10, further comprising:
generating the first neural network input from the first user input by generating a first distance map reflecting distances between pixels of the single digital image and the first user input corresponding to the first user input modality; and
generating the second neural network input from the second user input by generating a second distance map reflecting distances between the pixels of the single digital image and the second user input corresponding to the second user input modality.

12. The computer-implemented method of claim 10, wherein the first user input corresponds to a regional input modality and the second user input corresponds to a boundary input modality.

13. The computer-implemented method of claim 12, wherein the first user input comprises a user input of a foreground pixel or a user input of a background pixel and wherein the second user input comprises a user input of an edge pixel.

14. A system comprising:
one or more memory devices comprising a single digital image; and
one or more processors configured to cause the system to:
identify, for the single digital image, a first user input corresponding to a first user input modality, the first user input modality comprising one of a regional input modality, a boundary input modality, a language input modality, or a bounding box input modality;
identify, for the single digital image, a second user input corresponding to a second user input modality, the second user input modality comprising another of a regional input modality, a boundary input modality, a language input modality, or a bounding box input modality, wherein the second user input modality differs from the first user input modality;
generate a first neural network input from the first user input for the single digital image corresponding to the first user input modality and a second neural network input from the second user input for the single digital image corresponding to the second user input modality; and
generate an object segmentation from the single digital image by utilizing a first input channel of a multi-modal object selection neural network to analyze the first neural network input for the single digital image corresponding to the first user input modality and a second input channel of the multi-modal object selection neural network to analyze the second neural network input for the single digital image corresponding to the second user input modality.

15. The system of claim 14, wherein the one or more processors are further configured to cause the system to:
utilize the multi-modal object selection neural network to generate an initial object segmentation based on the first user input corresponding to the regional input modality; and
provide the initial object segmentation for display with the single digital image;
in response to identifying the second user input corresponding to the boundary input modality, utilize the multi-modal object selection neural network to generate the object segmentation based on the first user input corresponding to the regional input modality and the second user input corresponding to the boundary input modality; and
provide the object segmentation for display with the single digital image.

16. The system of claim 15, wherein the one or more processors are further configured to cause the system to:

identify a third user input corresponding to a language input modality; and utilize the multi-modal object selection neural network to generate the object segmentation based on the first user input corresponding to the regional input modality, the second user input corresponding to the boundary input modality; and the third user input corresponding to the language input modality.

17. The system of claim 14, wherein the one or more processors are further configured to cause the system to generate the first neural network input by generating a distance map reflecting distances between pixels of the single digital image and the first user input corresponding to the first user input modality.

18. The system of claim 14, wherein the one or more processors are further configured to:

generate a third neural network input from colors of the single digital image; and generate the object segmentation by utilizing a third input channel of the multi-modal object selection neural network to analyze the third neural network input.

19. The system of claim 14, wherein the one or more processors are further configured to cause the system to provide for display, via a user interface, a plurality of input modality selectable elements comprising two or more of: a regional input modality element, a boundary input modality element, a language input modality element, or a bounding box input modality element.

20. The system of claim 19, wherein the one or more processors are further configured to cause the system to identify the first user input by receiving an indication of a user selection of a first input modality selectable element from the plurality of input modality selectable elements and one or more pixels of the single digital image.

21. The system of claim 20, wherein the one or more processors are further configured to cause the system to identify the second user input by receiving an additional indication of an additional user selection of a second input modality selectable element from the plurality of input modality selectable elements and an additional one or more pixels of the single digital image.

22. The system of claim 14, wherein the one or more processors are further configured to:

identify, for the single digital image, a third user input corresponding to a third input modality different than the first user input modality and the second user input modality; and generate the object segmentation by utilizing a third input channel of the multi-modal object selection neural network to analyze the third user input corresponding to the third input modality.

* * * * *